United States Patent
Mishra et al.

(10) Patent No.: US 10,140,242 B2
(45) Date of Patent: Nov. 27, 2018

(54) GENERAL PURPOSE INPUT/OUTPUT (GPIO) SIGNAL BRIDGING WITH I3C BUS INTERFACES AND VIRTUALIZATION IN A MULTI-NODE NETWORK

(71) Applicant: QUALCOMM Incorporated, San Diego, CA (US)

(72) Inventors: Lalan Jee Mishra, San Diego, CA (US); Richard Dominic Wietfeldt, San Diego, CA (US); Radu Pitigoi-Aron, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 15/242,368

(22) Filed: Aug. 19, 2016

(65) Prior Publication Data

US 2017/0075852 A1   Mar. 16, 2017

Related U.S. Application Data

(60) Provisional application No. 62/216,891, filed on Sep. 10, 2015, provisional application No. 62/265,612, (Continued)

(51) Int. Cl.
*G06F 13/20* (2006.01)
*G06F 13/42* (2006.01)
(Continued)

(52) U.S. Cl.
CPC ....... *G06F 13/4282* (2013.01); *G05B 19/054* (2013.01); *G06F 13/385* (2013.01); (Continued)

(58) Field of Classification Search
CPC .......................... G06F 13/4282; G06F 13/385
See application file for complete search history.

(56) References Cited

U.S. PATENT DOCUMENTS

| | | | |
|---|---|---|---|
| 5,291,391 A | 3/1994 | Mead et al. | |
| 5,455,911 A | 10/1995 | Johansson | |
| | (Continued) | | |

FOREIGN PATENT DOCUMENTS

| | | | | | |
|---|---|---|---|---|---|
| CN | 102650975 A | * | 3/2012 | ............. | G06F 13/20 |
| CN | 104346275 A | * | 8/2013 | ............. | G06F 11/36 |
| WO | WO-2015077803 A1 | | 5/2015 | | |

OTHER PUBLICATIONS

R. Colin Johnson, "MEMS/Sensor Interface I#C Rocks," Nov. 12, 2014, https://www.eetimes.com/document.asp?doc_id=1324598.*
(Continued)

*Primary Examiner* — Tammara R Peyton
(74) *Attorney, Agent, or Firm* — Loza & Loza LLP

(57) ABSTRACT

In an aspect, an integrated circuit obtains a set of general purpose input/output (GPIO) signals for one or more peripheral devices, obtains a first virtual GPIO packet that includes the set of GPIO signals independent of a central processing unit, and transmits the first virtual GPIO packet to the one or more peripheral devices over an I3C bus independent of the central processing unit. The integrated circuit may further obtain a set of configuration signals for configuring one or more GPIO pins of the one or more peripheral devices, obtain a second virtual GPIO packet that includes the set of configuration signals independent of the central processing unit, and transmit the second virtual GPIO packet to the one or more peripheral devices over the I3C bus independent of the central processing unit.

30 Claims, 45 Drawing Sheets

Related U.S. Application Data filed on Dec. 10, 2015, provisional application No. 62/349,609, filed on Jun. 13, 2016.

(51) Int. Cl.
| | | |
|---|---|---|
| *G06F 15/177* | (2006.01) | |
| *G06F 15/17* | (2006.01) | |
| *G06F 13/40* | (2006.01) | |
| *G05B 19/05* | (2006.01) | |
| *G06F 13/38* | (2006.01) | |

(52) U.S. Cl.
CPC .......... *G06F 13/4022* (2013.01); *G06F 15/17* (2013.01); *G06F 15/177* (2013.01)

(56) References Cited

U.S. PATENT DOCUMENTS

| | | |
|---|---|---|
| 6,823,400 B2 | 11/2004 | Namba |
| 8,040,215 B2 | 10/2011 | Zakriti |
| 8,205,017 B2 | 6/2012 | Parr et al. |
| 8,725,915 B2 | 5/2014 | Khan |
| 9,088,495 B2 | 7/2015 | Ajanovic et al. |
| 9,129,072 B2 | 9/2015 | Mishra et al. |
| 9,148,147 B2 | 9/2015 | Hematy et al. |
| 9,417,801 B2 * | 8/2016 | Adams ................ G06F 13/385 |
| 9,880,965 B2 * | 1/2018 | Mishra .................. G06F 1/10 |
| 2006/0123168 A1 | 6/2006 | Lang |
| 2006/0143348 A1 | 6/2006 | Wilson et al. |
| 2014/0105228 A1 | 4/2014 | Harriman |
| 2015/0277778 A1 | 10/2015 | Adams et al. |
| 2017/0039162 A1 * | 2/2017 | Mishra ............... G06F 13/4282 |
| 2018/0046595 A1 * | 2/2018 | Pitigoi-Aron ....... G06F 13/4291 |

OTHER PUBLICATIONS

International Search Report and Written Opinion—PCT/US2016/048082—ISA/EPO—dated Nov. 4, 2016.

* cited by examiner

400

I/O Mapping Table
(Peripheral ↔ Host ↔ Peripheral)

| | Source | | Destination | |
|---|---|---|---|---|
| | Peripheral I/O Number 408 | Peripheral Address 410 | Peripheral I/O Number 412 | Peripheral Address 414 |
| 402 | 2 | 0x01 | 3 | 0x02 |
| 404 | 1 | 0x00 (Host) | 1 | 0x(n-1) |
| 406 | 1 | 0x03 | 2 | 0x(n-1) |

*FIG. 4*

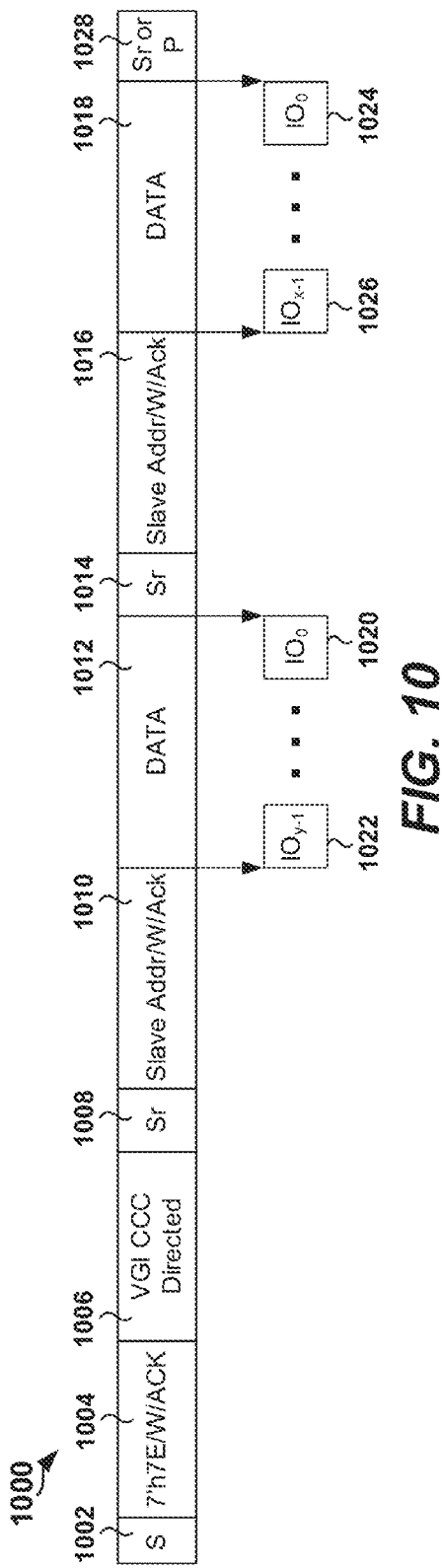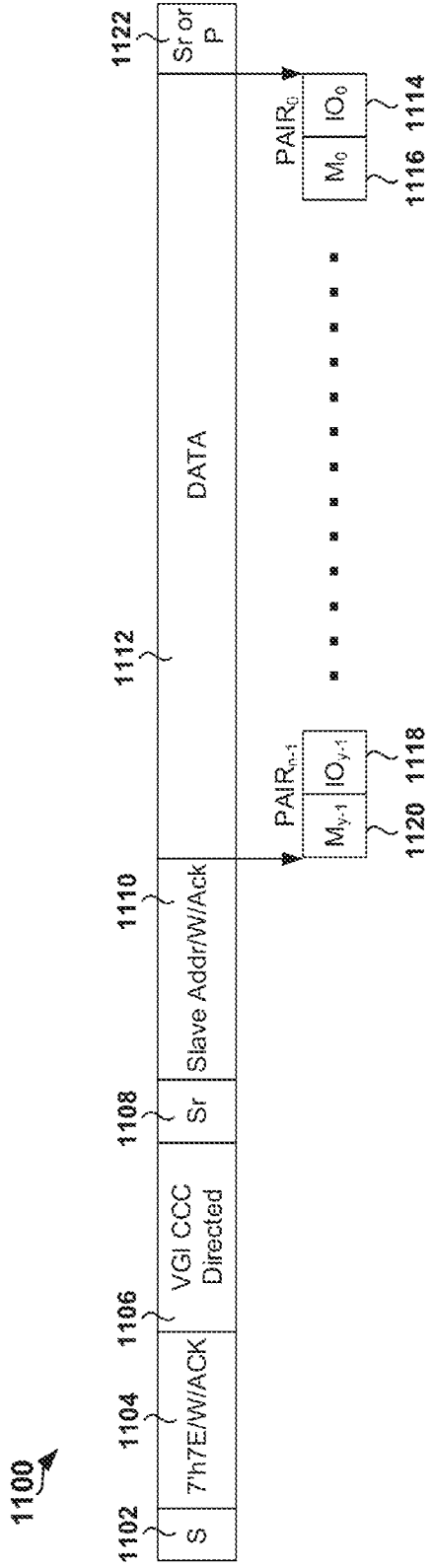

1300

I/O Mapping Table
(Host ↔ Peripheral)

| Host I/O 1302 | Peripheral I/O Mapping ||
| | Peripheral I/O Number 1304 | Peripheral Address 1306 |
|---|---|---|
| 1 | — | — |
| 2 | — | — |
| 3 | 1 | 0x01 |
| 4 | 2 | 0x01 |
| 5 | 3 | 0x01 |
| 6 | 4 | 0x01 |
| 7 | 1 | 0x02 |
| 8 | 2 | 0x02 |
| 9 | 3 | 0x02 |
| 11 | 1 | 0x03 |
| 12 | 2 | 0x03 |
| 13 | 1 | 0xn |
| 14 | 2 | 0xn |
| 15 | 3 | 0xn |
| 16 | 4 | 0xn |
| ⋮ | ⋮ | ⋮ |
| N | k | 0xm |

1308 — row with Host I/O 3
1310 — row with Host I/O 4
1312 — rows with Host I/O 9
1314 — row with Host I/O N

*FIG. 13*

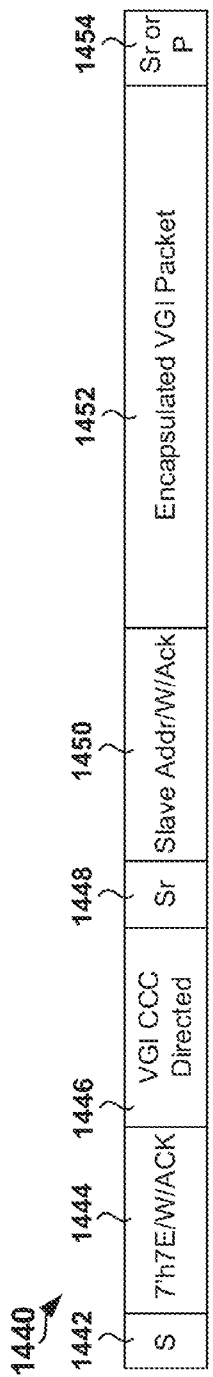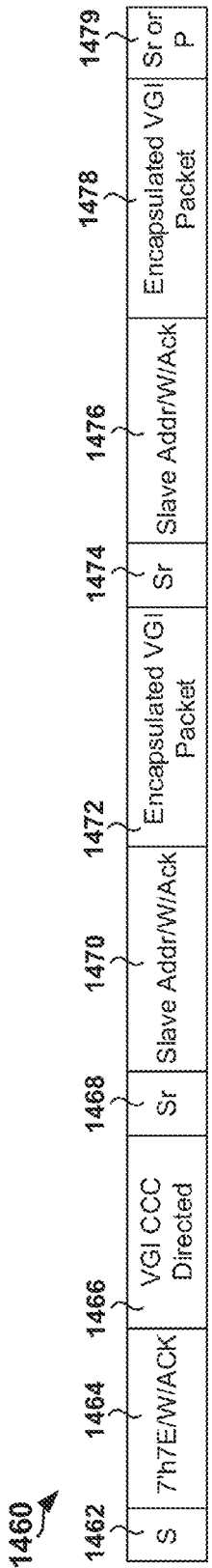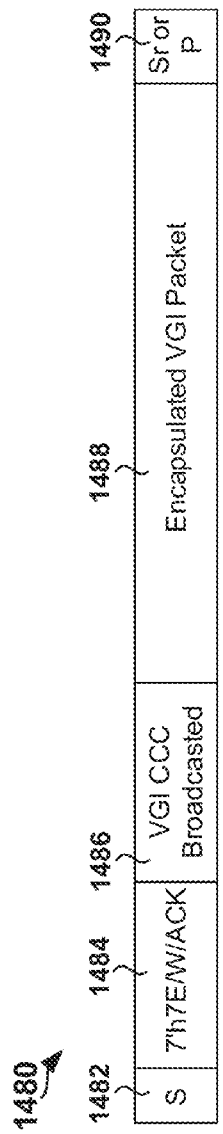
FIG. 14B
FIG. 14C
FIG. 14D

| 2000 | I/O Mapping Table (Host ↔ Peripheral) ||||||
|---|---|---|---|---|---|
| Host I/O 2002 | Direction w.r.t. Host 2004 | Peripheral I/O Mapping ||| Location in Broadcast O/P Packet From Host 2012 |
| | | Periph. Address 2006 | Periph. I/O # 2008 | Periph. I/O Param. 2010 | |
| 1 | 1 | - | - | - | |
| 2 | 2 | - | - | - | |
| 3 | O/P | 0x01 | 1 | State H/L | Mask-Position: 01 ~2014 |
| | | | | | Bit-Value: {0,1} ~2016 |
| 3 | O/P | 0x01 | 1 | 4mA/20mA | Mask-Position: 02 ~2020 |
| | | | | | Bit-Value: {0,1} ~2022 |
| 3 | O/P | 0x01 | 1 | OUT/IN | Mask-Position: 03 |
| | | | | | Bit-Value: {0,1} |
| 3 | O/P | 0x01 | 1 | OD/Push-Pull | Mask-Position: 04 |
| | | | | | Bit-Value: {0,1} |
| 3 | O/P | 0x01 | 1 | Edge/Level INT | Mask-Position: 05 |
| | | | | | Bit-Value: {0,1} |
| 4 | O/P | 0x01 | 2 | State H/L | Mask-Position: 06 |
| | | | | | Bit-Value: {0,1} |
| 5 | O/P | 0x01 | 3 | State H/L | Mask-Position: 07 ~2023 |
| | | | | | Bit-Value: {0,1} ~2025 |
| 6 | O/P | 0x02 | 1 | State H/L | Mask-Position: 08 |
| | | | | | Bit-Value: {0,1} ~2028 |
| 7 | O/P | 0x02 | 2 | State H/L | Mask-Position: 09 |
| | | | | | Bit-Value: {0,1} ~2034 |
| 8 | O/P | 0x03 | 1 | State H/L | Mask-Position: 10 |
| | | | | | Bit-Value: {0,1} |
| 9 | O/P | 0x03 | 2 | State H/L | Mask-Position: 11 |
| | | | | | Bit-Value: {0,1} |
| 10 | O/P | 0x04 | 1 | State H/L | Mask-Position: 12 |
| | | | | | Bit-Value: {0,1} |
| 11 | O/P | 0x04 | 2 | State H/L | Mask-Position: 13 |
| | | | | | Bit-Value: {0,1} |
| 12 | O/P | 0x05 | 1 | State H/L | Mask-Position: 14 |
| | | | | | Bit-Value: {0,1} |
| 13 | O/P | 0x05 | 2 | State H/L | Mask-Position: 15 ~2036 |
| | | | | | Bit-Value: {0,1} ~2038 |
| 14 | I/P | 0x05 | 3 | State H/L | I/P. Not used for broadcast O/P |

*FIG. 20*

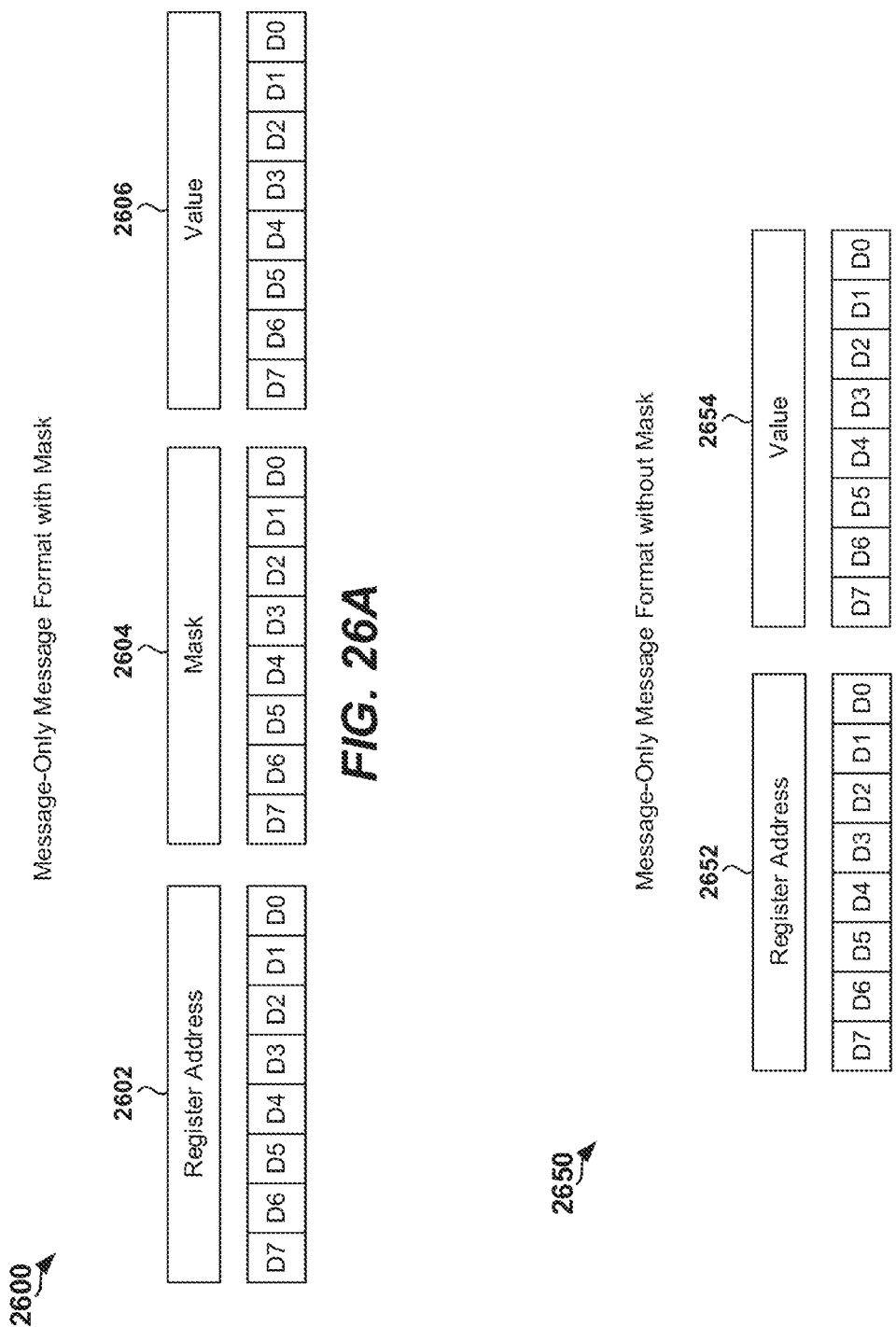

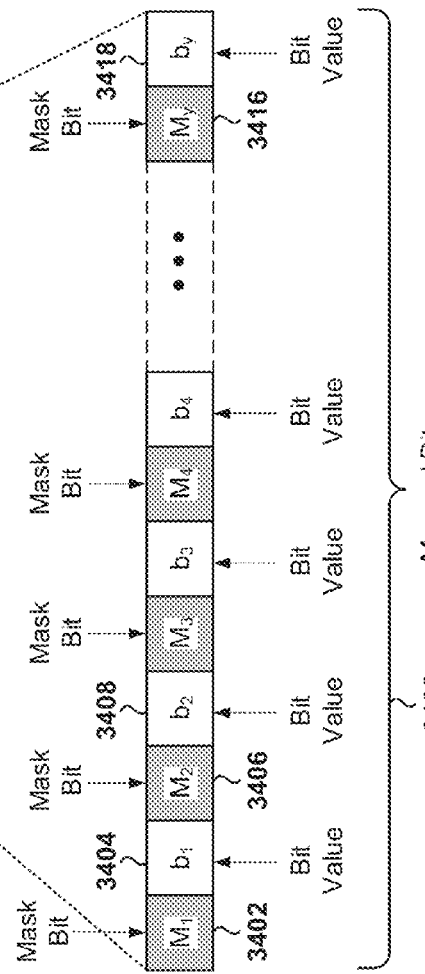
FIG. 34

US 10,140,242 B2

GENERAL PURPOSE INPUT/OUTPUT (GPIO) SIGNAL BRIDGING WITH I3C BUS INTERFACES AND VIRTUALIZATION IN A MULTI-NODE NETWORK

CLAIM OF PRIORITY UNDER 35 U.S.C. § 119

The present application for patent claims priority to U.S. Provisional Application No. 62/216,891 entitled "I/O BRIDGING FOR MULTI-NODE NETWORK" filed Sep. 10, 2015, to U.S. Provisional Application No. 62/265,612 entitled "I/O BRIDGING FOR MULTI-NODE NETWORK" filed Dec. 10, 2015, and to U.S. Provisional Application No. 62/349,609 entitled "INPUT/OUTPUT SIGNAL BRIDGING AND VIRTUALIZATION IN A MULTI-NODE NETWORK" filed Jun. 13, 2016, which are assigned to the assignee hereof and hereby expressly incorporated by reference herein.

INTRODUCTION

Field of the Disclosure

Aspects of the disclosure relate generally to input/out (I/O) signal bridging and virtualization in a multi-node network.

Background

General purpose input/output (GPIO) enables an integrated circuit designer to provide generic pins that may be customized for particular applications. For example, a GPIO pin is programmable to be either an output or an input pin depending upon a user's needs. A GPIO module or peripheral will typically control groups of pins which can vary based on the interface requirement. Because of the programmability of GPIO pins, they are commonly included in microprocessor and microcontroller applications. For example, an applications processor in mobile devices may use a number of GPIO pins to conduct handshake signaling such as inter-processor communication (IPC) with a modem processor.

A host device such as the application processor may be coupled to a plurality of peripheral devices through GPIO signaling. In the resulting network, it may be the case that one peripheral device needs to transmit a GPIO signal to another peripheral. The transmitting peripheral device must then transmit the corresponding GPIO signal to the host device, which then retransmits the GPIO signal to the receiving peripheral device. Such communication is problematic, however, in that the processor in the host device must transition into an active state (if it were in a sleep state) to manage the GPIO retransmission to the receiving peripheral device. The I/O bridging through the host device thus not only consumes substantial power but also entails the delay of transitioning the host processor from a dormant state into an active state.

Accordingly, there is a need in the art for improved GPIO signaling between multiple peripheral devices that are networked with a host device.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In an aspect, a method operational at an integrated circuit is provided. The integrated circuit obtains a set of GPIO signals for one or more peripheral devices and maps the set of GPIO signals for the one or more peripheral devices to first predetermined bit positions in the first virtual GPIO packet based on a mapping table. The integrated circuit obtains a set of mask signals associated with the set of GPIO signals, wherein the set of mask signals associated with the set of GPIO signals is included in the first virtual GPIO packet. The integrated circuit obtains a first virtual GPIO packet that includes the set of GPIO signals independent of a central processing unit. The integrated circuit transmits the first virtual GPIO packet to the one or more peripheral devices over an I3C bus independent of the central processing unit. The integrated circuit obtains a set of configuration signals for configuring one or more GPIO pins of the one or more peripheral devices and maps the set of configuration signals to second predetermined bit positions in the second virtual GPIO packet based on the mapping table. The integrated circuit obtains a set of mask signals associated with the set of configuration signals, wherein the set of mask signals associated with the set of configuration signals are included in the second virtual GPIO packet. The integrated circuit obtains a second virtual GPIO packet that includes the set of configuration signals and transmits the second virtual GPIO packet to the one or more peripheral devices over the I3C bus independent of the central processing unit.

In an aspect, an apparatus is provided is provided. The apparatus may include means for obtaining a set of GPIO signals for one or more peripheral devices and/or means for mapping the set of GPIO signals for the one or more peripheral devices to first predetermined bit positions in the first virtual GPIO packet based on a mapping table. The apparatus may further include means for obtaining a set of mask signals associated with the set of GPIO signals, wherein the set of mask signals associated with the set of GPIO signals is included in the first virtual GPIO packet. The apparatus may further include means for obtaining a first virtual GPIO packet that includes the set of GPIO signals independent of a central processing unit. The apparatus may further include means for transmitting the first virtual GPIO packet to the one or more peripheral devices over an I3C bus independent of the central processing unit. The may further include means for obtaining a set of configuration signals for configuring one or more GPIO pins of the one or more peripheral devices and/or means for mapping the set of configuration signals to second predetermined bit positions in the second virtual GPIO packet based on the mapping table. The apparatus may further include means for obtaining a set of mask signals associated with the set of configuration signals, wherein the set of mask signals associated with the set of configuration signals are included in the second virtual GPIO packet. The apparatus may further include means for obtaining a second virtual GPIO packet that includes the set of configuration signals and/or means for transmitting the second virtual GPIO packet to the one or more peripheral devices over the I3C bus independent of the central processing unit.

In an aspect, a method operational at an integrated circuit is provided. The integrated circuit obtains a set of GPIO signals for the one or more peripheral devices independent of a central processing unit. The integrated circuit obtains a set of mask signals associated with the set of GPIO signals, wherein the set of mask signals associated with the set of GPIO signals is included in the virtual GPIO packet. The integrated circuit obtains a set of configuration signals for configuring one or more GPIO pins of the one or more peripheral devices independent of the central processing unit. The integrated circuit obtains a set of mask signals associated with the set of configuration signals, wherein the set of mask signals associated with the set of configuration signals are included in the virtual GPIO packet. The integrated circuit maps the set of GPIO signals and the set of configuration signals to predetermined bit positions in a virtual GPIO packet based on a mapping table. The integrated circuit obtains the virtual GPIO packet that includes the set of GPIO signals and the set of configuration signals. The integrated circuit transmits the virtual GPIO packet to the one or more peripheral devices over an I3C bus independent of the central processing unit.

In an aspect, an apparatus is provided. The apparatus may include means for obtaining a set of GPIO signals for the one or more peripheral devices independent of a central processing unit. The apparatus may further include means for obtaining a set of mask signals associated with the set of GPIO signals, wherein the set of mask signals associated with the set of GPIO signals is included in the virtual GPIO packet. The apparatus may further include means for obtaining a set of configuration signals for configuring one or more GPIO pins of the one or more peripheral devices independent of the central processing unit. The apparatus may further include means for obtaining a set of mask signals associated with the set of configuration signals, wherein the set of mask signals associated with the set of configuration signals are included in the virtual GPIO packet. The apparatus may further include means for mapping the set of GPIO signals and the set of configuration signals to predetermined bit positions in a virtual GPIO packet based on a mapping table. The apparatus may further include means for obtaining the virtual GPIO packet that includes the set of GPIO signals and the set of configuration signals. The apparatus may further include means for transmitting the virtual GPIO packet to the one or more peripheral devices over an I3C bus independent of the central processing unit.

In an aspect, a method operational at an integrated circuit is provided. The integrated circuit receives a first I3C frame including a virtual GPIO packet over an I3C bus from a first peripheral device, wherein the virtual GPIO packet is encapsulated in the I3C frame. The integrated circuit obtains the virtual GPIO packet from the first I3C frame, maps a first virtual GPIO payload in the virtual GPIO packet based on a mapping table to determine a changed state of at least one first GPIO signal, aggregates the changed state of the at least one first GPIO signal into a changed state of at least one second GPIO signal, and transmits a second I3C frame to a second peripheral device over the I3C bus, wherein the second I3C frame includes a second virtual GPIO payload that signals the changed state of the at least one second GPIO signal. In an aspect, the second I3C frame is transmitted to the second peripheral device as a broadcast I3C frame. In an aspect, the broadcast I3C frame comprises a masked broadcast I3C frame. In an aspect, the second I3C frame is transmitted to the second peripheral device as a directed I3C frame. In an aspect, the directed I3C frame comprises a masked directed I3C frame. In an aspect, the integrated circuit may interrupt a host processor in response to the changed state of the at least one first GPIO signal.

In an aspect, an apparatus is provided. The apparatus may include means for receiving a first I3C frame including a virtual GPIO packet over an I3C bus from a first peripheral device, wherein the virtual GPIO packet is encapsulated in the I3C frame. The apparatus may further include means for obtaining the virtual GPIO packet from the first I3C frame, means for mapping a first virtual GPIO payload in the virtual GPIO packet based on a mapping table to determine a changed state of at least one first GPIO signal, means for aggregating the changed state of the at least one first GPIO signal into a changed state of at least one second GPIO signal, and/or means for transmitting a second I3C frame to a second peripheral device over the I3C bus, wherein the second I3C frame includes a second virtual GPIO payload that signals the changed state of the at least one second GPIO signal. In an aspect, the second I3C frame is transmitted to the second peripheral device as a broadcast I3C frame. In an aspect, the broadcast I3C frame comprises a masked broadcast I3C frame. In an aspect, the second I3C frame is transmitted to the second peripheral device as a directed I3C frame. In an aspect, the directed I3C frame comprises a masked directed I3C frame. In an aspect, the apparatus may interrupt a host processor in response to the changed state of the at least one first GPIO signal.

In an aspect, a method operational at an integrated circuit is provided. The integrated circuit receives a mapping table over an I3C bus from a host device during a configuration phase of the integrated circuit. The integrated circuit receives an I3C frame that includes a virtual GPIO packet from the host device over an I3C bus independent of a central processing unit, wherein the virtual GPIO packet is encapsulated in the I3C frame. The integrated circuit obtains the virtual GPIO packet that includes a set of GPIO signals and a set of configuration signals that are associated with the integrated circuit independent of the central processing unit. The integrated circuit identifies the set of GPIO signals and the set of configuration signals at predetermined bit positions in the virtual GPIO packet based on a mapping table. The integrated circuit identifies each of the set of GPIO signals that are indicated with a mask bit as having a changed state. The integrated circuit identifies each of the set of configuration signals that are indicated with a mask bit as having a changed state and obtains the set of GPIO signals and the set of configuration signals.

In an aspect, an apparatus is provided. The apparatus may include means for receiving a mapping table over an I3C bus from a host device during a configuration phase of the integrated circuit. The apparatus may further include means for receiving an I3C frame that includes a virtual GPIO packet from the host device over an I3C bus independent of a central processing unit, wherein the virtual GPIO packet is encapsulated in the I3C frame. The apparatus may further include means for obtaining the virtual GPIO packet that includes a set of GPIO signals and a set of configuration signals that are associated with the integrated circuit independent of the central processing unit. The apparatus may further include means for identifying the set of GPIO signals and the set of configuration signals at predetermined bit positions in the virtual GPIO packet based on a mapping table. The apparatus may further include means for identifying each of the set of GPIO signals that are indicated with a mask bit as having a changed state. The apparatus may further include means for identifying each of the set of configuration signals that are indicated with a mask bit as having a changed state and/or means for obtaining the set of GPIO signals and the set of configuration signals.

An integrated circuit includes a communication interface configured to communicate with one or more peripheral devices and a processing circuit coupled to the communication interface. The processing circuit is configured to receive a first I3C frame including an virtual general purpose input/output (GPIO) packet over an I3C bus from a first peripheral device, wherein the virtual GPIO packet is encapsulated in the I3C frame, obtain the virtual GPIO packet from the first I3C frame, map a first virtual GPIO payload in the virtual GPIO packet based on a mapping table to determine a changed state of at least one first GPIO signal, aggregate the changed state of the at least one first GPIO signal into a changed state of at least one second GPIO signal, transmit a second I3C frame to a second peripheral device over the I3C bus, wherein the second I3C frame includes a second virtual GPIO payload that signals the changed state of the at least one second GPIO signal. In an aspect, the second I3C frame is transmitted to the second peripheral device as a broadcast I3C frame. In an aspect, the broadcast I3C frame comprises a masked broadcast I3C frame. In an aspect, the second I3C frame is transmitted to the second peripheral device as a directed I3C frame. In an aspect, the directed I3C frame comprises a masked directed I3C frame. In an aspect, the processing circuit is further configured to interrupt a host processor in response to the changed state of the at least one first GPIO signal.

A method operational at an integrated circuit is provided. The method includes receiving a first I3C frame including a virtual GPIO packet over an I3C bus from a first peripheral device, wherein the virtual GPIO packet is encapsulated in the I3C frame, obtaining the virtual GPIO packet from the first I3C frame, and mapping a first virtual GPIO payload in the virtual GPIO packet based on a mapping table to determine a changed state of at least one first GPIO signal. The method further includes aggregating the changed state of the at least one first GPIO signal into a changed state of at least one second GPIO signal, and transmitting a second I3C frame to a second peripheral device over the I3C bus, wherein the second I3C frame includes a second virtual GPIO payload that signals the changed state of the at least one second GPIO signal. In an aspect, the second I3C frame is transmitted to the second peripheral device as a broadcast I3C frame. In an aspect, the broadcast I3C frame comprises a masked broadcast I3C frame. In an aspect, the second I3C frame is transmitted to the second peripheral device as a directed I3C frame. In an aspect, the directed I3C frame comprises a masked directed I3C frame. In an aspect, the method further includes interrupting a host processor in response to the changed state of the at least one first GPIO signal.

In an aspect, an apparatus is provided. The apparatus may include means for receiving a first I3C frame including a virtual GPIO packet over an I3C bus from a first peripheral device, wherein the virtual GPIO packet is encapsulated in the I3C frame, means for obtaining the virtual GPIO packet from the first I3C frame, and means for mapping a first virtual GPIO payload in the virtual GPIO packet based on a mapping table to determine a changed state of at least one first GPIO signal. The apparatus may further include means for aggregating the changed state of the at least one first GPIO signal into a changed state of at least one second GPIO signal, and/or means for transmitting a second I3C frame to a second peripheral device over the I3C bus, wherein the second I3C frame includes a second virtual GPIO payload that signals the changed state of the at least one second GPIO signal. In an aspect, the second I3C frame is transmitted to the second peripheral device as a broadcast I3C frame. In an aspect, the broadcast I3C frame comprises a masked broadcast I3C frame. In an aspect, the second I3C frame is transmitted to the second peripheral device as a directed I3C frame. In an aspect, the directed I3C frame comprises a masked directed I3C frame. In an aspect, the method further includes interrupting a host processor in response to the changed state of the at least one first GPIO signal.

In an aspect, an integrated circuit is provided. The integrated circuit includes a finite state machine configured to receive a set of GPIO signals and package the set of GPIO signals into a virtual GPIO packet independent of a central processing unit, and an I2C interface configured to transmit an I2C frame over an I2C bus to a plurality of peripheral devices, wherein the virtual GPIO packet is encapsulated in the I2C frame.

In an aspect, an integrated circuit is provided. The integrated circuit includes a finite state machine configured to receive a set of GPIO signals and package the set of GPIO signals into a virtual GPIO packet independent of a central processing unit, and an I3C interface configured to transmit an I3C frame over an I3C bus to a plurality of peripheral devices, wherein the virtual GPIO packet is encapsulated in the I3C frame.

A method operational at an integrated circuit (e.g., a host device) is provided. The method includes receiving, at a host device, a first I2C frame (or a first I3C frame) including an encapsulated virtual GPIO packet over an I2C bus (or an I3C bus) from a first peripheral device, recovering, in an I2C interface (or an I3C interface) in the host device, the virtual GPIO packet from the first I2C frame and transferring the virtual GPIO packet to a finite state machine, mapping, in the finite state machine in the host device, a first virtual GPIO payload in the VGI packet into a changed state of at least one first GPIO signal, aggregating, in the finite state machine, the changed state of the at least one first GPIO signal into a changed state of at least one second GPIO signal, and transmitting a second I2C frame from the host device to a second peripheral device over the I2C bus, wherein the second I2C frame includes a second virtual GPIO payload that signals the changed state of the at least one second GPIO signal.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

FIG. 4 illustrates an example I/O mapping table in accordance with various aspects of the disclosure.

FIG. 10 illustrates a directed (addressed) I2C/I3C VGPIO frame.

FIG. 11 illustrates a masked directed frame.

FIG. 13 illustrates an example mapping table.

FIG. 14B illustrates an example directed I2C/I3C frame.

FIG. 14C illustrates an example directed I2C/I3C frame.

FIG. 14D illustrates an example broadcast I2C/I3C frame.

FIG. 20 illustrates an example host table for mapping I/Os of a host system on chip (SoC) and I/Os of destination peripherals.

FIG. 26A is a diagram illustrating an example of a message-only message format that implements a mask.

FIG. 26B is a diagram illustrating an example of a message-only format that does not implement a mask.

FIG. 34 is a diagram illustrating an example of masked direct messaging for a read operation using a merged message in accordance with various aspects of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
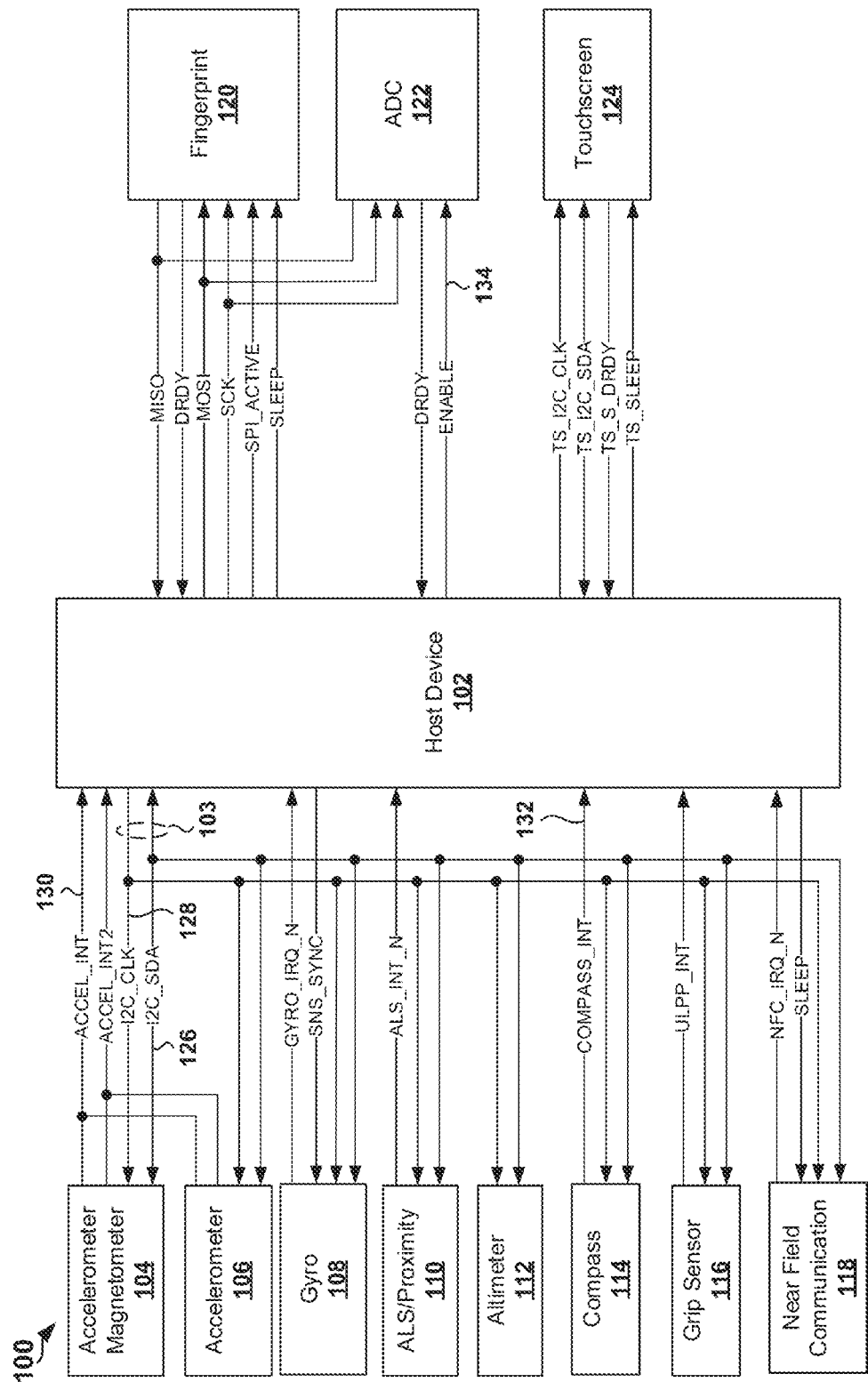
FIG. 1 illustrates a block diagram of an example conventional general purpose input/output (GPIO) network.

FIG. 1 illustrates a block diagram of an example general purpose input/output (GPIO) network 100. As shown in FIG. 1, a host device 102 is coupled to a number of peripheral devices via an Inter-Integrated Circuit (I2C) bus 103, where the I2C bus 103 includes a data line 126 and a clock line 128 as known in the I2C arts. In an aspect, the host device 102 may be a system on chip (SoC) device. For example, as shown in FIG. 1, the peripheral devices may include an accelerometer and magnetometer 104, an accelerometer 106, a gyro sensor 108, an ambient light sensor (ALS) and proximity sensor 110, an altimeter 112, a compass 114, a grip sensor 116, a near field communication device 118, a fingerprint sensor 120, an analog to digital converter 122, and/or a touchscreen 124. As shown in FIG. 1, although the peripheral devices (e.g., the accelerometer and magnetometer 104, the accelerometer 106, the gyro sensor 108, the ambient light sensor (ALS) and proximity sensor 110, the altimeter 112, the compass 114, the grip sensor 116, and/or the near field communication device 118) may communicate with the host device 102 using the I2C bus 103, the host 102 and the peripheral devices may need additional lines for sideband signals, such as for interrupt signals (e.g., data ready interrupt (DRI) signals)) and/or hardware events (e.g., enables, and resets). For example, the accelerometer and magnetometer 104 may need to transmit a first DRI signal 130 to the host device 102 over a first dedicated line (also referred to as a first dedicated interconnect) and the compass 114 may need to transmit a second DRI signal 132 to the host device 102 over a second dedicated line (also referred to as a second dedicated interconnect). In another example, the host device 102 may need to transmit an enable signal 134 over a third dedicated line (also referred to as a third dedicated interconnect). It should be noted that such additional dedicated lines (e.g., the previously discussed first, second, and third dedicated lines) in addition to the I2C bus lines may require a corresponding number of additional pins at the host device 102.

Figure 2A:
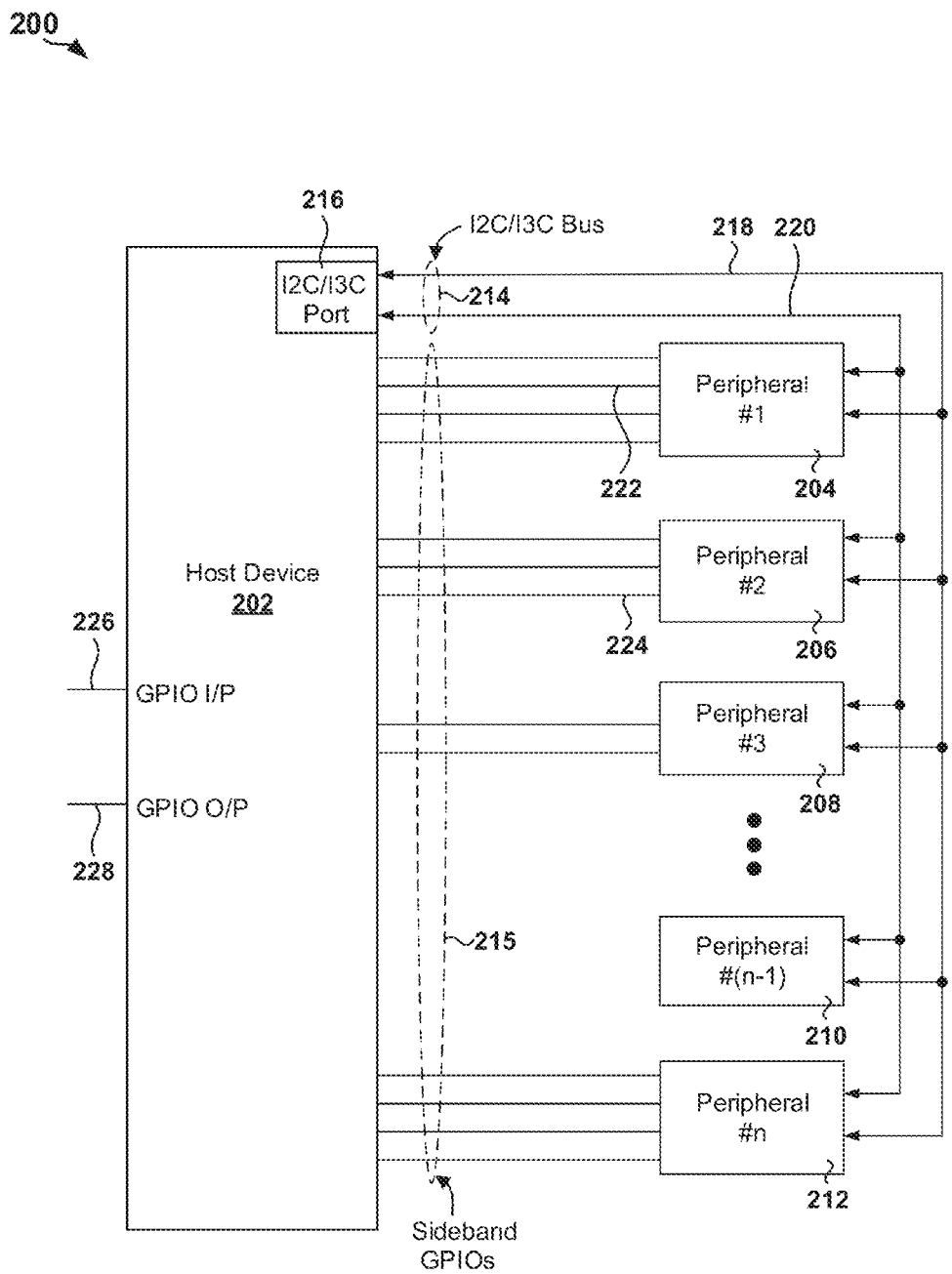
FIG. 2A illustrates a block diagram of an example multi-node GPIO network.

FIG. 2A illustrates a block diagram of an example multi-node GPIO network 200. The multi-node GPIO network 200 includes a host device 202 and an n number of peripheral devices (e.g., peripheral device #1 204, peripheral device #2 206, peripheral device #3 208, peripheral device #(n−1) 210, and peripheral device #n 212). In an aspect, the host device 202 may be an SoC device. In an aspect, the host device 202 may include an I2C/I3C port 216 for communicating signals over the bus 214, a GPIO input pin 226, and a GPIO output pin 228. As shown in FIG. 2A, the host device 202 is coupled to the peripheral devices via the bus 214, which may include a clock line 218 and a data line 220. In an aspect, the bus 214 may be an I2C bus or an I3C bus. In an aspect, when the bus 214 is implemented as an I3C bus, the exchange of input/output (I/O) events (also referred to as hardware events, hardware input/output events, or GPIOs) between nodes (e.g., peripherals 204, 206, 208, 210, and 212) may require involvement of central processing units (CPUs) in the host device 202. In one example, a first node that needs to transmit an I/O event to a remote node must interrupt its corresponding first CPU. The first CPU may formulate a message to the remote node indicating the I/O event. A second CPU corresponding to the remote node must awaken to process the message, including converting the event into a I/O event if needed. Therefore, situations where I/O events need to be communicated between nodes (e.g., peripherals 204, 206, 208, 210, and/or 212) (also referred to as I/O bridging) may demand frequent wake-up and processing by the host device 202 and, therefore, may lead to overall higher power consumption in a system. Moreover, situations where multi-node connected peripherals use a number of sideband signals (e.g., sideband GPIOs 215) may consume a number of pins on the host device 202 and peripherals, resulting in higher package costs.

Figure 2B:
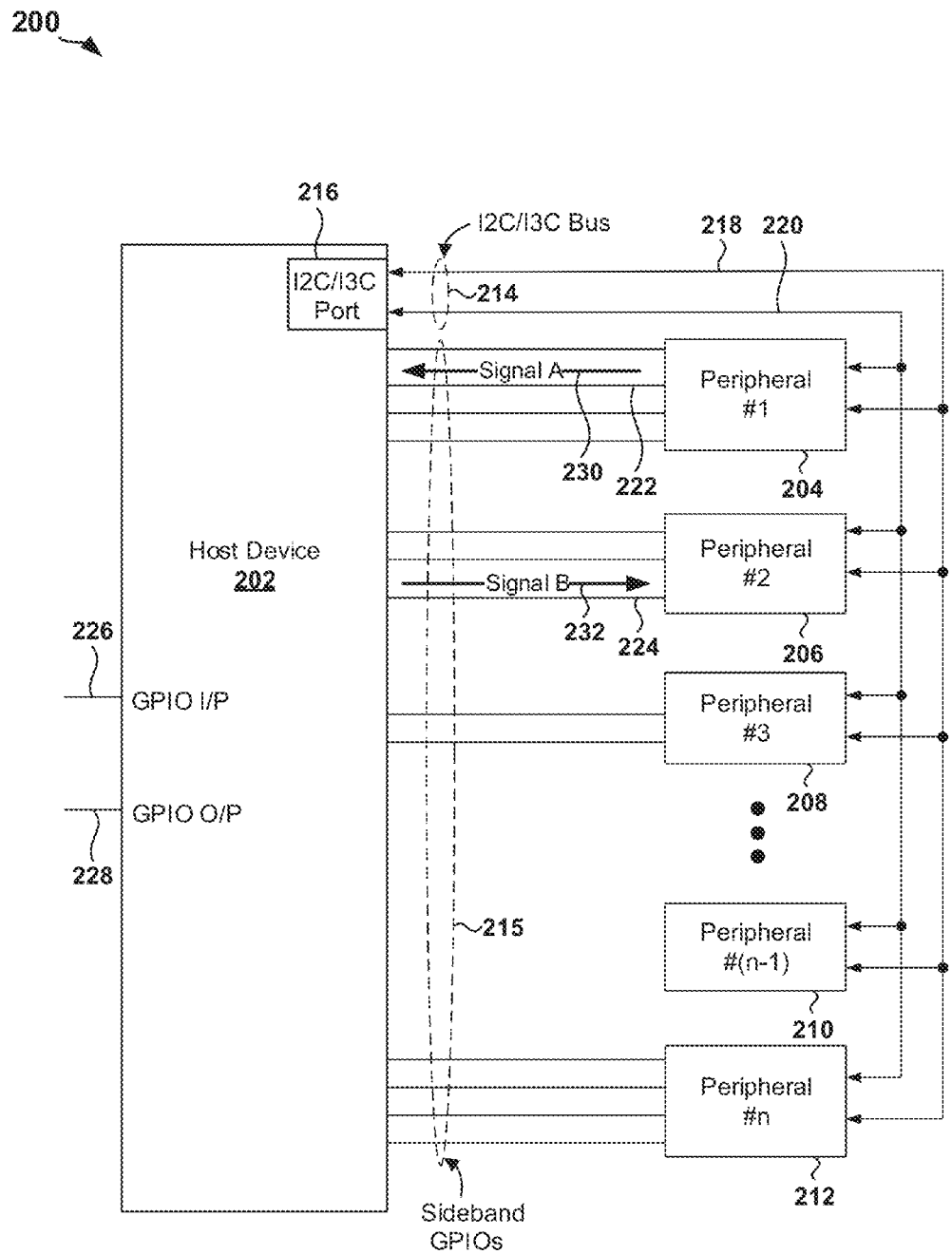
FIG. 2B illustrates an example I/O bridging scenario in an example GPIO network.

FIG. 2B illustrates an example I/O bridging scenario in the example GPIO network 200. In this example, an I/O event "A" (e.g., the I/O event signal A 230 transmitted over the interconnect 222) originating from peripheral 204 causes the host device 202 to generate an I/O event "B" (e.g., the I/O event signal B 232 transmitted over the interconnect 224) that terminates at peripheral 206. Therefore, this example involves peripheral to peripheral I/O bridging. Accordingly, in this example, the host device 202 is involved in the processing of the I/O event "A" and I/O event "B".

Figure 2C:
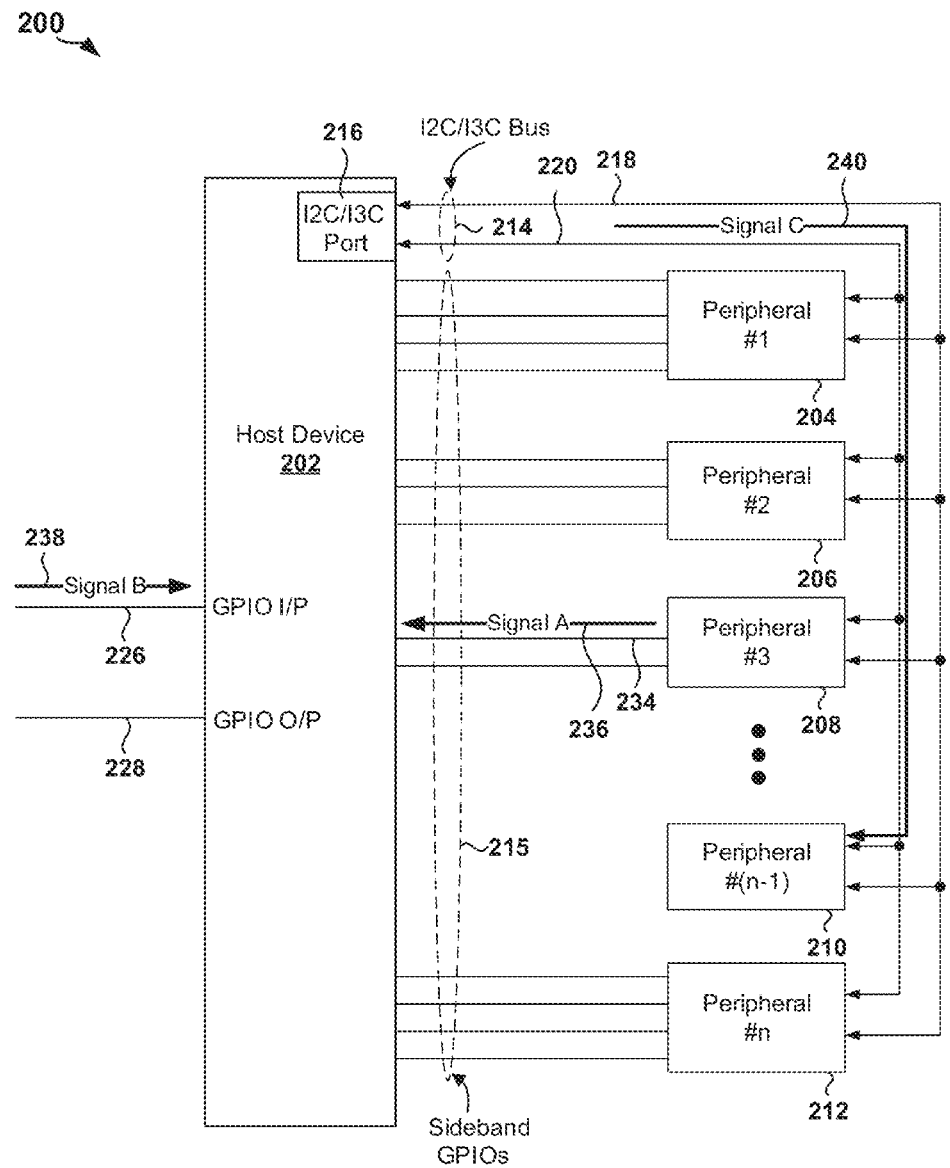
FIG. 2C illustrates an example I/O bridging scenario in an example GPIO network.

FIG. 2C illustrates an example I/O bridging scenario in the example GPIO network 200. In this example, an I/O event "A" (e.g., the I/O event signal A 236 transmitted over the interconnect 234) originating from the peripheral 208 and another I/O event "B" (e.g., the I/O event signal B 238 received at the GPIO input pin 226) originates from the host device 202 itself, causes the host device 202 to generate a final I/O event "C" (e.g., the I/O event signal C 240 transmitted over the interconnect 240) to the peripheral 210 using an I2C bus transaction. Therefore, this example involves a heterogeneous case in which the host device 202 gets involved in the processing of I/O events A, B and C. In accordance with the aspects described herein, involvement of the host device 202 for I/O events A and B may avoided by I/O bridging/aggregation.

Figure 3:
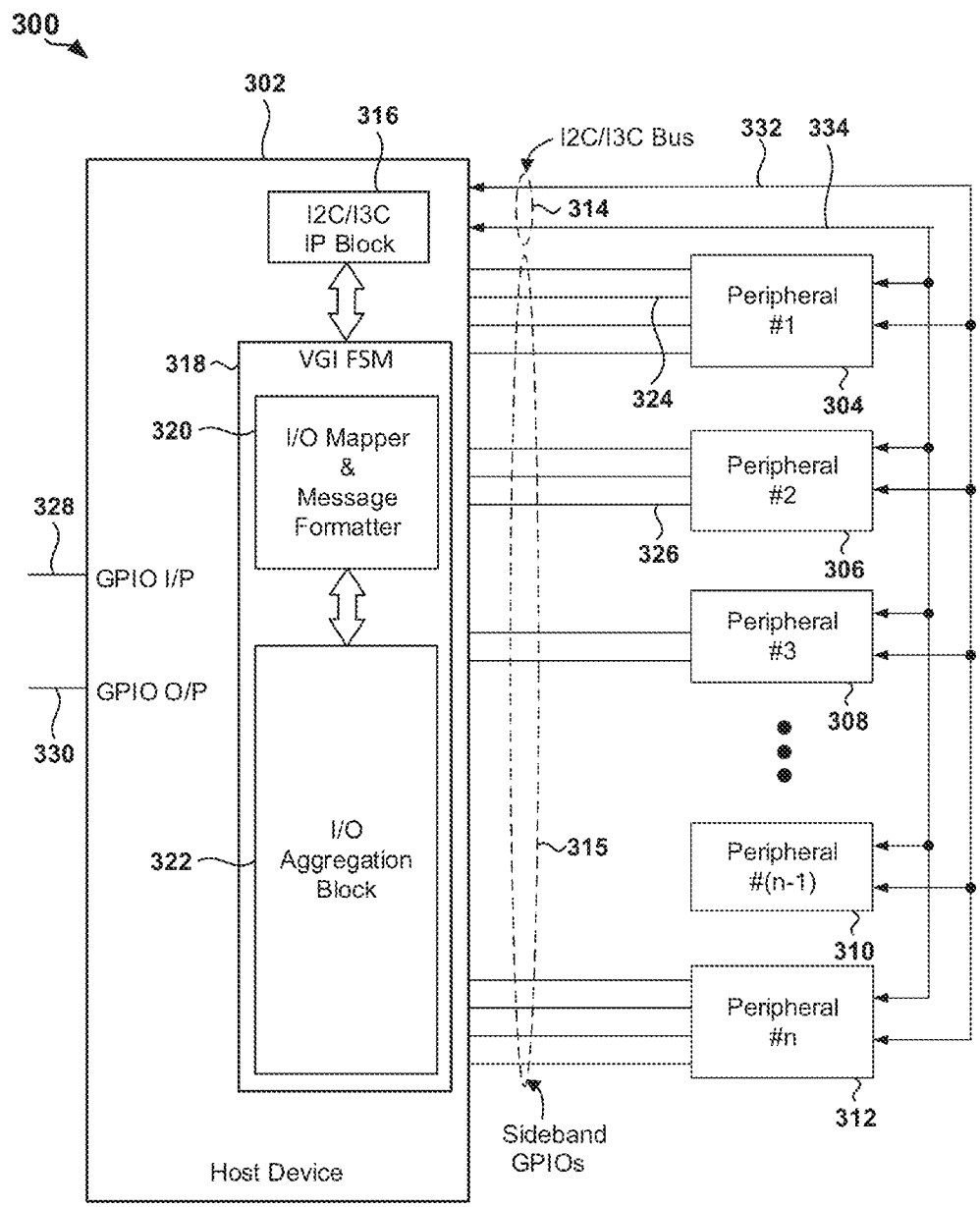
FIG. 3 illustrates a block diagram of an example GPIO network in accordance with various aspects of the disclosure.

FIG. 3 illustrates a block diagram of an example GPIO network 300 in accordance with various aspects of the invention. The GPIO network 300 includes a host device 302 and an n number of peripheral devices (e.g., peripheral device #1 304, peripheral device #2 306, peripheral device #3 308, peripheral device #(n−1) 310, and peripheral device #n 312). In an aspect, the host device 302 may be an SoC device. As shown in FIG. 3, the host device 302 is coupled to the peripheral devices via the bus 314, which may include a clock line 332 and a data line 334. The bus 314 may be an I2C bus or an I3C bus. In an aspect, the host device 302 may include a GPIO input pin 328, a GPIO output pin 330, and an I2C/I3C intellectual property block 316. For example, the I2C/I3C intellectual property block 316 may obtain and/or process data configured for communication using the I2C/I3C communication protocols.

As further shown in FIG. 3, the host device 302 may include a virtual GPIO finite state machine (VGI FSM) 318. The VGI FSM 318 may communicate with the I2C/I3C IP block 316 and may transmits and receive signals over the bus 314. In an aspect, the VGI FSM 318 may include an I/O mapper and message formatter 320 and an I/O aggregation block 322. In an aspect, the I/O mapper and message formatter 320 may be a device that implements a configurable I/O mapping table within the VGI FSM 318. In an aspect, such configurable I/O mapping table may be configured during initialization of the GPIO network 300. In an aspect, and as described in detail herein, the I/O mapping table may map the connection of an I/O from a source peripheral device (e.g., an originating node in the GPIO network 300) to a corresponding destination peripheral device (e.g., a destination node in the GPIO network 300). For example, the I/O mapping table may include a list of one or more entries. In such example, each entry may describe an I/O number of a source peripheral device and the address of the source peripheral device and a corresponding I/O number of a destination peripheral device and the address of the destination peripheral device. In an aspect, the I/O to be communicated from a source peripheral device to a destination peripheral device may be included in a message that is formatted using I2C/I3C standards. In this way, the message may be processed by the VGI FSM 318 to enable I/O status exchange between peripheral devices without involving the host device 302.

FIG. 4 illustrates an example I/O mapping table 400 in accordance with various aspects of the disclosure. As shown in FIG. 4, the I/O mapping table 400 includes a source peripheral I/O number 408, a source peripheral address 410, a destination peripheral I/O number 412, a destination peripheral address 414. As further shown in FIG. 4, the I/O mapping table 400 may include one or more entries, such as the example entries 402, 404, and 406. The entry 402 of the I/O mapping table 400 corresponds to the scenario discussed with reference to FIG. 2B and the entries 404 and 406 of the I/O mapping table 400 correspond to the scenario discussed with reference to FIG. 2C. For example, with reference to FIG. 2B, the entry 402 describes that the I/O number 2 of the peripheral #1 204 (associated with the address 0x01) is transmitted (e.g., over the interconnect 222 in FIG. 2B) to the I/O number 3 of the peripheral #3 206 (associated with the address 0x02).

In an aspect, to accommodate GPIO signaling between a host device (e.g., an SoC device) and a plurality of peripheral devices, the host device and each peripheral device may include a VGI FSM. In contrast to an actual GPIO interface, a VGI FSM does not communicate over dedicated GPIO pins. Instead, the peripheral devices and the host device all include an inter-integrated circuit (I2C) interface that in turn couples to an I2C bus. Alternatively, the host device and the peripheral devices may each include a Mobile Industry Processor Interface (MIPI) I3C interface as defined by the MIPI consortium. Similar to the two-wire bus used in the I2C interface, the bus for an I3C interface is also a two-wire bus. Therefore, the resulting bus will be referred to herein as an I2C/I3C bus, as it would be substantially identical for both protocols.

During a setup phase, each VGI FSM may be configured with a mapping table that maps particular bits received from the I2C/I3C interface to particular GPIO signals. For example, in a conventional system a GPIO signal may be assigned to a specific GPIO pin at a specific peripheral device and be destined for a specific GPIO pin at the host device. Since these GPIO pins are virtualized in the networking aspects disclosed herein, the corresponding peripheral device would instead configure a specific virtual GPIO bit in the data payload of message configured for transmission over the I2C/I3C bus. In an aspect, the message may be referred to as an I2C or I3C frame. Since the GPIO pins are no longer used, they may be replaced by "input/output numbers" that identify a specific GPIO signal. To be consistent with the I2C and I3C standards, an I2C or I3C frame may include a header with a command code that identifies the frame as containing virtual GPIO signals. In response to decoding the command code at the host device, the I2C/I3C interface transmits the virtual GPIO bits in the data payload to the host device's VGI FSM. Each virtual GPIO signal has a certain position within the data payload. For example, consider a data payload that is eight bits in length. The first bit in the data payload may correspond to a first virtual GPIO signal, the second bit may correspond to a second virtual GPIO signal, and so on.

In an aspect, all VGI FSMs may be configured to have knowledge of the order of virtual GPIO signals within the data payload of a virtual GPIO frame as transmitted by the I2C/I3C interfaces. For example, each VGI FSM may include a mapping table that describes such order of virtual GPIO signals within a data payload. Based upon the mapping table, the VGI FSM of a given device (e.g., a peripheral device or a host device) may recognize a changed state of a virtual GPIO signal that requires the VGI FSM to interrupt the processor in the corresponding device. In one case, a peripheral device may be signaling another peripheral device using virtual GPIO signals. In such a case, the transmitting peripheral device may transmit a VGI I2C/I3C frame to the host device. The host device's VGI FSM may recognize (e.g., using the mapping table at the VGI FSM) that the transmitting peripheral device is intending to signal a target peripheral device with a corresponding virtual GPIO signal. The VGI FSM at the host device may trigger the I2C/I3C interface at the host device to transmit a VGI I2C/I3C frame having a data payload that includes the virtual GPIO signal intended for the target device.

In an aspect, the VGI FSM of each device may be configured to aggregate changed states in virtual GPIO signals. For example, a host device may recognize the changed state in a virtual GPIO signal from one peripheral device and may trigger the transmission (from the host device) of a virtual GPIO signal to another peripheral device. Through this aggregation, the host processor may remain in an idle state despite this I/O bridging of the GPIO signals from one peripheral device to another through the host device. Therefore, this approach may not only eliminate the various GPIO pins that would otherwise be necessary to accommodate conventional GPIO signals, but may also eliminate the power loss and latency that is conventionally necessary for processor management of the I/O bridging. In other words, so long as a virtual GPIO signal need not interrupt a processor in either the host device or a peripheral device, such processor may remain in an idle state or low-power state.

Figure 5:
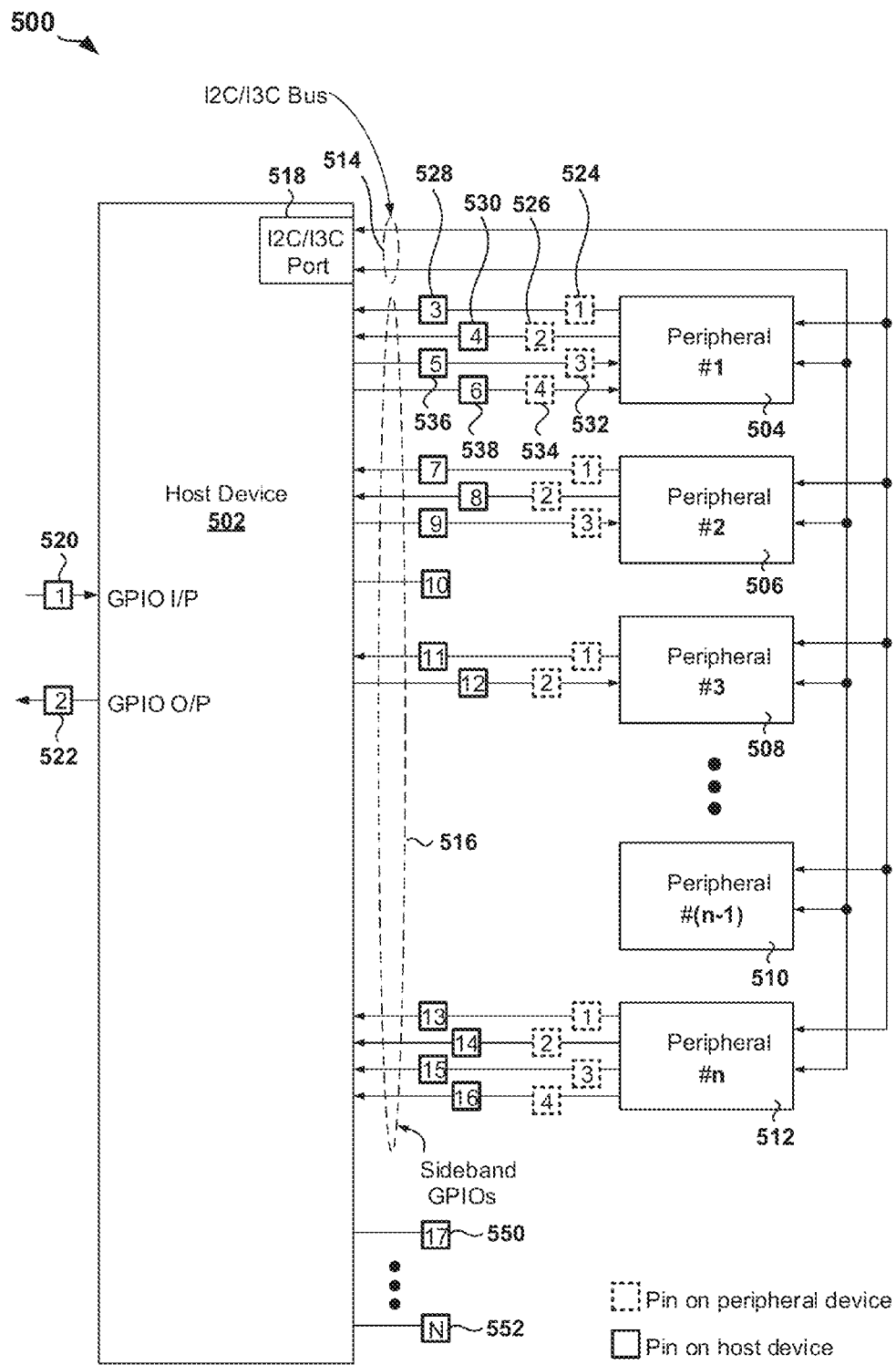
FIG. 5 illustrates an example conventional GPIO network.

To better appreciate these advantages, consider an example GPIO network 500 as shown in FIG. 5. A host device 502 (e.g., a host SoC) includes a plurality of GPIO pins for interfacing with corresponding GPIO pins on a plurality of n peripheral devices (e.g., peripheral device #1 504, peripheral device #2 506, peripheral device #3 508, peripheral device #(n−1) 510, and peripheral device #n 512), where n is a positive integer greater than one. As used herein, the term "pin" is a generic term to cover the structure, such as a pad and/or an actual pin, that an integrated circuit uses to couple to leads (also referred to as traces) on a circuit board or other physical interconnects (e.g., a package interconnect or a through-hole via interconnect). In the example configuration of FIG. 5, the peripheral device #1 504 may receive or transmit four GPIO signals. For example, and as shown in FIG. 5, the peripheral device #1 504 has two pins, such as the pin 1 524 and the pin 2 526, for transmitting corresponding GPIO signals to two pins, such as the pin 3 528 and the pin 4 530, on the host device 502. In addition, the host device 502 has two pins, such as the pin 5 536 and the pin 6 538, for transmitting corresponding GPIO signals to two pins, such as the pin 3 532 and the pin 4 534, on the peripheral device #1 504. The host device 502 has pins 7, 8, and 9 for communicating with respective pins 1, 2, and 3 on the peripheral device #2 506, pins 11 and 12 for communicating with respective pins 1 and 2 on the peripheral device #3 508, and pins 13, 14, 15, and 16 for communicating with respective pins 1, 2, 3, and 4 on the peripheral device #n 512. In an aspect, the host device 502 may include a GPIO input pin 1 520 and a GPIO output pin 2 522. The host device 502 may further include an I2C/I3C port 518 (also referred to as an I2C/I3C interface) for communicating over an I2C/I3C bus 514 to corresponding I2C/I3C interfaces (not shown in FIG. 5) in the peripheral devices 504, 506, 508, 510, and 512.

Figure 6:
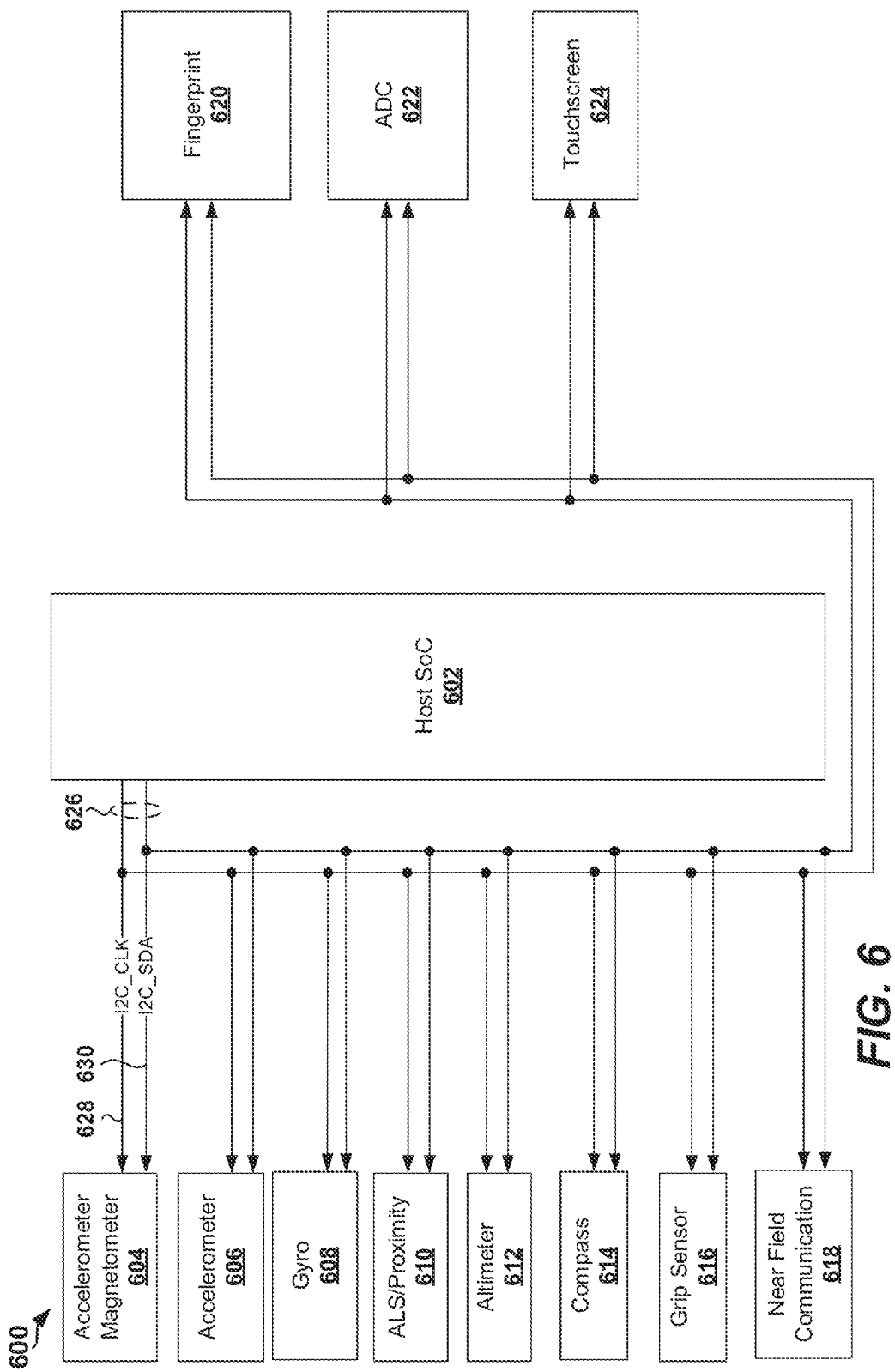
FIG. 6 illustrates an example network in accordance with an aspect of the disclosure.

FIG. 6 illustrates a block diagram of an example GPIO network 600 in accordance with various aspects of the disclosure. As shown in FIG. 6, the GPIO network 600 implements an I3C bus 626, where the I3C bus 626 includes a clock lead 628 and a data lead 630. As shown in FIG. 6, a host device 602 (e.g., host SoC) is coupled to a number of peripheral devices via the I3C bus 626. For example, as shown in FIG. 6, the peripheral devices may include an accelerometer and magnetometer 604, an accelerometer 606, a gyro sensor 608, an ambient light sensor (ALS) and proximity sensor 610, an altimeter 612, a compass 614, a grip sensor 616, a near field communication device 618, a fingerprint sensor 620, an analog to digital converter 622, and/or a touchscreen 624. The I3C communication protocol improves on the I2C communication protocol with the inclusion of in-band interrupts (DRI). As such, and as seen in FIG. 6, dedicated pins and/or interconnects for communicating hardware events may be eliminated, thereby providing pin savings on the host device 602 and the peripheral devices. The previously discussed hardware events (e.g., enables and resets) and GPIO signals may be converted into I3C messages, but often with overhead. For example, a CPU of the host device may need to be involved to create/extract messages, which may add latency and increase power consumption. Moreover, identification of GPIO signals/messages is not standardized in the I3C protocol.

Figure 7:
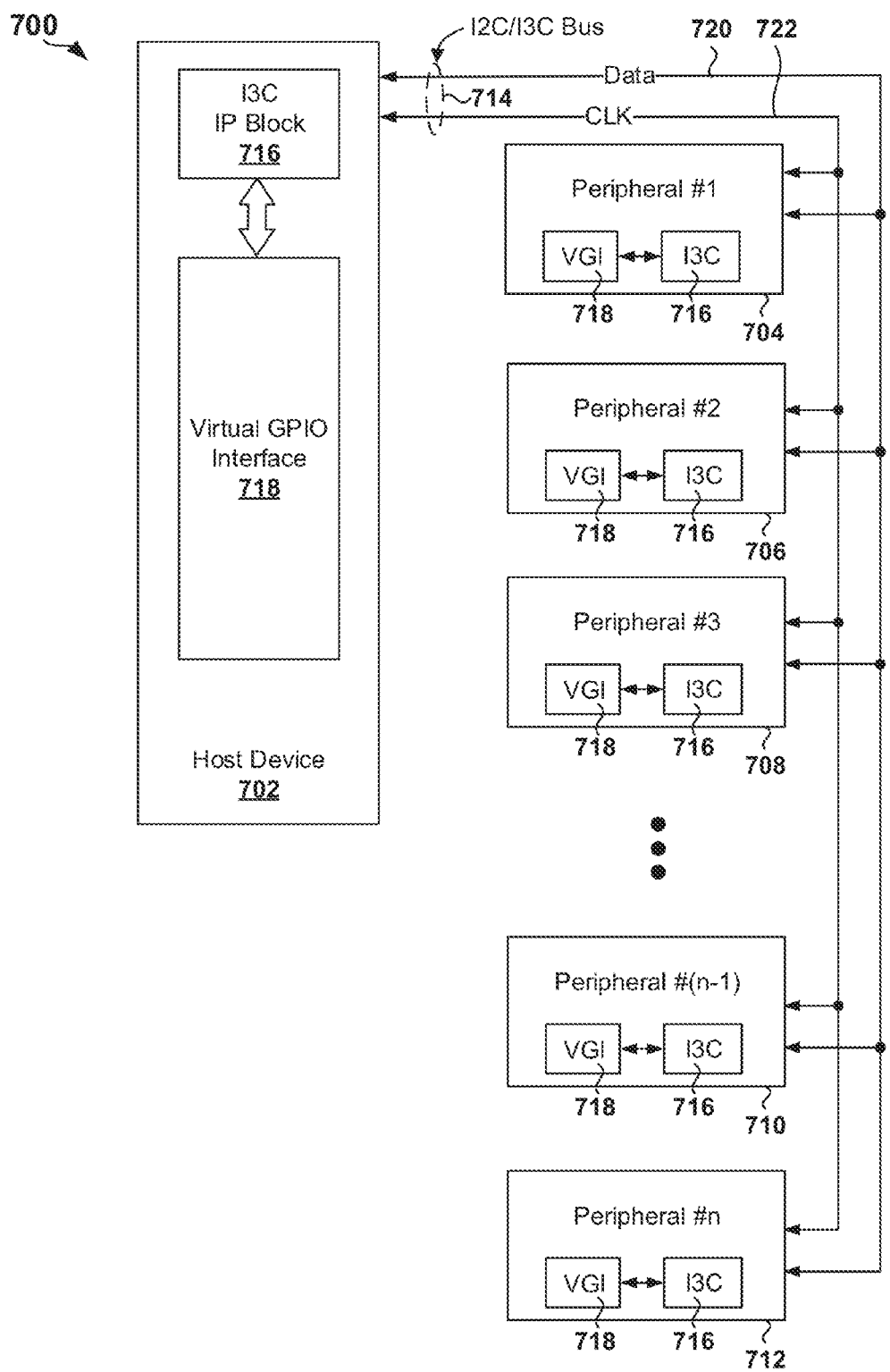
FIG. 7 illustrates an example network in accordance with an aspect of the disclosure.

FIG. 7 shows an example network 700 in accordance with various aspects of the disclosure. The network 700 includes a host device 702 and an n number of peripheral devices (e.g., peripheral device #1 704, peripheral device #2 706, peripheral device #3 708, peripheral device #(n−1) 710, and peripheral device #n 712). The host device 702 is coupled to the n number of peripheral devices via the I2C/I3C bus 714, which includes a data lead 720 and a clock lead 722 as known in the I2C/I3C arts. It should be noted that the host device 702 in the example network 700 does not require any GPIO pins. Similarly, no corresponding GPIO pins are necessary for the n number of peripheral devices 704, 706, 708, 710, and 712. Such elimination of GPIO pins may provide a significant reduction in packaging costs. As shown in FIG. 7, the host device 702 and the peripheral devices 704, 706, 708, 710, and 712 may each include a virtual GPIO interface finite state machine (VGI FSM) 718 that provides virtual GPIO data to a corresponding I3C interface 716. In alternative implementations, I3C interface 716 may be an I2C interface 716. The I3C interface 716 may thus also be designated as an I2C/I3C interface 716 to encompass these various implementations.

Figure 8:
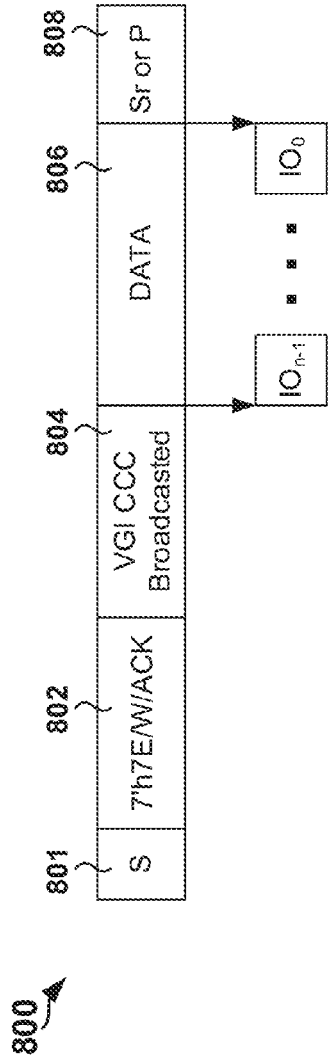
FIG. 8 illustrates an example broadcast frame.

Each I2C/I3C interface 716 may initiate a transmission of an I2C/I3C frame using the I2C/I3C protocols. However, to signal that an I2C/I3C frame includes VGPIO data, each I2C/I3C interface 716 may use a special command code to identify the frame as a VGPIO frame. An I2C/I3C VGPIO frame may be a broadcast frame or an addressed frame as known in the I2C/I3C arts. An example broadcast frame 800 is shown in FIG. 8. The broadcast frame 800 begins with start bit S 801 and a start header 802. A VGI broadcast command code (CC) 804 may indicate that the frame 800 is an I2C/I3C VGI broadcast frame. A VGPIO data payload 806 may include n virtual GPIO signals, ranging from a zeroth virtual GPIO signal to an (n−1)th virtual GPIO signal. Referring back to FIG. 7, and as will be explained further herein, each VGI FSM 718 includes a mapping table to map the bit positions of virtual GPIO signals in the VGPIO data payload 806 as if they were received on the conventional GPIO pins discussed with regard to network 100. The "virtual" nature of the VGPIO data payload is thus transparent to each device's processor that interfaces with the corresponding VGI FSM 718 as discussed further herein.

Figure 9:
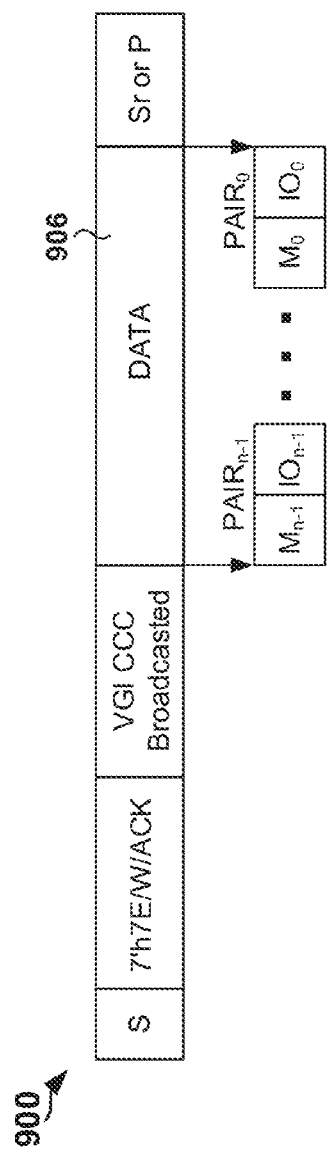
FIG. 9 illustrates an example masked broadcast frame.

Considering again the example of the peripheral device #1 504 in the GPIO network 500, the peripheral device #1 504 may receive I/O signal number 1 and 2 from the host device 502. It may be the case that such the host device 502 may need to change I/O signal number 1 but not disturb the value that the peripheral device #1 504 has for I/O signal number 2. In such a case, the broadcast frame 800 may be replaced with a masked broadcast frame 900 as shown in FIG. 9. For example, the VGI FSM 718 in the host device 702 of network 700 may trigger the transmission of masked broadcast frame 900 over the I2C/I3C bus 714. In this example, all of the I/O signals would be masked but for I/O signal number 1 for the peripheral device #1 704. To do so, the n I/O signals in the data payload 906 for masked broadcast frame 900 may be organized with corresponding mask bits, ranging from a zeroth mask bit $M_0$ for the zeroth I/O signal $IO_0$ to an (n−1)th mask bit $M_{n-1}$ for the (n−1) I/O signal $IO_{n-1}$. Regardless of whether a broadcast frame is masked or not, a broadcast frame may end with a stop bit, such as the stop bit 808 as shown for broadcast frame 800. Alternatively, stop bit 808 may be replaced by a synchronization bit so that additional VGPIO payloads may be included.

In alternative implementations, each VGI FSM 718 may trigger a directed (addressed) I2C/I3C VGPIO frame, such as the directed frame 1000 shown in FIG. 10. The directed frame 1000 begins with start bit S 1002 and a start header 1004. A VGI directed common command code (CCC) 1006 may indicate that the directed frame 1000 includes a directed VGPIO data payload (e.g., directed VGPIO data payload 1012, directed VGPIO data payload 1018). The VGI directed common command code (CCC) 1006 may be followed by a repeated start field (Sr) 1008 and a slave address field 1010 to identify the addressed peripheral device (or alternatively, an address field for the host device 702). The directed VGPIO data payload 1012 is different from a broadcast data payload in that the directed VGPIO data payload 1012 may only include the set of y I/O signals that pertain to the addressed device. For example, the variable y may be a positive integer. As shown in FIG. 10, the directed VGPIO data payload 1012 may include the zeroth I/O signal 1020 to the (y−1)th I/O signal 1022. The directed frame 1000 may include additional directed payloads for additional devices. For example, the directed VGPIO data payload 1012 may be followed by another repeated start field (Sr) 1014 and an additional slave address field 1016. In this case, the addressed device may support a set of x I/O signals, where x is a positive integer. Therefore, the corresponding directed VGPIO data payload 1018 would include only the x I/O signals, in contrast to the full set of n I/O signals in broadcast VGPIO data payload 806 of broadcast frame 800. As shown in FIG. 10, the directed VGPIO data payload 1018 may include the zeroth I/O signal 1024 to the (x−1)th I/O signal 1026. The directed frame 1000 may end with a stop bit, such as the stop bit 1028 as shown for the directed frame 1000.

As discussed analogously with regard to masked broadcast frame 900, the directed frame 1000 may be replaced by a masked directed frame. FIG. 11 shows an example masked directed frame 1100. The masked directed frame 1100 begins with start bit S 1102 and a start header 1104. A VGI directed common command code (CCC) 1106 may indicate that the masked directed frame 1100 includes a masked directed VGPIO data payload 1112. The VGI directed common command code (CCC) 1106 may be followed by a repeated start field (Sr) 1108 and a slave address field 1110 to identify the addressed peripheral device (or alternatively, an address field for the host device 702). The masked directed VGPIO data payload 1106 is intended for a device that supports y I/O signals, where the variable y represents a positive integer. Therefore, as shown in FIG. 11, the masked directed VGPIO data payload 1106 may include a set of y corresponding mask signals, such as the zeroth mask signal $M_0$ 1116 corresponding to the zeroth I/O signal 1114 to the (y−1)th mask signal $M_{y-1}$ 1120 corresponding to the (y−1)th I/O signal 1118. The masked directed frame 1100 may end with a stop bit, such as the stop bit 1122 as shown for the masked directed frame 1100.

Figure 12:
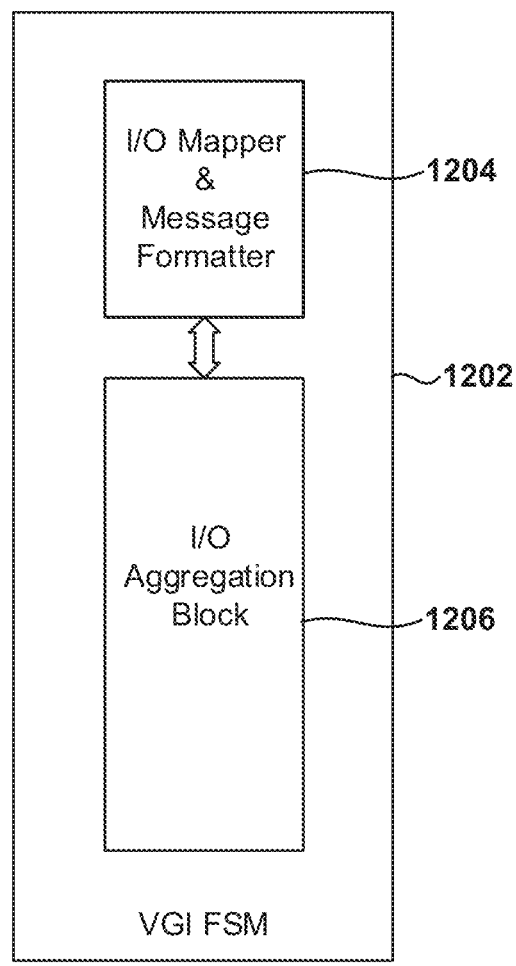
FIG. 12 illustrates details of an example VGI finite state machine (FSM).

FIG. 12 shows an example configuration of the VGI FSM 718 previously discussed with respect to FIG. 7. An I/O mapper and message formatter logic circuit 1204 is configured to map GPIO signals (also referred to as I/O signals) into bit positions in a virtual GPIO payload as discussed previously. An example I/O mapping table 1300 for use by the I/O mapper and message formatter logic circuit 1204 is shown in FIG. 13. The I/O mapping table 1300 may include a number of host I/O numbers 1302, corresponding peripheral I/O numbers 1304, and corresponding peripheral addresses 1306. In an aspect, the I/O mapping table 1300 may be used for mapping I/O signals in a directed I2C/I3C VGPIO frame 1000 or masked directed I2C/I3C VGPIO frame 1100. It should be understood that the peripheral addresses 1306 may not be necessary if only broadcast I2C/I3C VGPIO frames are used. In an aspect, the I/O mapping table 1300 may follow the example GPIO signaling discussed with regard to the GPIO network 500. For example, with regard to row 1308 in the I/O mapping table 1300, the peripheral device #1 504 at address 0x01 transmits an I/O signal 1 (also referred to as a GPIO signal 1) over a GPIO pin 1 which is received at a pin 3 at the host device 502 as an I/O signal 3 at the host device 502. Similarly, with regard to row 1310 in the I/O mapping table 1300, an I/O signal 2 from a GPIO pin 2 of the peripheral device #1 504 is received at a GPIO pin 4 at the host device 502 as an I/O signal 4. In FIG. 13, it should be noted that the host I/Os 3 and 4 map to corresponding I/Os 1 and 2 for peripheral device #1 704 of network 700, where the peripheral device #1 704 is assigned a peripheral address of 0x01. In this fashion, each I/O signal may be identified at each device through mapping table 1300. It should be understood that the I/Os being mapped between the host device and a peripheral device do not need to involve a sequential set of GPIO pins. For example, as indicated in row 1312 of FIG. 13, I/O 9 is followed by I/O 11 (e.g., I/O 10 is not mapped to a corresponding I/O at the peripheral device). It should be further understood that one or more I/Os may be used for other purposes and may not be mapped, such as I/O 17 550 in FIG. 5. Moreover, additional I/Os of the host may be mapped to I/Os of peripherals as indicated by the variables N and k in row 1314 in FIG. 13. In other words, the aspects of FIG. 13 are not limited to the example set of 16 I/Os indicated in I/O mapping table 1300.

In response to a changed state of an I/O signal, a particular VGI FSM 718 in FIG. 7 may need to change the state of another I/O signal. For example, in one case, the changed state (e.g., a change from a logic '1' to a logic '0') of the I/O signal 1 from the peripheral device #1 704, which is received as the I/O signal 3 at host device 702, may need to trigger the host device 702 to change the state of the I/O signal 9. As shown in row 1312 of the I/O mapping table 1300, the I/O signal 9 is received as I/O signal 3 at the peripheral device #2 706 having the address 0X02. The aggregation of I/O signals for detection of such changed states may be accommodated by the I/O aggregation block 1206 of FIG. 12. In an aspect, the I/O aggregation block 1206 may be implemented as an I/O aggregation logic circuit.

To set up the I/O mapping table 1300 for each peripheral device (e.g., peripheral device #1 704), the VGI FSM 718 in the host device 702 may initiate a handshaking procedure using a messaging I2C/I3C frame (not illustrated). Should a device (e.g., a peripheral device) be removed from network 700 and replaced by an alternative device, this initiation procedure may be repeated so that all devices in the network 700 are informed of the changed network configuration.

Referring again to network 700, the processor (not illustrated) in the host device 702 and the processors in the peripheral devices (e.g., peripheral devices 704, 706, 708, 710, 712) may interface with the corresponding VGI FSM 718 through a GPIO interface (not illustrated). In this fashion, no software changes are necessary for the processors in that they may function no differently than if they were using actual GPIO pins, such as discussed with regard to the network 500.

Although no software changes are necessary for a processor in a device (e.g., peripheral device #1 704) to enable data transfer with a corresponding VGI FSM 718 in the device, it should be understood that the VGI FSM 718 does not directly transmit and receive VGPIO packets. Instead, the VGPIO payloads from such missing packets are provided in either masked or unmasked forms as discussed with regard to FIGS. 8-11. To enable the VGI FSM 718 to operate without any modifications, an entire VGPIO packet may be encapsulated as the payload for an I2C/I3C frame. Each VGPIO packet includes a header in addition to its data payload. For example, consider the "hybrid" VGPIO packets disclosed in U.S. application Ser. No. 14/533,431, filed Nov. 5, 2014, which is incorporated by reference herein in its entirety. The data payload in a hybrid packet may contain messaging signals as well as VGPIO signals. In contrast to a GPIO signal, a messaging signal is not dedicated to a particular pin on a device. In other words, assorted messages may be transmitted over a dedicated messaging transmit pin. The receiving device, a priori, does not know what the messaging pertains to in contrast to a GPIO signal. For example, a GPIO signal is dedicated to a particular GPIO pin, so the fact that the GPIO signal is received on the corresponding GPIO pin identifies it to the processor. This is not the case for a messaging signal. A messaging signal includes address bits that the receiving processor uses to route the received messaging signal to the appropriate register. For example, universal asynchronous receiver/transmitter (UART) and serial peripheral interface (SPI) are examples of protocols that use messaging signals.

In a hybrid VGPIO system, a VGI FSM is configured to analyze a header for each hybrid VGPIO packet to determine whether the packet contains a VGPIO and/or a messaging signal payload. In addition, the header may identify whether the corresponding packet is a programming packet for changing the default length of the data payload. In that regard, VGPIO signals are all received on a common receive pin in contrast to conventional GPIO signals that are received on individual GPIO pins. In a conventional system, the identity of the GPIO pin identifies the corresponding received GPIO signal, since the GPIO pin is dedicated to the corresponding GPIO signal. Since VGPIO signals also require identification, the receiving VGI FSM does so through the location of the VGPIO signal within the data payload. For example, suppose that the data payload is 8 bits long for a VGPIO packet. The first bit in the payload may be assigned to a first VGPIO signal, the second bit to a second VGPIO signal, and so on such that the eighth bit is assigned to an eighth VGPIO signal. The same locations may be used to identify messaging signals. The transmitting and receiving VGPIO devices, however, need to use the same packet length to successfully implement this bit-position identification scheme. For example, a default packet length may be eight bits. Should a VGPIO system require a longer packet length to accommodate additional VGPIO signals, the header for a VGPIO packet may also signal that the accompanying payload is not a data payload, but instead is a programming payload to assign a new packet length. The receiving VGI FSM may then acknowledge the new packet length using a corresponding header and packet body.

Figure 14A:
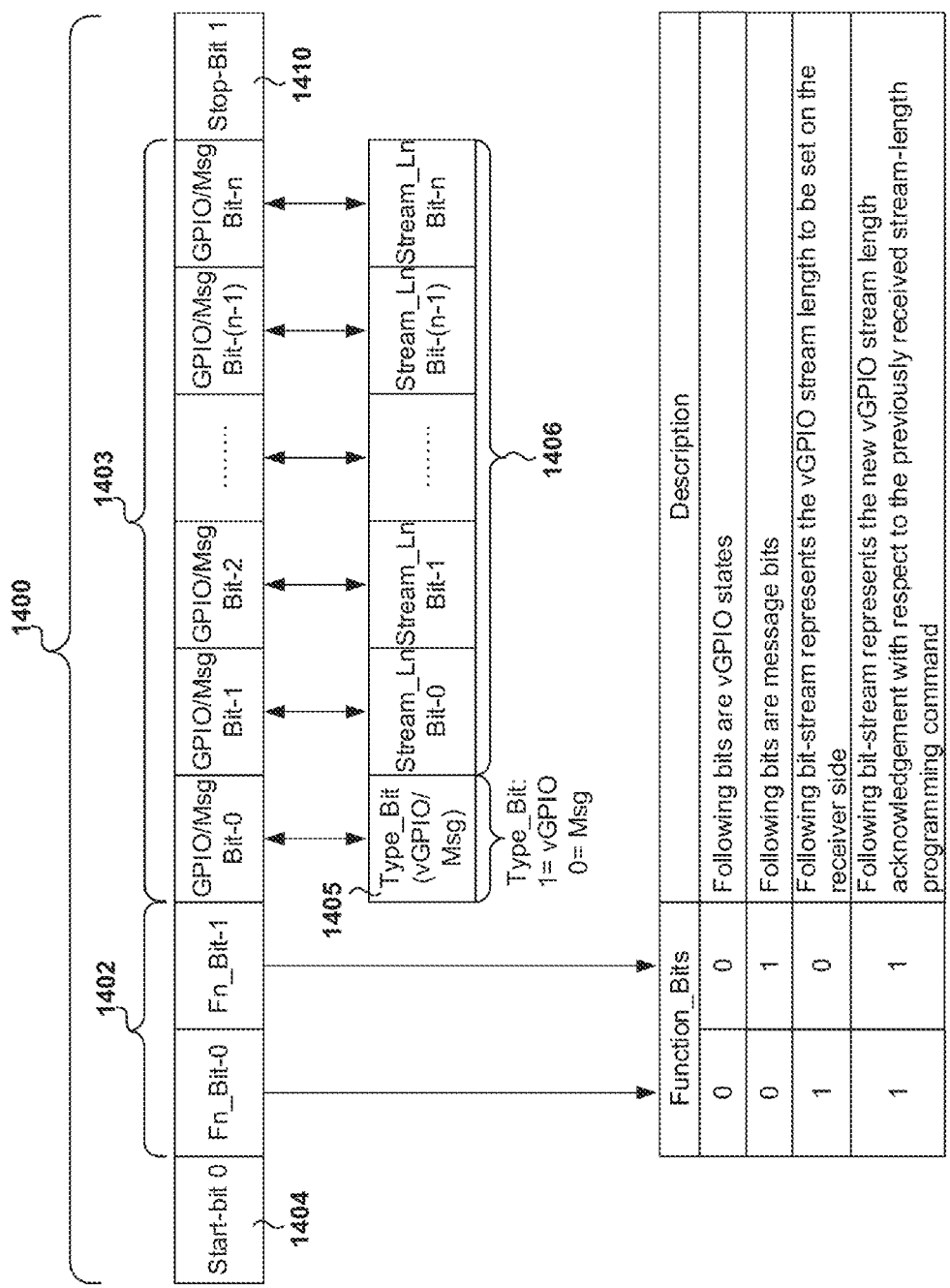
FIG. 14A illustrates an example virtual GPIO interface (VGI) packet.

FIG. 14A shows an example VGI packet 1400 for communication of VGPIO signals or message signals in accordance with various aspects of the disclosure. The VGI packet 1400 begins with a start bit 1404 and ends with a stop bit 1410. For example, start bit 1404 may be a logic '0' (e.g., binary zero) and the stop bit 1410 may be a logic '1' (e.g., binary one). A header 1402 may include two function bits (e.g., Fn_Bit-0 and Fn_Bit-1 in FIG. 14A). Two function bits in a header 1402 (Fn_Bit-0 and Fn_Bit-1) may identify whether the subsequent payload 1403 comprises VGPIO bits or message bits. In one embodiment, if both function bits have a logic value '0', the header 1402 identifies the VGI packet 1400 as containing a VGPIO data payload (e.g., that the following bits are virtual GPIO signals). If Fn_Bit-0 has a logic value 0 and Fn_Bit-1 has a logic value '1', the header 1402 identifies the VGI packet 1400 as containing a messaging data payload (e.g., that the following bits are messaging signals). If Fn_Bit-0 has a logic value '1' and Fn_Bit-1 has a logic value '0', then the following bits represent the virtual GPIO packet length to be expected by the remote processor. If both function bits have a logic value '1', the following bits represent an acknowledgement by the remote processor of the desired packet length. It should be understood that the preceding discussion of coding using two function bits is merely an example and that other headers and coding protocols may be used to identify whether a VGI packet is carrying virtual GPIO signals, messaging signals, an identification of the VGI packet length, an acknowledgment of the VGI packet length. In one embodiment, the VGI packet 1400 may also include a type bit (e.g., the Type_Bit 1405 in FIG. 14A) that is associated with programming and acknowledgement packets. For example, in one embodiment the type bit may be set to a logic value '1' to identify that the VGI packet 1400 is configured for virtual GPIO signals and may be set to a logic value '0' to identify that the VGI packet 1400 is configured for messaging signals.

To program the length of the VGI packet 1400, a transmitting VGI FSM 718 may set Fn_Bit-0 to a logic value '1' and Fn_Bit-1 to a logic value '0' in header 1402. The corresponding data payload (e.g., bits 1406 in FIG. 14A) in the VGI packet 1400 would then identify the new packet length. Should a receiving VGI FSM 718 support this new packet length, such VGI FSM 718 may transmit an acknowledgement VGPIO packet 1400 in which header 1402 has Fn_Bit-0 equaling a logic value '1' and Fn_Bit-1 equaling a logic value '1'. The corresponding data payload (e.g., bits 1406 in FIG. 14A) in such an acknowledgement packet would repeat the packet length identified by the previous programming packet.

It will be appreciated that variations of VGI packet 1400 may be used in alternative embodiments. However, regardless of the variation, the VGI FSM 718 may be preconfigured to decode the header and data payload in such alternative VGI packet. It is thus advantageous to encapsulate the resulting VGI packet into an I2C/I3C frame analogously as discussed with regard to the packaging of VGPIO data (masked or unmasked) within frames 800, 900, 1000, and 1100. For example, a directed I2C/I3C frame 1440 is shown in FIG. 14B. The directed I2C/I3C frame 1440 may begin with a start bit S 1442 and a header 1444. A directed VGI common command code (CCC) 1446 may identify the directed I2C/I3C frame 1440 as being a directed frame carrying an encapsulated VGI packet 1452. Note that the term "VGI" is used instead of the term "VGPIO" with reference to the VGI packet 1452, because the VGI packet 1452 may include a VGPIO data payload or messaging signals. The repeat start field 1448 and a slave device address 1450 may follow the directed VGI CCC 1446. For example, the repeat start field 1448 may include a repeat start condition. The receiving I2C/I3C interface responds to directed VGI CCC 1446 by stripping out encapsulated VGI packet 1452 and forwarding this packet to the associated VGI FSM. In this fashion, the encapsulation is transparent to the VGI FSM, such that it may be advantageously incorporated without hardware modifications to its function. The field 1454 of the directed I2C/I3C frame 1440 may include a stop condition (P) or a repeat start (Sr) condition.

For example, a directed I2C/I3C frame 1460 is shown in FIG. 14C, where the directed I2C/I3C frame 1460 includes multiple slave addresses and corresponding encapsulated VGI packets (e.g., encapsulated VGI packet 1472, encapsulated VGI packet 1478). The directed I2C/I3C frame 1460 may begin with a start bit S 1462 and a header 1464. A directed VGI common command code (CCC) 1466 may identify the directed I2C/I3C frame 1460 as a directed frame with encapsulated VGI packets. As shown in FIG. 14C, the directed I2C/I3C frame 1460 may include a repeated start (Sr) field 1468 that may include a repeat start condition. The directed I2C/I3C frame 1460 may further include a slave device address 1470 followed by an encapsulated VGI packet 1472. As further shown in FIG. 14C, the directed I2C/I3C frame 1460 may further include another repeated start (Sr) field 1474 that may include a repeat start (Sr) condition. Another slave device address 1476 and another encapsulated VGI packet 1478 may follow the repeated start (Sr) field 1474. The field 1479 of the directed I2C/I3C frame 1460 may include a stop condition (P) or a repeat start (Sr) condition.

For example, a broadcast I2C/I3C frame 1480 is shown in FIG. 14D. The broadcast I2C/I3C frame 1480 is analogous to frame 1440 but for the exclusion of a repeated start (Sr) field and a slave device address. Accordingly, the broadcast I2C/I3C frame 1480 may begin with a start bit S 1482 and a header 1484, followed by a broadcast VGI common command code (CCC) 1486 that identifies the broadcast I2C/I3C frame 1480 as being a broadcast frame with an encapsulated VGI packet 1488 as its data payload. In some aspects, an encapsulated VGI packet may contain I/O and mask bits as well as potential configuration bits as per private contracts. The field 1490 of the directed I2C/I3C frame 1480 may include a stop condition (P) or a repeat start (Sr) condition.

Figure 15:
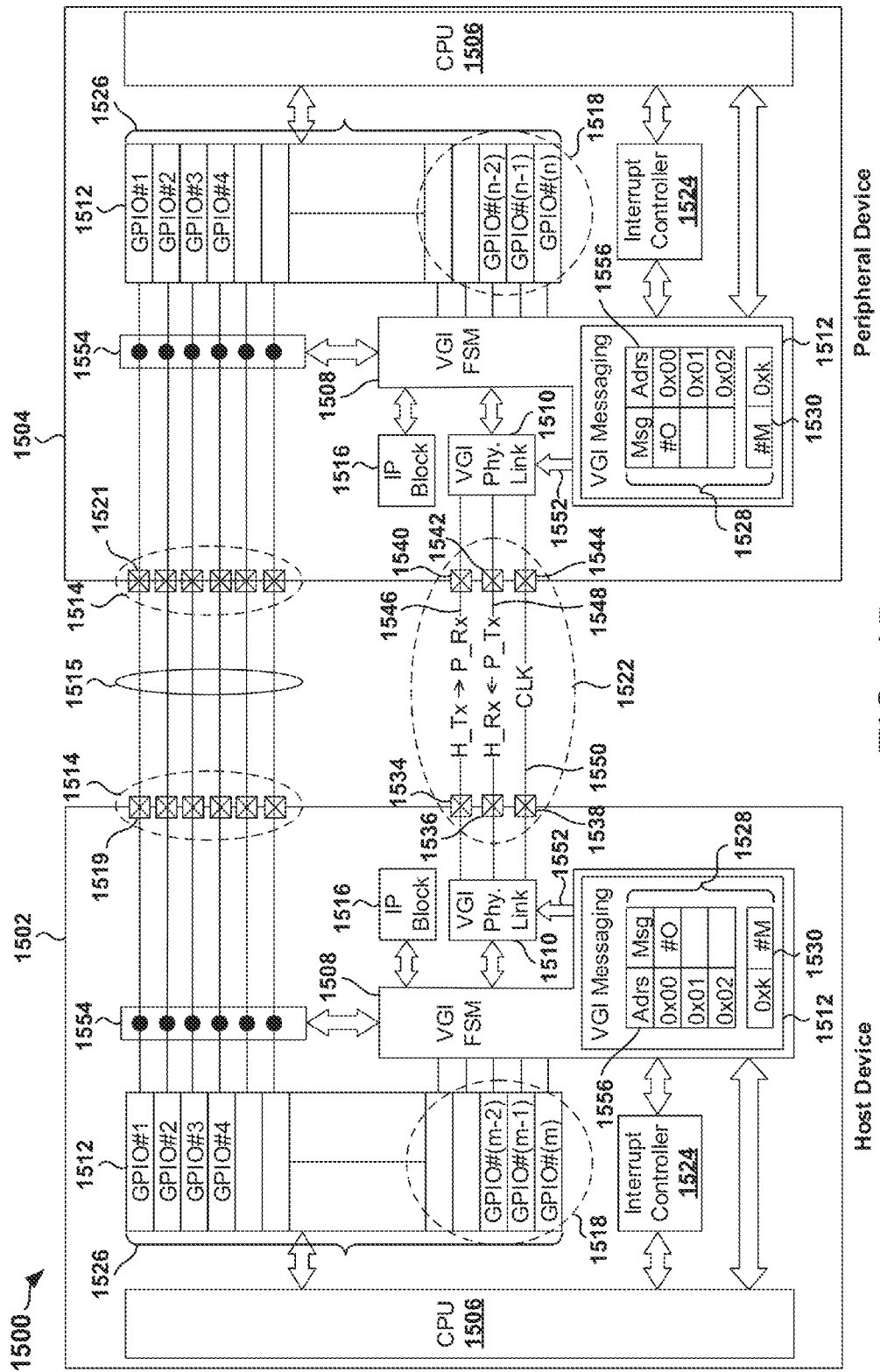
FIG. 15 illustrates a block diagram of an example general purpose input/output (GPIO) network in accordance with various aspects of the disclosure.

FIG. 15 illustrates a block diagram of an example general purpose input/output (GPIO) network 1500 that implements a virtual GPIO interface (VGI) in accordance with various aspects of the disclosure. As shown in FIG. 15, the GPIO network 1500 includes host device 1502 (e.g., a host SoC) and a peripheral device 1504. As previously described, a VGI is a finite state machine (FSM) intellectual property (IP) block which consolidates external GPIOs, internal GPIOs and soft-GPIOs/hardware events, as well as messaging over a synchronous or asynchronous serial link operating in full or half-duplex mode. In an aspect, an external GPIO may be a GPIO that is physically accessible through a pin on a device (e.g., a host SoC or a peripheral device). In an aspect, an internal GPIO may be a GPIO that is part of the internal I/O map but is not accessible through physical pins in a conventional way. In an aspect, a soft GPIO/hardware event may be a GPIO that is mapped to a generic register space inside an IP block on a host device (e.g., host SoC) or peripheral device, and typically involves software or state machine intervention for read/write operations.

With reference to FIG. 15, the host device 1502 includes a CPU 1506, a VGI FSM 1508, a VGI physical link 1510, and a GPIO interface 1512 that includes a number of GPIO registers 1526. In the aspect of FIG. 15, the VGI FSM 1508 is configured to send or receive GPIO signals from GPIO registers 1518 (e.g., internal GPIOs), GPIO signals from physical pins 1514 (e.g., external GPIOs), and/or GPIO signals from the generic IP block 1516 (e.g., soft GPIOs). In an aspect, the VGI FSM 1508 may include a VGI messaging block 1520 for implementing a shared messaging architecture. In such aspect, the host device 1502 and the peripheral device 1504 may exchange messages to and from predefined register locations. The VGI physical link interface 1510 is coupled to the VGI FSM 1508 and serves as an interface for transmitting and receiving I/O signals and VGI messages over the VGI link interface 1522. In an aspect, the VGI link interface 1522 may be a two wire or three wire bus. For example, in the case of a three wire bus as shown in FIG. 15, interconnect 1546 may be configured for transmission of signals from the pin 1534 to the pin 1540, interconnect 1548 may be configured for reception of signals at the pin 1536 from the pin 1542, and the interconnect 1550 coupled to the pins 1538 and 1544 may carry a clock signal. In an aspect, the VGI link interface 1522 may implement the I3C (and/or I2C) protocols. It can be appreciated that the peripheral device 1504 is configured to include features similar to those previously described with respect to the host device 1502.

In an aspect, the VGI physical link 1510 at the host device 1502 may transmit signals to and/or receive signals from the peripheral device 1504 over the VGI link interface 1522. For example, the VGI physical link 1510 may be configured to send and receive I3C (or I2C) messaging signals. As used herein, the phrase "messaging signals" refers to signals that would conventionally be transmitted over a dedicated transmit pin, such as practiced in the Inter-Processor Communication (IPC) or Serial Peripheral Interface (SPI) protocols. Therefore, messaging signals may include an address so that the receiving processor may route the received messaging signal to the appropriate register. In contrast, GPIO signals are conventionally transmitted and received over dedicated pins, such that no addresses need be associated with the GPIO signals. As will be explained further herein, the VGI FSM 1508 serializes GPIO signals into serialized virtual GPIO signals that are transmitted over a common transmit pin. For example, the VGI FSM 1508 at the host device 1502 (or the peripheral device 1504) serializes one or more GPIO signals of the GPIO registers 1526 (herein referred to as virtual GPIO signals) and/or messaging signals 1528 for transmission (e.g., from host device 1502 to peripheral device 1504) on line 1546. With regard to reception, the VGI FSM 1508 at the host device 1502 deserializes the serialized virtual GPIO signals and the received serialized messaging signals. Thus, the VGI FSM 1508 functions as a serializer/deserializer with regard to virtual GPIO signals and messaging signals. Therefore, two devices may each have a VGI FSM 1508 and may agree upon a structure or format for the virtual GPIO signaling. A transmitting and receiving VGI enabled device (e.g., the host device 1502 or the peripheral device 1504) may identify a GPIO signal by its location within a VGI packet that includes a set of virtual GPIO signals.

In an aspect, the VGI physical link 1510 may be configured by the CPU 1506 via the CPU link 1552. For example, during a configuration phase, the CPU 1506 may configure various characteristics of the VGI physical link 1510, such as a slew rate, data transfer speed, etc., via the CPU link 1552. In an aspect, the VGI physical link 1510 may subsequently operate independently of the CPU 1506 based on the configuration received through the CPU link 1552.

In an aspect, the GPIO network 1500 may implement only two pins, such as the transmission pin 1534 and the reception pin 1536, to transmit and receive virtual GPIO signals that would otherwise each need their own dedicated pair of GPIO pins (if the number of GPIO signals is symmetric). For example, the GPIO signal #1 of the GPIO registers 1526 at the host device 1502 may be transmitted from the dedicated GPIO pin 1519 to the dedicated GPIO pin 1521 at the peripheral device 1504. Therefore, conventional approaches would require a number of the physical pins 1514 at the host device 1502 and the peripheral device 1504, along with corresponding interconnects 1515, to communicate GPIO signals between the host device 1502 and the peripheral device 1504.

As shown in FIG. 15, a VGI FSM 1508 may interface directly with a corresponding processor (e.g., the CPU 1506) with regard to receiving and transmitting messaging signals 1528 (e.g., the I3C signals). Since messaging signals 1528 are not GPIO signals, they do not couple through the GPIO interfaces. In an aspect, each VGI FSM 1508 may transmit and receive messaging signals 1528 through its dedicated transmit pin 1534 and receive pin 1536. Therefore, the dedicated transmit pin 1534 and receive pin 1536 may be used for both virtual GPIO signals (e.g., GPIO signals from the GPIO registers 1526 communication over the VGI link interface 1522) and the messaging signals 1528.

In an aspect, it can be appreciated that when GPIO signals from the GPIO registers 1526 are transmitted and/or received over the VGI link interface 1522 as virtual GPIO signals, the physical pins 1514 may be allocated for other purposes. Therefore, the GPIO network 1500 may achieve a significant reduction of pins (e.g., on the host device 1502 and/or the peripheral device 1504) as compared to a conventional GPIO approach in which GPIO signals of the GPIO registers 1526 would each require their own physical pin. As shown in FIG. 15, the VGI FSM 1508 may access the GPIO signals corresponding to the GPIO registers 1526 through the interface 1554.

In an aspect, with reference to FIG. 15, because the GPIO signals of the GPIO registers 1526 may be accessed independently by the VGI FSM 1508 through the GPIO interface 1512, the CPU 1506 corresponding to the VGI FSM 1508 in the host device 1502 (and/or the peripheral device) may be asleep or in another type of dormant state and yet be able to receive the GPIO signals associated with the GPIO registers 1526 as well as the messaging signals 1528. In this fashion, the GPIO network 1500 not only advantageously economizes the number of pins for each GPIO interface 1512, but also reduces power consumption.

The CPU 1506 may need to receive an interrupt signal in response to changes in GPIO signals associated with the GPIO registers 1526 or changes in the messaging signals 1528. With respect to virtual GPIO signals (e.g., serialized GPIO signals of the GPIO registers 1526) and the messaging signals 1528, an interrupt controller 1524 monitors the selected GPIO signals or messaging signals as programmed through interrupt configuration registers (not illustrated). Each GPIO signal of the GPIO registers 1526 may have a corresponding interrupt configuration register. Should a GPIO signal of the GPIO registers 1526 be required to generate an interrupt in response to that signal changing state, the corresponding configuration register would be programmed accordingly. Similarly, should a GPIO signal of the GPIO registers 1526 or messaging signal 1528 be one that does not generate an interrupt regardless of whether that signal has changed state, the corresponding interrupt configuration register would also be programmed accordingly. In some aspects, the interrupt controller 1524 may also include a finite state machine. Thus, similar to the VGI FSM 1508, the interrupt controller 1524 is a low power device and is active regardless of whether its CPU 1506 is in a sleep mode or some other dormant state.

In an aspect, the CPU 1506 of a corresponding VGI FSM 1508 may assign an address to that VGI FSM 1508. Accordingly, the VGI FSM 1508 may be configured to decode an address field 1556 in the messaging signals 1528 so that a given messaging signal 1528 may be stored in a corresponding messaging register (e.g., messaging register 1530). These messaging registers 1530 are each mapped to some offset of the general address for the VGI FSM 1508 within the address space for a corresponding CPU (e.g., the CPU 1506 at the host device or in the peripheral device 1504). In response to an interrupt from the interrupt controller 1524, the CPU 1506 may then access messaging registers 1530 to obtain the appropriate messaging signals 1528. Similar to the virtual GPIO signals previously discussed, the messaging signals 1528 may be subdivided into a transmission set and a receive set. Regardless of whether the architecture is symmetric or asymmetric, the resulting transmission of these transmit sets by the VGI FSM 1508 takes place over a single transmit pin 1534. The transmit set of virtual GPIO signals from one device (e.g., the host device 1502) becomes the receive set of virtual GPIO signals for the remote device (e.g., the peripheral device 1504). Similarly, the transmit set of messaging signals 1528 becomes the receive set of messaging signals 1528 for the remote device (e.g., the peripheral device 1504). The VGI FSM 1508 of the remote device (e.g., the peripheral device 1504) then deserializes the receive set of virtual GPIO signals so that they may be presented in parallel to the GPIO interface 1512 at the remote device.

In an aspect, each VGI FSM 1508 in FIG. 15 may include configuration registers (omitted from FIG. 15 for ease of illustration) that store the previous state for the transmit set of virtual GPIO signals (e.g., serialized GPIO signals of the GPIO registers 1512) and for the messaging signals 1528. In this fashion, each VGI FSM 1508 may monitor the present state of the transmit set of virtual GPIO signals as received from GPIO interface 1512 and only trigger a serial transmission of the corresponding transmit set if the present state has changed with regard to the previous state. In other words, the VGI FSM 1508 may trigger a serial transmission of a transmit set only if one or more of the signals within the transmit set has changed state as detected through the storage of the previous state in configuration registers. Each CPU 1506 knows the addresses for the messaging signal registers 1530 and may thus write into them the desired transmit set and may also read any changes in the receive set. The VGI FSM 1508 monitors whether the transmit set of messaging signals 1528 has changed with respect to their previous transmission and will trigger a transmission of the transmit set to the remote processor accordingly. The interrupt controller 1524 may monitor whether the receive sets have changed as discussed previously and interrupts the corresponding CPU 1506 so that the changed receive set may be processed.

Figure 16A:
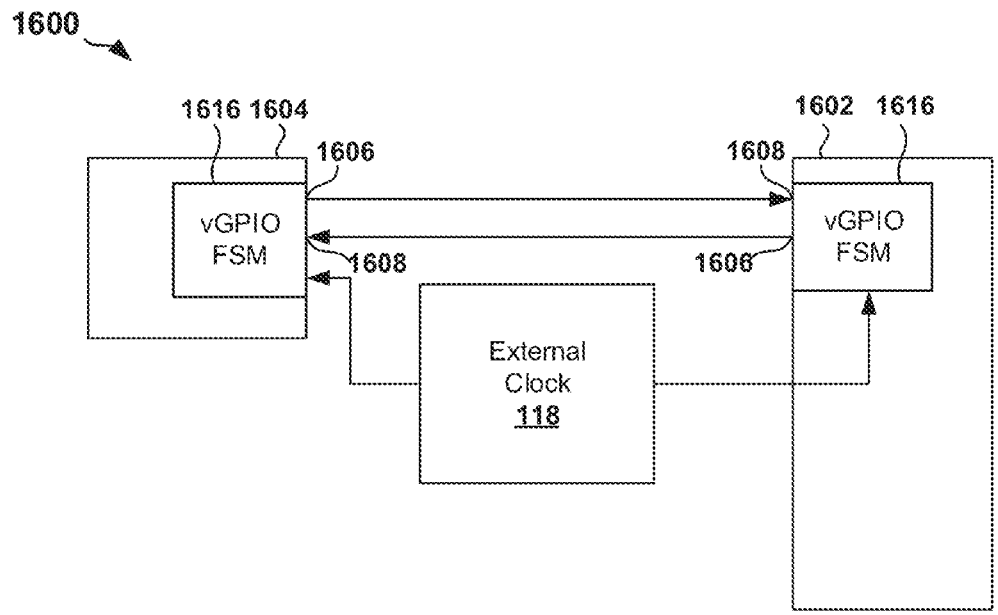
FIG. 16A illustrates a GPIO network in which a host device includes a single VGI FSM for communicating with a remote device.
Figure 16B:
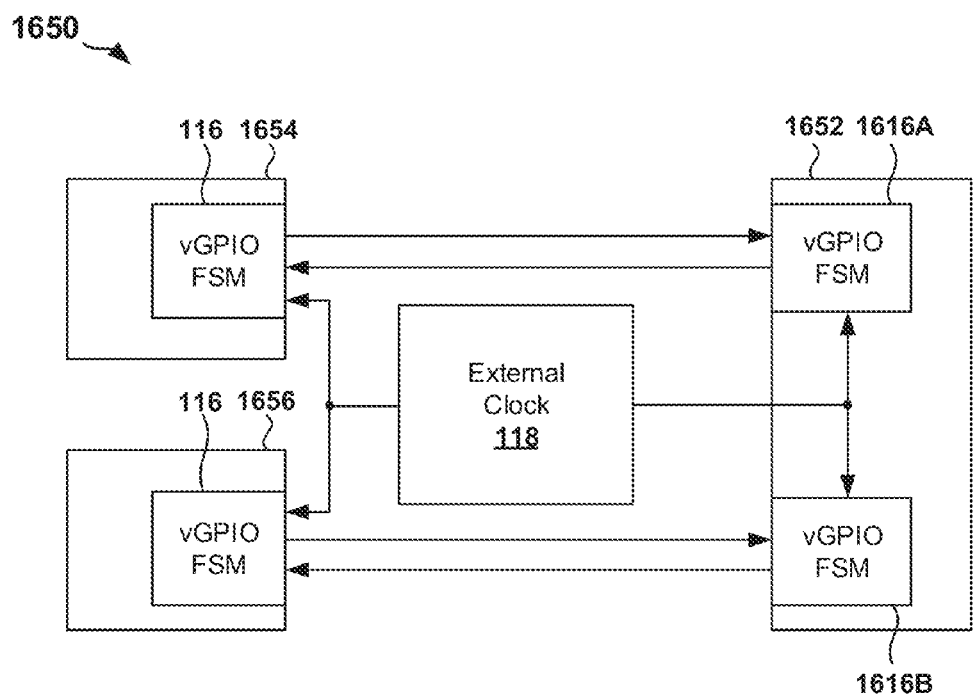
FIG. 16B illustrates a GPIO network in which a host device includes multiple VGI FSMs for communicating with a remote device.

An integrated circuit may include just one VGI FSM 1508 or may include a plurality of these elements for interfacing with multiple external systems. FIG. 16A illustrates a GPIO network 1600 in which a host device 1602 includes a single VGI FSM 1616 for communicating with a remote device 1604, which includes its own VGI FSM 1616. In contrast, a host device 1652 shown in FIG. 16B includes a VGI FSM 1616A and a VGI FSM 1616B for communicating with remote processors in devices 1654 and 1656, respectively. In that regard, an SoC may be configured with as many VGI FSMs as is necessary to accommodate VGI signaling with other SoCs. Regardless of the number of VGI FSMs a CPU may have, each VGI FSM communicates using its own dedicated transmit pin 1606 and a receive pin 1608 as indicated in FIG. 16A.

Figure 17:
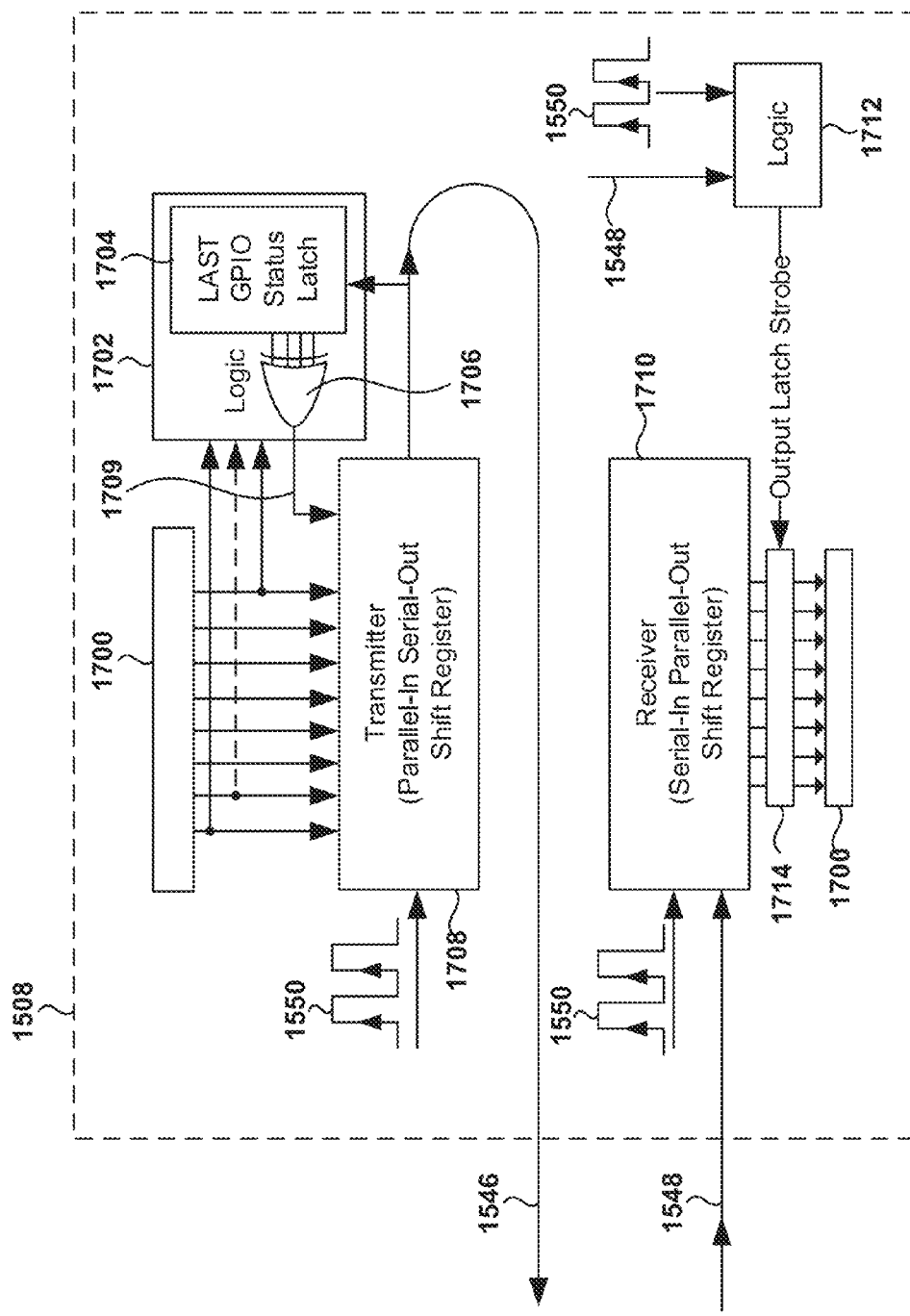
FIG. 17 is a block diagram of a VGI FSM.

As discussed above, each VGI FSM 1508 acts as a serializer/deserializer to serialize each transmit set and to deserialize each receive set. FIG. 17 is a block diagram of an FSM 1508 to better illustrate these operations. The VGI FSM 1508 exchanges the virtual GPIO signals 1518 and messaging signals 1528 with the corresponding CPU 1506 through a multiplexing module 1700. The multiplexing module 1700 interfaces with the corresponding CPU 1506 through GPIO interface 1512 with regard to virtual GPIO signals 1518 and interfaces directly with the corresponding CPU 1506 with regard to messaging signals 1528. In one embodiment, each VGI FSM 1508 includes a logic circuit 1702 that will authorize the transmission of the transmit set of virtual GPIO signals 1518 or the transmit set of messaging signals 1528 over transmit line 1546 only if there has been a change in either transmit set. Logic circuit 1702 thus compares the current state for the transmit set of virtual GPIO signals 1518 (or messaging signals 1528) to the previous state for this set of transmit signals as stored in corresponding configuration registers 1704. For example, logic circuit 1702 may include an XOR gate 1706 to perform this comparison. The multiplexing module 1700 loads the transmit set in parallel into a parallel-in-serial-out (PISO) shift register 1708. If an enable signal 1709 from the XOR gate 1706 goes high (indicating a change between the current state and the previous state for the transmit set), PISO shift register 1708 is enabled to serially shift out its contents onto transmit line 1546 responsive to cycles of external clock 1550.

The VGI FSM 1508 also deserializes a receive set of virtual GPIO signals 1518 or messaging signals 1528 in an analogous fashion using a serial-in-parallel-out (SIPO) shift register 1710. The receive set of virtual GPIO signals 1518 and messaging signals 1528 is generated by the remote CPU and transmitted by the remote CPU onto receive line 1548. This receive set of virtual GPIO signals 1518 (or messaging signals 1528) is successively shifted into SIPO shift register 1710 responsive to cycles of external clock 1550. The VGI FSM 1508 is configured to transmit the transmit set and to receive the receive set of virtual GPIO signals 1518 and messaging signals 1528 in frames having a separate start bit and an end bit as discussed further herein. The previously discussed frames may have a predefined size. In one embodiment, the frame size is determined by a header to be a certain number of bits in length as previously discussed with respect to the VGI packet 1400 discussed with respect to FIG. 14A.

To detect the receipt of a complete frame for the receive set of virtual GPIO signals 1518 or messaging signals 1528, the VGI FSM 1508 may include a logic circuit 1712 as shown in FIG. 17 that counts the necessary number of cycles for external clock 1550 after a receipt of the start bit for the frame. For example, suppose the receive set comprises ten virtual GPIO signals 1518 that are received responsive to ten cycles of external clock 1550. After detection of the start bit and waiting another ten cycles of external clock 1550, logic circuit 1712 would then expect receipt of an end bit. Should the end bit be detected accordingly, logic circuit 1712 may then strobe an output latch 1714 to receive in parallel the receive set of virtual GPIO signals 1518 that had been shifted into SIPO shift register 1710 as a complete frame. The latched receive set of virtual GPIO signals may then be presented to GPIO interface 1512 through multiplexing module 1700. Latching of a received set of messaging signals 1528 occurs analogously although the received set of messaging signals are loaded into messaging signal registers 1528 instead of being routed through GPIO interface 1512.

Referring again to PISO shift register 1708, it can be appreciated that this register is configured to frame the transmit set of virtual GPIO signals 1518 and the messaging signals 1528 with the start and end bits. The transmit set of virtual GPIO signals is thus transmitted in VGI packet 14000 that is demarcated by the start and end bits 1404, 1410. Since the transmit set for a transmitting processor becomes the receive set for the remote CPU, the receive set is also packaged accordingly. This packaging is advantageous in that each CPU can then monitor the health of the remote CPU without needing any additional dedicated pins. For example, each VGI FSM 1508 may be configured to weakly pull its dedicated transmit pin (e.g., pin 1534 at the host device 1502 or the pin 1542 at the peripheral device 1504) to a supply voltage during a default state (no change in the current state versus the previous state for the transmit set of virtual GPIO signals). The start bit would be a logical zero for such an embodiment such that VGI FSM 1508 grounds transmit line 1546 for transmission of the start bit. In this fashion, each VGI FSM 1508 may readily detect receipt of the start bit by detecting that receive line 1548 has been pulled to ground. In one embodiment, the start and stop bits are logical complements of each other. The stop bit would thus be a logic high value if the start bit is a logic zero. The payload of the VGI packet may then extend from the type bit to a stop bit 1410 that demarcates the packet end.

There is a possibility that a CPU may have failed such that it inappropriately pulls its transmit line 1546 to ground. The remote processor would thus detect this as a start bit and logic circuit 1712 would begin counting toward the end of the VGI packet accordingly. However, if the end bit is a logic one, then each VGI FSM 1508 charges transmit line 1546 to the supply voltage to signal the end of a frame transmission. If a CPU has failed such that the remote VGI FSM 1508 has detected what is deemed to be a start bit, logic circuit 1712 will not detect the end bit and will notify its processor of the failure of the remote processor accordingly.

To allow sufficient setup time for reception, transmission of the VGI packet 1400 should take place with regard to a first clock edge and reception with regard to a remaining clock edge. For example, the bits in PISO shift register 1708 may be shifted out for transmission on transmit line 1546 responsive to the falling edges or negative edges for external clock 1550. Conversely, received bits on receive line 1548 may be shifted into SIPO shift register 1710 responsive to the rising edges or positive edges of clock 1550.

For one processor to detect an inactive state in the remote processor, each VGI FSM 1508 may be configured to weakly pull its transmit line high in a default state (in which there are no frames to transmit). As discussed previously, the start and stop bits have opposite logical states. A start bit 1404 for VGI packet 1400 of FIG. 14A may thus have a logic value '0' (ground) such that transmit line 1546 is pulled low for its transmission, whereas a stop bit 1406 may be a logic value '1' such that the transmit line 1546 is pulled high to a power supply voltage for its transmission. Referring again to FIG. 17, logic circuit 1712 is configured to monitor receive line 1548 with respect to the rising edges on external clock 1550. A default logic state of a no-frame transmission is indicated by receive line 1548 simply remaining high because of its weak pull-up as discussed earlier. Should logic circuit 1712 detect at one of rising edges for external clock 1550 that receive line 1548 has been pulled low (indicating the zero value of start bit 1404), logic circuit 1712 waits for a sufficient number of clock cycles according to the predefined size of VGI packet 1400 to then detect the logic high value of stop bit 1410. Receipt of stop bit 1410 indicates to logic circuit 1712 that a complete VGI packet 1400 has been fully shifted into SIPO shift register 1710. At that point, logic circuit 1712 strobes SIPO shift register 1710 so that the received frame is provided in parallel to multiplexing module 1700 through latch 1714. The receive set of virtual GPIO signals (or messaging signals 1528) may then be provided to the processor core accordingly through GPIO interface 1512.

A relatively slow external clock 1550, such as a 32 KHz sleep clock, may be ample for the signaling requirements of IPC. For example, suppose that the minimum setup and hold requirements for the transmission of the virtual GPIO signals 1518 and the messaging signals 1528 is two nanoseconds each and that the maximum expected lead or lag for receipt of the external clock 1550 at a VGI FSM 1508 is six nanoseconds. It can be readily shown that the resulting maximum frequency for external clock 1550 would be 62 MHz. A 32 KHz frequency, such as from a sleep clock, would thus provide very large margins of safety for such an embodiment.

Figure 18:
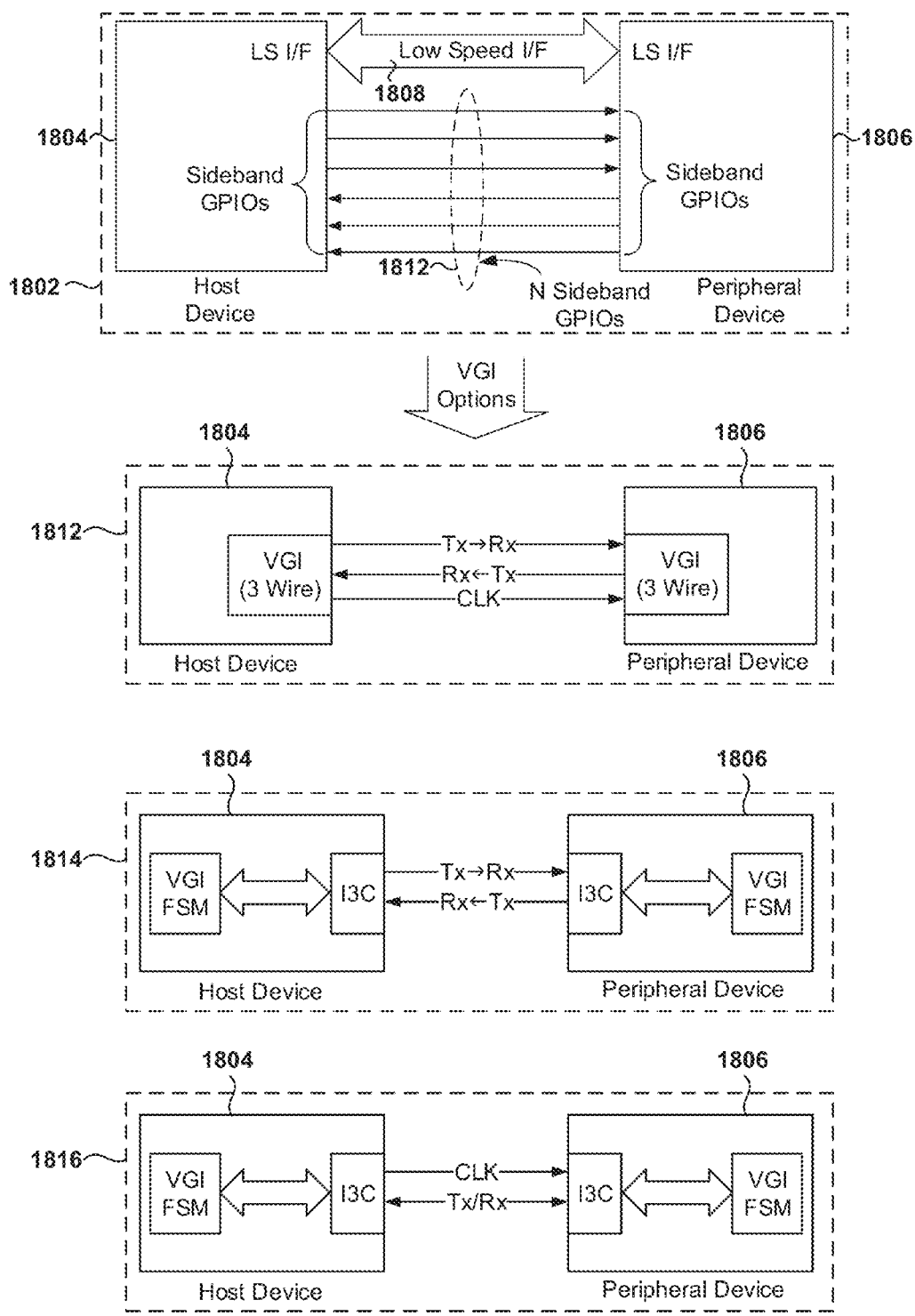
FIG. 18 is a diagram illustrating example VGI implementations.

FIG. 18 is a diagram illustrating example VGI implementations. FIG. 18 shows an example configuration 1802 that includes a host device 1804 (e.g., host SoC) coupled to a peripheral device 1806. The host device 1804 and the peripheral device 1806 may transfer signals thorough a low speed (LS) interface (I/F) 1808 and may transfer an N number of sideband GPIOs. In a first example VGI implementation, as shown in the configuration 1812, a host device and a peripheral device are coupled using a three-wire synchronous full-duplex VGI implementation. In a second example VGI implementation, as shown in the configuration 1814, a host device and a peripheral device are coupled using a two-wire asynchronous full-duplex VGI implementation. In the configuration 1814, the host device and the peripheral device each include a VGI FSM that can make use of a generic physical link, such as an I3C physical link. The configuration 1814 may enable NRZ messaging (UART), embedded GPIOs/interrupts, and/or in-band flow-control. In a third example VGI implementation, as shown in the configuration 1816, a host device and a peripheral device are coupled using a two wire (2 W) synchronous half-duplex VGI implementation. In the configuration 1816, the host device and the peripheral device each include a VGI FSM that can make use of a generic physical link, such as an I3C physical link.

Figure 19:
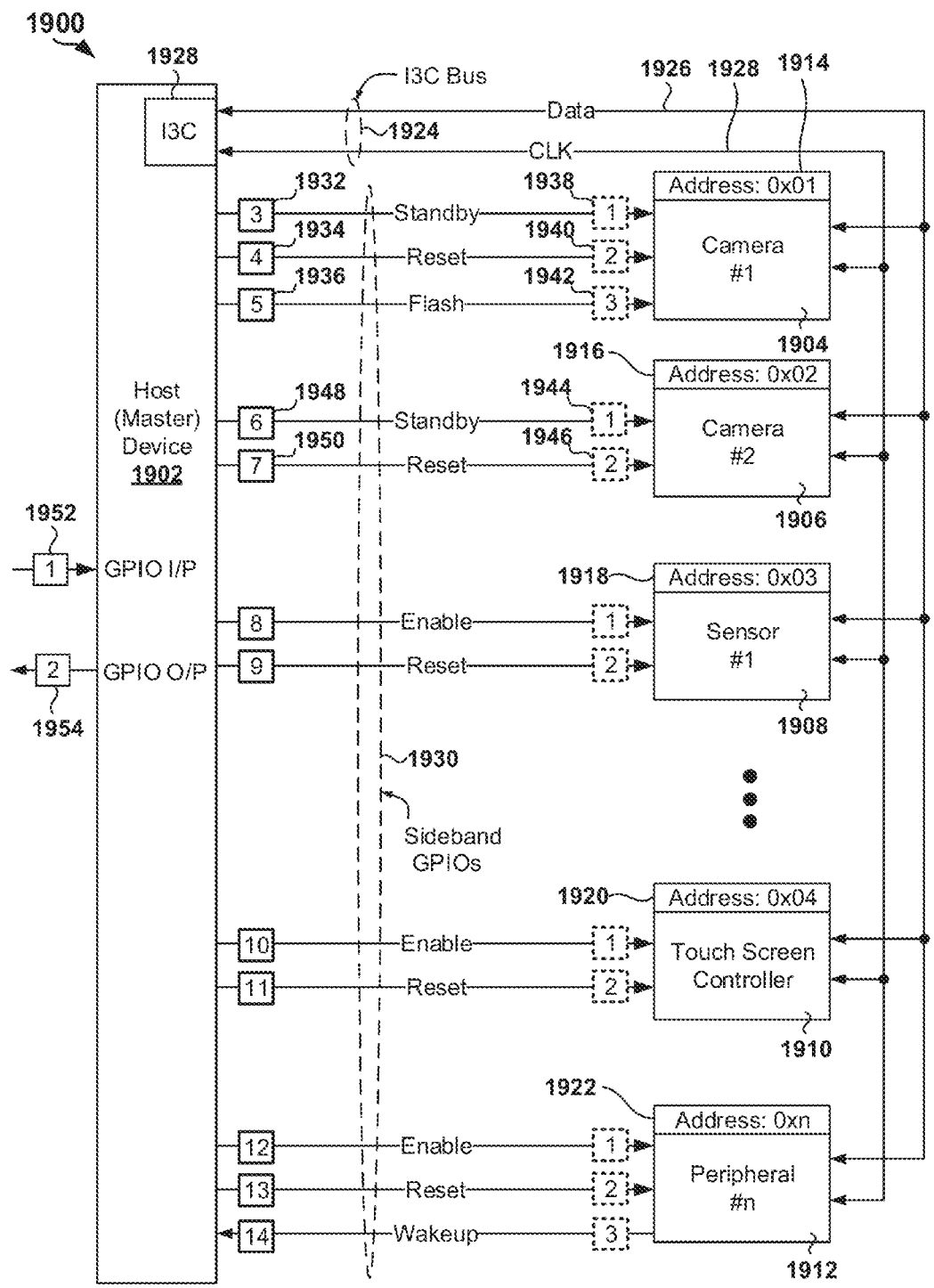
FIG. 19 illustrates a block diagram of an example general purpose input/output (GPIO) network.

FIG. 19 illustrates a block diagram of an example general purpose input/output (GPIO) network 1900. A host device 1902 (e.g., a host SoC) includes a plurality of GPIO pins for interfacing with corresponding GPIO pins on a plurality of n peripheral devices (e.g., camera #1 1904, camera #2 1906, sensor #1 1908, touch screen controller 1910, and peripheral device #n 1912), where n is a positive integer greater than one. In an aspect, each of the n peripheral devices may have an assigned address, such as the addresses 1914, 1916, 1918, 1920, and 1920 assigned to the corresponding n peripheral devices in FIG. 19. For example, the peripheral device 1904 may have an address 0x01 and the peripheral device 1906 may have an address 0x02. In the example configuration of FIG. 19, the camera #1 1904 may receive three GPIO signals from the host device 1902. For example, and as shown in FIG. 19, the camera #1 1904 has three pins, such as the pin 1 1938, the pin 2 1940, and the pin 3 1942 for receiving corresponding GPIO signals from the pin 3 1932, the pin 4 1934, and the pin 5 1936 of the host device 1902. In the example of FIG. 19, the GPIO signal received at the pin 1 1938 may be a standby signal, the GPIO signal received at the pin 2 1940 may be a reset signal, and the GPIO signal received at the pin 3 1942 may be a flash signal. As another example, and as shown in FIG. 19, the camera #2 1906 has two pins, such as the pin 1 1944 and the pin 2 1946 for receiving corresponding GPIO signals from the pin 6 1948 and the pin 7 1936 of the host device 1902. In the example of FIG. 19, the GPIO signal received at the pin 1 1944 may be a standby signal and the GPIO signal received at the pin 2 1946 may be a reset signal. The remaining peripheral devices (e.g., the sensor #1 190, the touch screen controller 1910, and the peripheral #n 1912) may similarly receive GPIO signals from the host device 1902 at their corresponding pins as shown in FIG. 19. With respect to FIG. 19, such GPIO signals are collectively termed sideband GPIO signals 1930. In an aspect, the host device 1902 may include a GPIO input pin 1 1952 and a GPIO output pin 2 1954. The host device 1902 may further include an I3C interface 1928 (also referred to as an I3C port) for communicating over the I3C bus 1924 to corresponding I3C interfaces (not shown in FIG. 19) in the n peripheral devices (e.g., camera #1 1904, camera #2 1906, sensor #1 1908, touch screen controller 1910, and peripheral device #n 1912). In an aspect, the I3C bus 1924 may include the data lead 1926 and the clock lead 1928. In an aspect of the present disclosure, the hardware events associated with the pins (e.g., pins 3 through 14) on the host device 1902 may be converted into I3C messages. As described below with reference to FIG. 20, an I/O mapping table (also referred to as a host table) may be created to map the correspondence between hardware events and the I/O of the destination peripheral.

FIG. 20 is an I/O mapping table 2000 for mapping I/Os of a host device to I/Os of peripherals. For example, as shown in FIG. 20, the I/O mapping table 2000 includes a first column 2002 indicating the I/Os of a host device, a second column 2004 indicating signal transfer directions (e.g., output (O/P) or input (I/P)) with respect to the host device, a third column 2006 indicating addresses of peripheral devices, a fourth column 2008 indicating I/O numbers of peripheral devices, a fifth column 2010 indicating parameters corresponding to I/Os of peripheral devices, and a sixth column 2012 indicating locations of I/Os in broadcast output packets from the host device. For example, the I/Os of a host device may be the pins 1-14 of the host device 1902 in FIG. 19. In such example, fourth column 2008 indicating I/O numbers of peripheral devices may include the I/Os of the peripheral devices that correspond to the host I/Os 1-14. Therefore, the I/O mapping of the I/O mapping table 2000 may establish a one to one association between the I/Os of the host device and the I/Os of the peripheral devices. A host device (e.g., the host device 1902) may maintain this mapping in a separate table. In an aspect, the I/O mapping table 2000 may be shared with every peripheral device on the bus (e.g., I3C bus) by a private contract between the host device and the peripheral devices. In an aspect, inputs may be managed using IBI and private contract exchange, or via a read operation as shown in the directed read operation.

Figure 21:
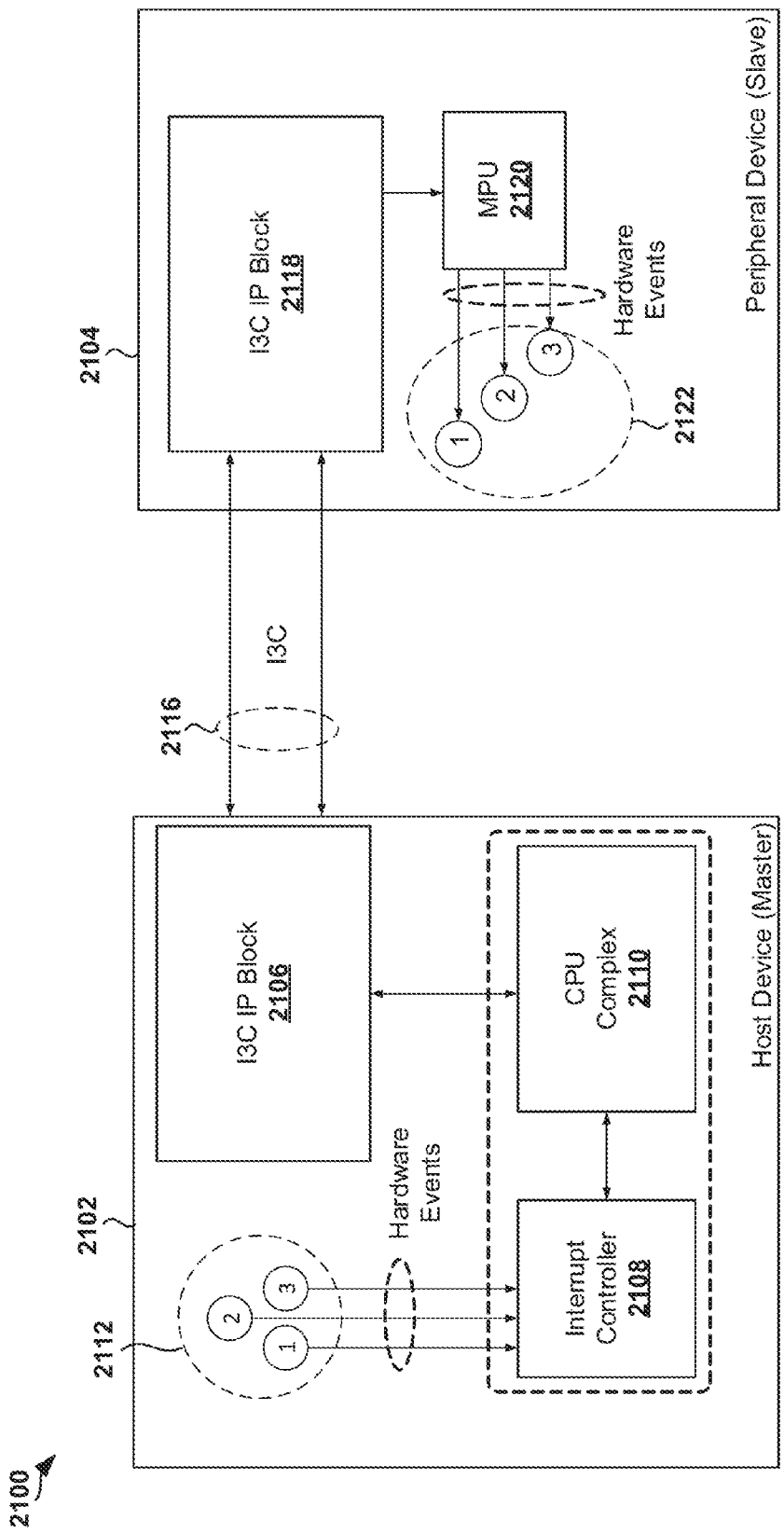
FIG. 21 illustrates a block diagram of an example general purpose input/output (GPIO) network.

FIG. 21 illustrates a block diagram of an example general purpose input/output (GPIO) network 2100. The GPIO network 2100 includes a host device 2102 and a peripheral device 2104. As shown in FIG. 21, the host device 2102 is in communication with the peripheral device 2104 via the I3C bus 2116. For example, the I3C bus 2116 may be a two wire bus that includes a lead for data and a lead for a clock signal. In the configuration of FIG. 21, hardware events (e.g., labeled as "1", "2", and "3" in the region 2112) originating in the host device 2102 may be received by the interrupt controller 2108. For example, the hardware events 2112 may be internal hardware events (e.g., internal register accessible bits). In other aspects, external hardware events (e.g., externally accessible pins) are possible. The interrupt controller 2108 may communicate the hardware events to the CPU complex 2110 so that the CPU complex 2110 may generate register mapped I3C packets for transmission to the peripheral device 2104. For example, such register mapped I3C packets may be transmitted to the peripheral device 2104 via the I3C IP block 2106 of the host device 2102 and the I3C bus 2116. The peripheral device 2104 may receive the register mapped I3C packets at the I3C IP block 2118, which may provide the register mapped I3C packets to the MPU 2120. The MPU 2120 may then identify the hardware events (e.g., labeled as "1", "2", and "3" in the region 2122).

Figure 22:
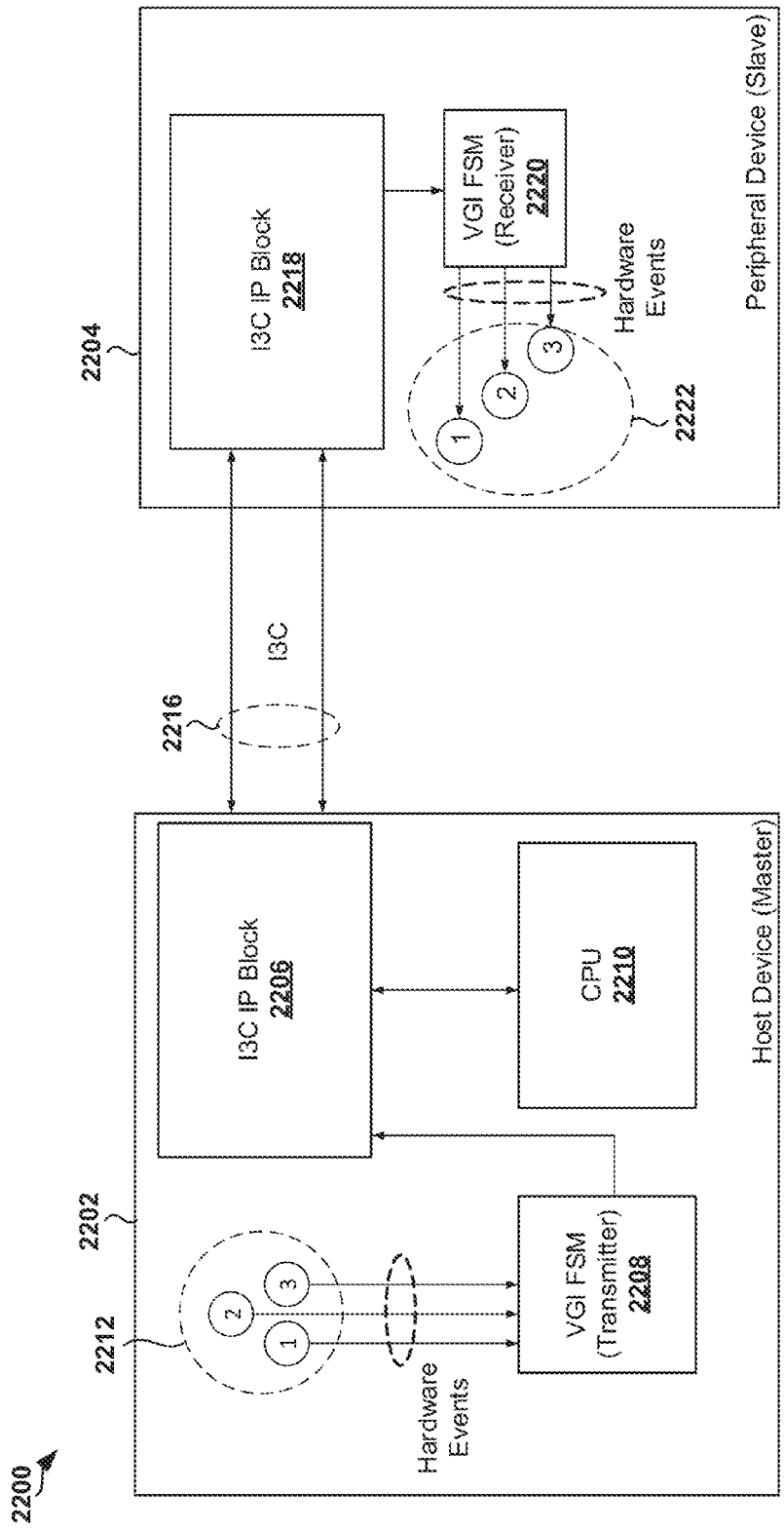
FIG. 22 illustrates a block diagram of an example general purpose input/output (GPIO) network in accordance with various aspects of the disclosure.

FIG. 22 illustrates a block diagram of an example general purpose input/output (GPIO) network 2200 in accordance with various aspects of the disclosure. The GPIO network 2200 includes a host device 2202 and a peripheral device 2204. As shown in FIG. 22, the host device 2202 is in communication with the peripheral device 2204 via the I3C bus 2216. In the configuration of FIG. 22, hardware events (e.g., labeled as "1", "2", and "3" in the region 2212) originating in the host device 2202 may be received by the VGI FSM 2208. For example, the hardware events 2212 may be internal hardware events (e.g., internal register accessible bits). In other aspects, external hardware events (e.g., externally accessible pins) are possible. The VGI FSM 2208 may generate VGI packets that include the hardware events for transmission to the peripheral device 2204. For example, such VGI packets may be transmitted to the peripheral device 2204 via the I3C IP block 2206 of the host device 2202 and the I3C bus 2216. The peripheral device 2204 may receive the VGI packets at the I3C IP block 2218, which may provide the VGI packets to the VGI FSM 2220. The VGI FSM 2220 may then identify the hardware events (e.g., labeled as "1", "2", and "3" in the region 2222). It should be noted that in the configuration of FIG. 22, the VGI FSM 2208 may generate and transmit the VGI packets without involvement (e.g., without waking up to generate VGI packets) of the CPU 2210 in the host device 2202, whereas the configuration of FIG. 21 requires involvement (e.g., waking up to generate VGI packets) of the CPU 2110 in the host device 2102 to generate and transmit the VGI packets.

While the VGI protocol and the VGI over I3C protocol may enable I/O state transfer features in masked and non-masked modes using directed and broadcast configurations, the aspects described herein include approaches for transmitting electrical configurations for an I/O pin (such as drive strength, polarity, slew rate etc.). As discussed herein, various I/O configuration protocols for mapped I/Os may be implemented to ensure the availability of a packet structure providing the least latency with respect to a given use case. In one aspect, and as described herein, separate configuration and event messages may be implemented. In other aspects, a merged message that includes both configuration signals and event signals may be implemented. For example, the separate message protocol may be implemented in situations where I/O electrical configuration is required infrequently. In another example, the merged message protocol may be implemented in situations where I/O electrical configurations are desired on a frequent basis. While the separate message protocol may provide significant reduction in I/O transfer latency in most cases, the merged protocol may reduce latency when frequent I/O configuration changes are required.

VGI Messaging Approaches

In one aspect, a configuration-only message may be implemented. This is a message stored in a peripheral register to define the characteristics or settings associated with each GPIO pin. The configuration-only message may be implemented once at power-up of the host, or as often as the host needs to reconfigure the peripheral register for modification of the characteristics or settings associated with each GPIO pin. In another aspect, an event-only message may be implemented. The event-only message is a virtual GPIO message that only identifies the event state (e.g., the logic value, such as logic '0' or logic '1') of the GPIO pins of addressed peripherals. In an aspect, the event-only message may be sent whenever a logic value of a GPIO pin changes (also referred to as an event state change). In another aspect, a merged configuration and event message may be implemented. The merged configuration and event message (also referred to as a "flattened" message) may include serialized configuration and event information in the message, and can be used to change the configuration and the event state of a GPIO pin of addressed peripherals in one message. For example, the merged configuration and event message may be used to change the event state of a GPIO pin to a logic '1', and to also change the drive strength of the GPIO pin to 20 mA. A peripheral device may detect a message as being a merged configuration and event message based on a host instructing the peripheral device in its configuration table. In another aspect, an encapsulated message may be implemented. In such aspect, a VGI I/O or a VGI packet may be embedded inside any generic link's specific packet or frame structure.

Figure 23:
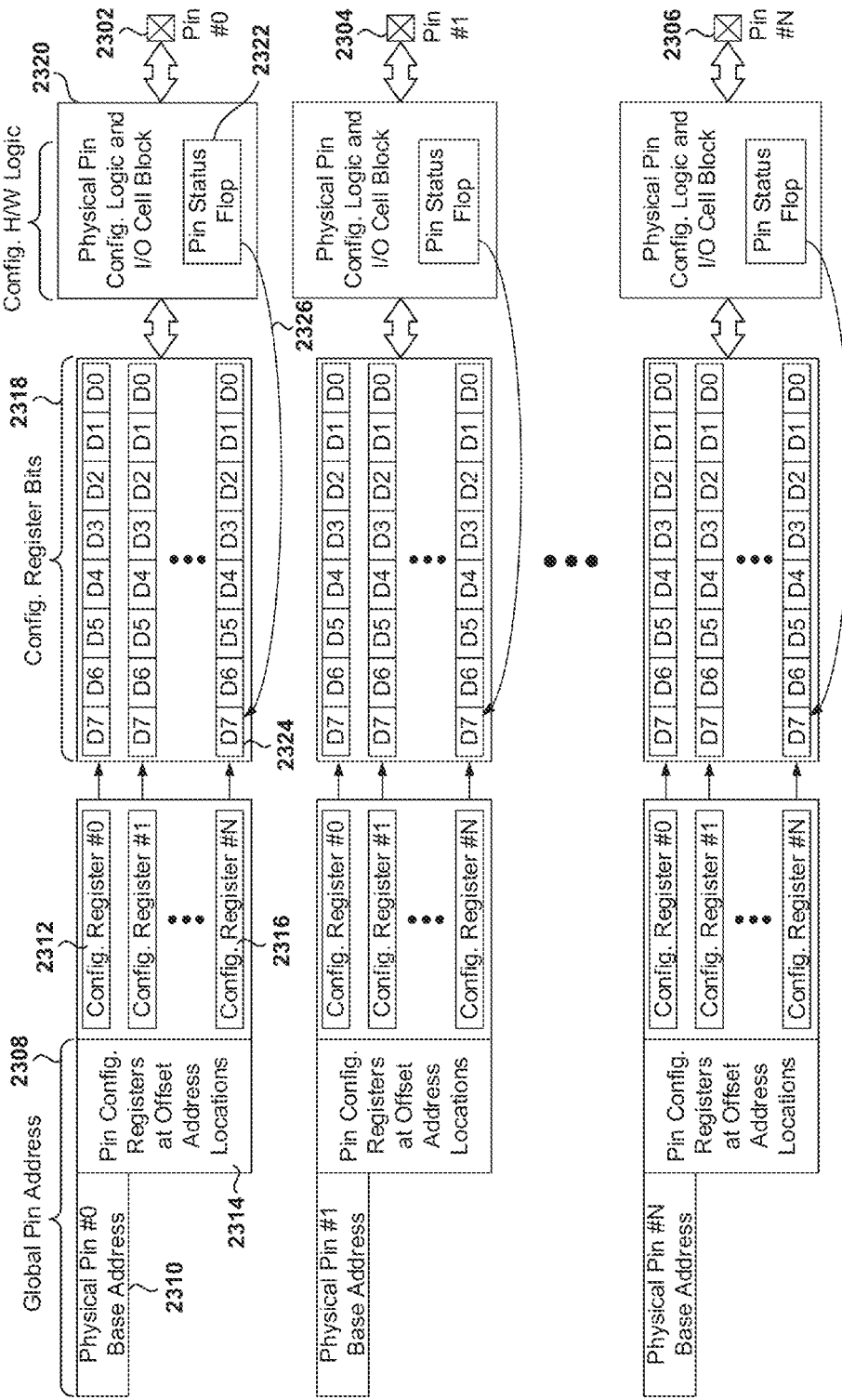
FIG. 23 is a diagram illustrating example I/O configurations.

FIG. 23 is a diagram illustrating example I/O configurations. For example, the I/O configurations in FIG. 23 are based on a uniform configuration register architecture. Each pin (e.g., physical pin #0 2302, physical pin #1 2304, physical pin #N 2306) of a device (e.g., a peripheral device), may be associated with a global pin address 2308. For example, the physical pin #0 2302 in FIG. 23 may be associated with the physical pin #0 base address 2310. Pin configuration registers associated with the physical pin #0 2312, such as the configuration register #0 2312 to configuration register #N 2316, may be included at offset address locations 2314 (e.g., offset with respect to the physical pin #0 base address 2310). In the aspect of FIG. 23, the configuration registers (e.g., the configuration register 2312) are 8 bits wide. For example, such 8 bits are shown as bits D0 to D7 in the corresponding register bits 2318. However, the configuration registers may have greater than 8 bits or less than 8 bits in other aspects. Moreover, the global pin addresses 2308 may consist of N-bits, where N may be an integer selected based on an implementation. In FIG. 23, the pin status flop associated with a physical pin may store the event state (e.g., logic '1' or logic '0') of the corresponding physical pin. For example, the pin status flop 2322 in the physical pin configuration logic and I/O cell block 2320 associated with the physical pin #0 2302 may store the event state (e.g., logic '1' or logic '0') of the physical pin #0 2302.

In an aspect, the pin status (e.g., the event state) of a physical pin as stored in the pin status flop may be mirrored to a particular bit of a configuration register. As will be described below, such mirroring of the pin status may conveniently enable virtual physical pin access across different modes of messaging. For example, with reference to FIG. 23, the pin status of the physical pin #0 2302 stored in the pin status flop 2322 may be mirrored (as shown with arrow 2326) to bit D7 2324 of configuration register #N 2316. Therefore, the configuration registers may be used to configure a corresponding physical pin at the physical pin configuration logic and I/O cell block 2320. It should be understood that the remaining physical pins (e.g., physical pin #1 2304 to physical pin #N 2306) in FIG. 23 may be configured in a manner similar to that described above with respect to physical pin #0 2302.

Figure 24:
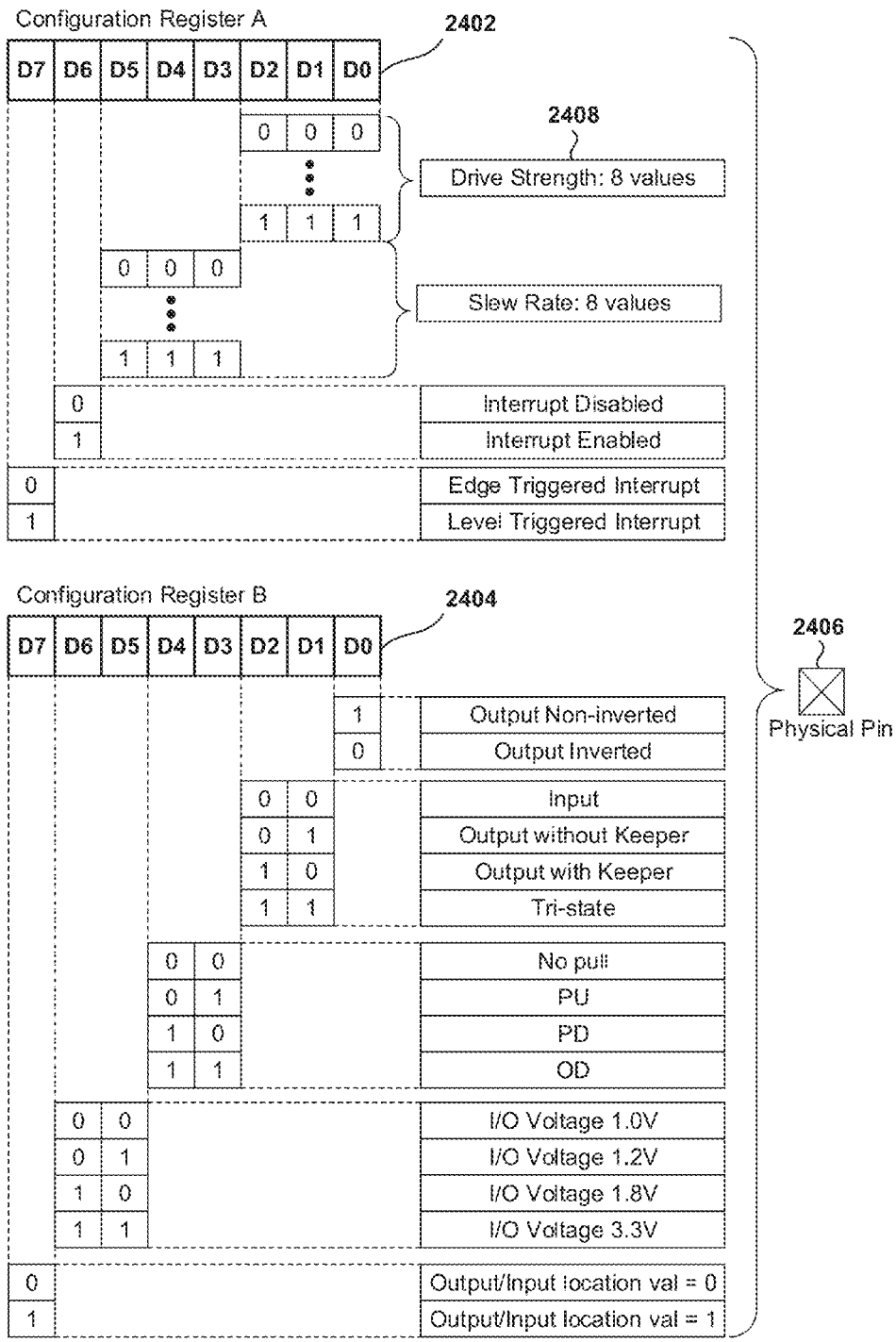
FIG. 24 is a diagram illustrating an example configuration of a pin configuration register.

FIG. 24 is a diagram illustrating example settings for configuration registers associated with a physical pin of a peripheral device. In FIG. 24, the configuration register structure is based on two 8-bit registers (e.g., configuration register A 2402 and configuration register B 2404) for configuring the physical pin 2406. However, it should be understood that a different number of configuration registers may be implemented in other aspects. Moreover, each of the configuration registers may include more than 8-bits or less than 8-bits in other aspects. The configuration register structure may be a silicon level implementation choice. In one example, the configuration register 2402 may correspond to the configuration register #0 2312 of FIG. 23, the configuration register 2404 may correspond to the configuration register #N 2316 of FIG. 23, and the physical pin 2406 may correspond to the physical pin #0 2302 of FIG. 23. In the aspect of FIG. 23, bit D7 of configuration register B 2404 may correspond to bit D7 2324 (also referred to as a pin-status-mirror bit) of the configuration register #N 2316 in FIG. 23.

With reference to FIG. 24, for example, the drive strength 2408 of the physical pin 2406 may be controlled by modifying the bits D0, D1, and D2 in the configuration register A 2402. For example, and as shown in FIG. 24, each of the eight binary values between the binary value '000' to the binary value '111' may be made to represent a particular drive strength value. Accordingly, by setting the bits D0, D1, and D2 in the configuration register A 2402 according to the binary value (e.g., between '000' to '111') that corresponds to the desired drive strength value, a host device may control the drive strength of the physical pin 2406 at a peripheral device. It can be appreciated that other characteristics and/or settings associated with the physical pin 2406 (e.g., a slew rate, interrupt enable/disable, edge/level triggered interrupt, I/O voltage level, etc.) may be controlled by modifying the corresponding bits of a configuration register as shown in FIG. 24.

Messaging Approaches

Different messaging approaches may be implemented for different types of use cases to achieve minimum latency within the specific mode of messaging. In a first example case, configuration of a physical pin (e.g., I/O electrical configuration) may be needed once or infrequently and/or I/O (e.g., event states) updates may be needed more frequently. In such a case, the I/O electrical configuration may be performed using configuration-only messages. In an aspect, after I/O electrical configuration, only the I/O status is required to be exchanged. I/O status exchanges may be based on any preferred approach, such as directed messaging, broadcast messaging, or masked messaging using directed or broadcast approaches. In a second example case (e.g. event state or I/O messaging only), an internal virtual I/O to internal virtual I/O connection may be implemented as it does not require an electrical configuration set-up for a physical pin. This is also applicable in case of physical pin mapping where the electrical configuration is always fixed. Similar to the first case, I/O status exchanges may take place as described above with respect to the first case. In a third example case, a merged configuration and event message may be implemented. In a situation where both I/O event states and I/O configurations must be updated frequently, this approach may provide optimal latency performance (e.g., lowest latency). In an aspect, the I/O event state and I/O configuration information are interleaved in a packet (e.g., a VGI packet as disclosed herein) in this approach. In a fourth example case, encapsulated messaging may be implemented. For all interfaces where the physical layer protocol allows a generic payload while having its own unique header construct, encapsulation allows embedding a VGI packet structure within the payload section of the specific protocol under consideration. This approach allows the use of VGI FSM with low complexity.

Figure 25:
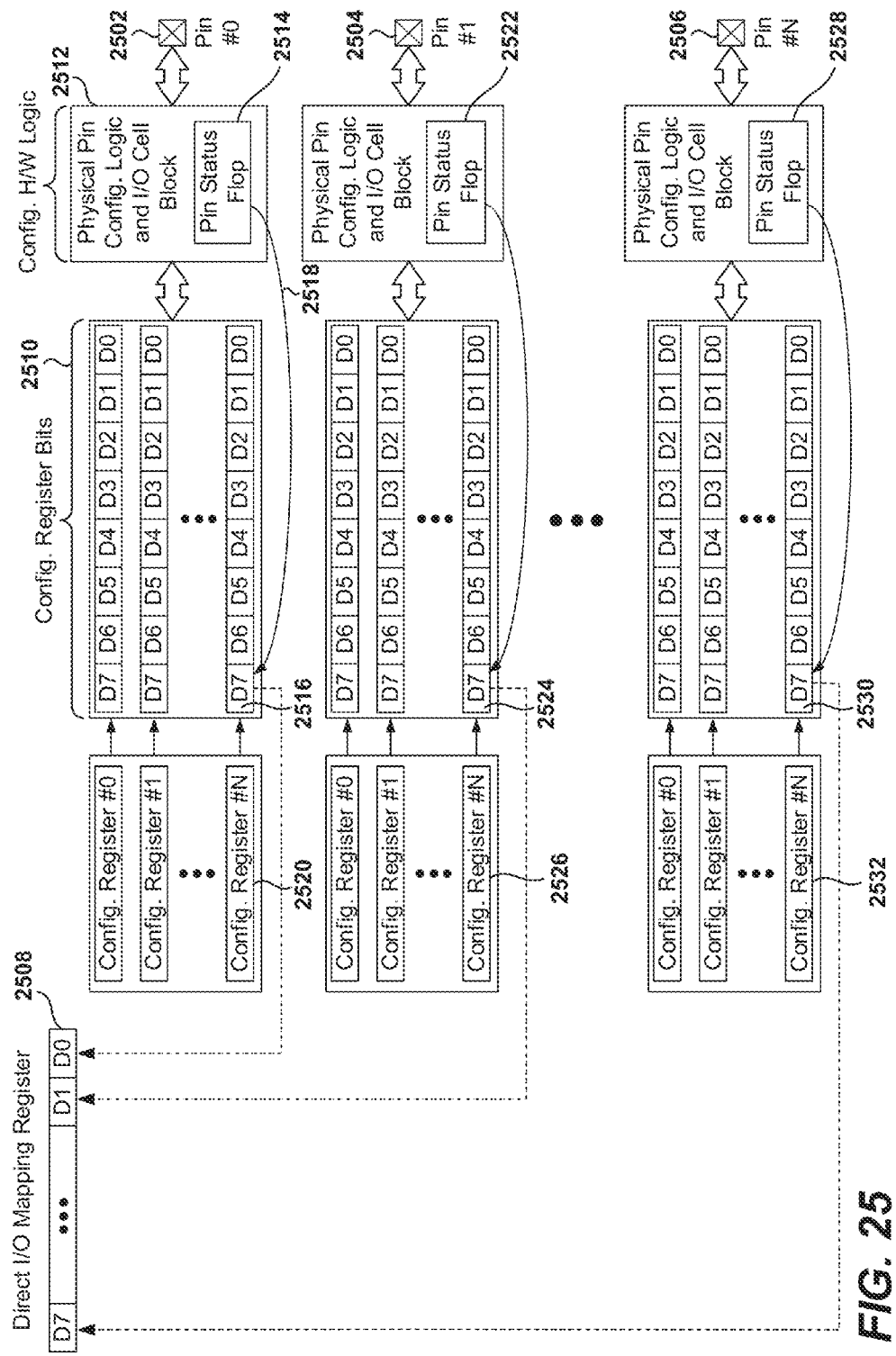
FIG. 25 is a diagram illustrating a direct I/O mapping register.

FIG. 25 is a diagram illustrating a direct I/O mapping register. As shown in FIG. 25, the direct I/O mapping register 2508 may be located at an address, such as 0x1111. In the aspect of FIG. 25, the direct I/O mapping register 2508 may include 8 bits (e.g., D0 to D7). In other aspects, the size (e.g., bit length) of the direct I/O mapping register 2508 may be implementation dependent. As shown in FIG. 25, the pin status flop associated with a physical pin may store the event state (e.g., logic '1' or logic '0') of the corresponding physical pin. For example, the pin status flop 2514 in the physical pin configuration logic and I/O cell block 2512 associated with the physical pin #0 2502 may store the event state (e.g., logic '1' or logic '0') of the physical pin #0 2502. The pin status of the physical pin #0 2502 stored in the pin status flop 2514 may be mirrored (as shown with arrow 2518) to bit D7 2516 of configuration register #N 2520, the pin status of the physical pin #1 2504 stored in the pin status flop 2522 may be mirrored to bit D7 2524 of configuration register #N 2526 and so on, such that the pin status of the final physical pin #N 2506 stored in the pin status flop 2528 may be mirrored to bit D7 2530 of configuration register #N 2532. The direct I/O mapping register 2508 may allow an event-only message to manipulate the pin status (e.g., event states) for a group of physical pins (e.g., physical pin #0 2502, physical pin #1 2504, physical pin #N 2506). In an aspect, the pin status of each physical pin may be read by reading the content of the direct I/O mapping register 2508, or the pin status of each physical pin may be modified by changing the content of the direct I/O mapping register 2508 (e.g., by implementing an event-only message that writes to the direct I/O mapping register 2508). For example, the pin status of the physical pin #0 2502 may be read by reading bit D0 of the direct I/O mapping register 2508, the pin status of the physical pin #1 2504 may be read by reading bit D1 of the direct I/O mapping register 2508, and the pin status of the physical pin #N 2506 may be read by reading bit D7 of the direct I/O mapping register 2508. In another example, the pin status of the physical pin #0 2502 may be modified by changing the value of bit D0 of the direct I/O mapping register 2508, the pin status of the physical pin #1 2504 may be modified by changing the value of bit D1 of the direct I/O mapping register 2508, and the pin status of the physical pin #N 2506 may be modified by changing the value of bit D7 of the direct I/O mapping register 2508. In an aspect, a masked write operation may be allowed by using a mask pattern in conjunction with the pin status values.

FIG. 26A is a diagram illustrating an example of a message-only message format 2600 that implements a mask. In the aspect of FIG. 26A, the register address 2602, the mask 2604, and the value 2606 are each 8 bits (e.g., bits D0 to D7). In an aspect, a common command code (CCC) may be used to indicate that such message format includes a mask. FIG. 26B is a diagram illustrating an example of a message-only format 2650 that does not implement a mask. In the aspect of FIG. 26B, the register address 2652 and the value 2654 are each 8 bits (e.g., D0 to D7). In an aspect, a common command code (CCC) may be used to indicate that such message format does not include a mask.

Figure 27A:
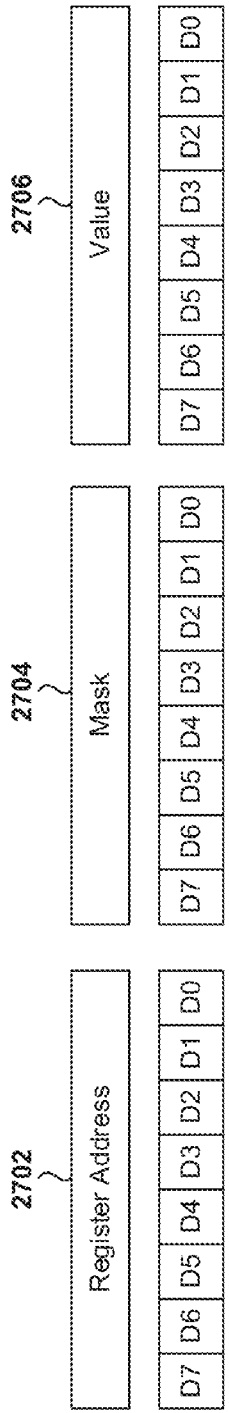
FIG. 27A is a diagram illustrating an example of an event-only message format that implements a mask.
Figure 27B:
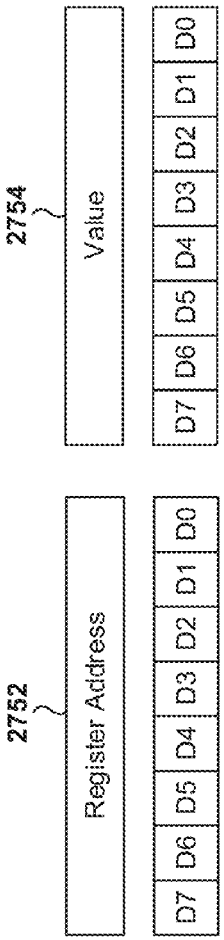
FIG. 27B is a diagram illustrating an example of an event-only message format 2750 that does not implement a mask.

FIG. 27A is a diagram illustrating an example of an event-only message format 2700 that implements a mask. In the aspect of FIG. 27A, the register address 2702, the mask 2704, and the value 2706 are each 8 bits (e.g., bits D0 to D7). In an aspect, a common command code (CCC) may be used to indicate that such message format includes a mask. FIG. 27B is a diagram illustrating an example of an event only message format 2750 that does not implement a mask. In the aspect of FIG. 27B, the register address 2752 and the value 2754 are each 8 bits (e.g., bits D0 to D7). In an aspect, a common command code (CCC) may be used to indicate that such message format does not include a mask.

Merged Configuration and Event Message Format

Figure 28:
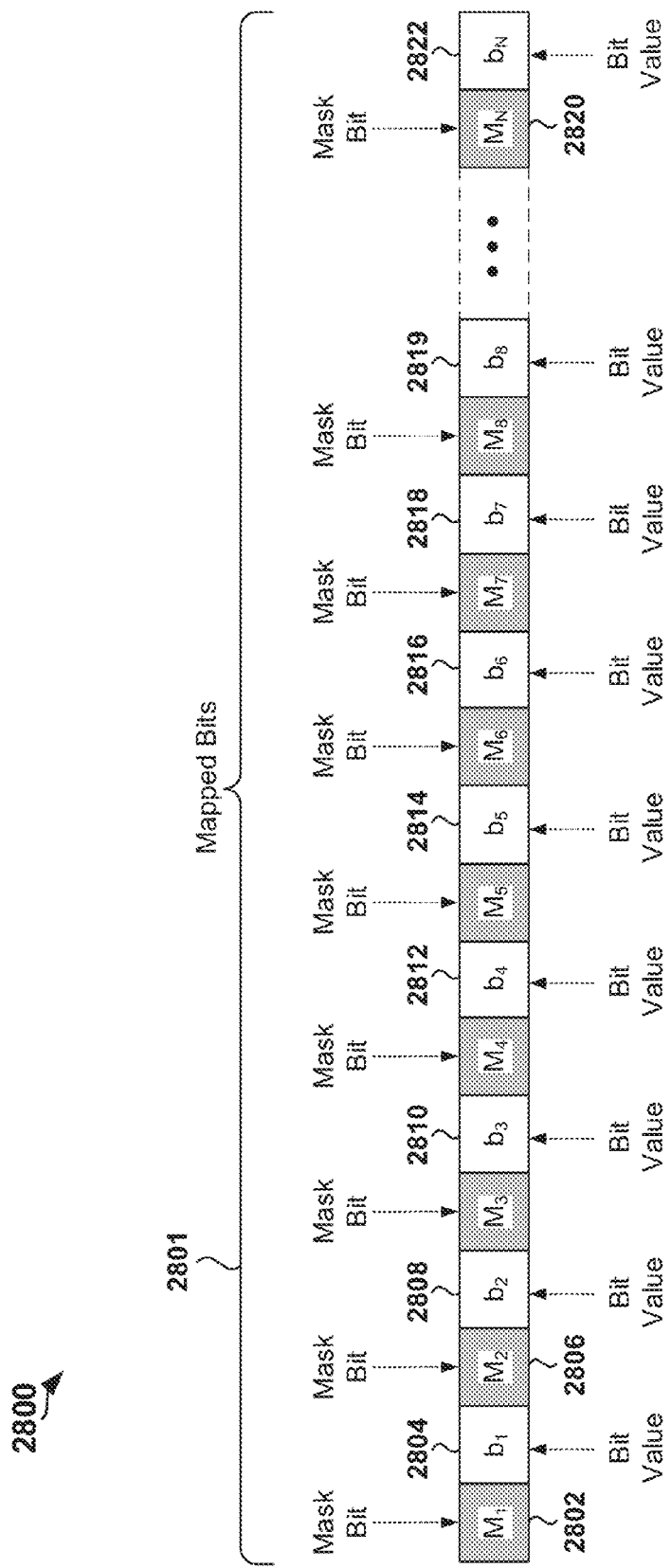
FIG. 28 is a diagram illustrating an example of a merged message format in accordance with various aspects of the disclosure.

FIG. 28 is a diagram illustrating an example of a merged configuration and event message format 2800 in accordance with various aspects of the disclosure. As previously discussed, a merged configuration and event message may include I/O configuration information and I/O event state information (e.g., a GPIO pin status, such as a logic value '1' or a logic value '0') for one or more pins (e.g., GPIO pins) of a peripheral device, where the I/O configuration information and the I/O event state information are interleaved in a packet (e.g., a VGI packet as disclosed herein) based on a predefined mapping scheme. Accordingly, in one aspect, the position and identity of each bit in a merged configuration and event message (also referred to as a merged packet) may be provided to peripheral devices, so that each of the peripheral devices may identify the bits directed to them in the merged configuration and event messages. For example, the position and identity of each bit in a merged configuration and event message may be provided to the peripheral devices from a host device (e.g., host SoC) using message-only packets that may be stored in specified registers. In an aspect, the host device may provide at least a relevant portion of an I/O mapping table (e.g. the I/O mapping table 2000) to each of the peripheral devices. The aspects described herein may therefore allow each of the peripheral devices to know the meaning of each bit in an incoming bit stream. For example, with reference to the I/O mapping table 2000 in FIG. 20 and the example set of mapped bits 2801 of an incoming data stream in FIG. 28, the bit $M_1$ 2802 may correspond to the mask bit 2014 in the I/O mapping table 2000, the bit 2804 may correspond to the bit value 2016 in the I/O mapping table 2000, the bit $M_2$ 2806 may correspond to the mask bit 2020 in the I/O mapping table 2000, the bit 2808 may correspond to the bit value 2022 in the I/O mapping table 2000 and so on, such that the bit $M_N$ 2820 may correspond to the mask bit 2036 in the I/O mapping table 2000, and the bit 2822 may correspond to the bit value 2038 in the I/O mapping table 2000. In an aspect, the value of a mask bit (e.g., the bit $M_1$ 2802) may identify whether the value of the immediately adjacent bit (e.g., the bit $b_1$ 2804) has changed state. For example, if a mask bit (e.g., the bit $M_1$ 2802) is set to the logic value '1', a peripheral may detect that the value of the immediately adjacent bit (e.g., the bit $b_1$ 2804) has changed state (e.g., changed from a logic value '0' to a logic value '1', or changed from a logic value '1' to a logic value '0'). Accordingly, in such example, if a mask bit (e.g., the bit $M_1$ 2802) is set to '0', a peripheral may detect that the value of the immediately adjacent bit (e.g., the bit $b_1$ 2804) has not changed state. It should be understood that these values for the mask bit represent one possible implementation. Therefore, in other aspects, the mask bit may be set to different values with respect to the example above to indicate whether the value of the immediately adjacent bit has changed state (e.g., a mask bit may be set to the logic value '0' to indicate that the value of the immediately adjacent bit has changed state, or set to the logic value '1' to indicate that the value of the immediately adjacent bit has not changed state).

Therefore, it should be noted that the configuration and event message format 2800 may include configuration information (e.g., information to configure a setting, parameter, and/or characteristic of an external GPIO pin, information to configure whether the external GPIO pin is an input or output, etc.) for an external GPIO pin of a device as well as the event state (e.g., logic value '1' or '0') of the external GPIO pin in a single (e.g., merged) message. In an aspect, a common command code (CCC) may be used to indicate that such merged message format is a merged packet. External GPIOs may have individual electrical and behavioral configuration needs, such as drive strength, directionality, open-drain operation, interrupt configuration, etc. Such configurations may be handled in either the VGI space, such that the VGI packet handles all such configurations, or the I3C space, such that the configuration information is transferred via normal I3C transactions. In an aspect, the states of the I/Os may be transferred via the dedicated VGI_CCC command.

In one example, and with reference to FIG. 28 and the I/O mapping table 2000 in FIG. 20, the bit $b_1$ 2804 may set the event state (logic '1' or logic '0') of GPIO pin #1 of a first peripheral at address 0x01, the bit $b_2$ 2808 may set the drive strength (e.g., to 4 mA when set to logic '0' or 20 mA when set to logic '1') of the GPIO pin #1 of the first peripheral at address 0x01, the bit $b_3$ 2810 may set the GPIO pin #1 of the first peripheral at address 0x01 as an input pin when set to logic '0' or as an output pin when set to logic '1', the bit $b_4$ 2812 may set the GPIO pin #1 of the first peripheral as an open drain (OD) when set to logic '0' or push-pull when set to logic '1', the bit $b_5$ 2814 may set the GPIO pin #1 of the first peripheral as an edge triggered interrupt when set to logic '0' or as an edge triggered interrupt when set to logic '1'. In such example, the bit $b_6$ 2816 may set the event state of GPIO pin #2 of the first peripheral, and the bit $b_7$ 2818 may set the event state of GPIO pin #3 of the first peripheral. The bit $b_8$ 2819 may set the event state (logic '1' or logic '0') of GPIO pin #1 of a second peripheral at address 0x02. Therefore, in this example, when the second peripheral at address 0x02 receives the mapped bits 2801, the second peripheral may disregard the bits $b_1$ 2804, $b_2$ 2808, $b_3$ 2810, $b_4$ 2812, $b_5$ 2814, $b_6$ 2816, and $b_7$ 2818 based on the I/O mapping table 2000 and may process the bit $b_8$ 2819 (and a subsequent bit $b_9$).

Figure 29:
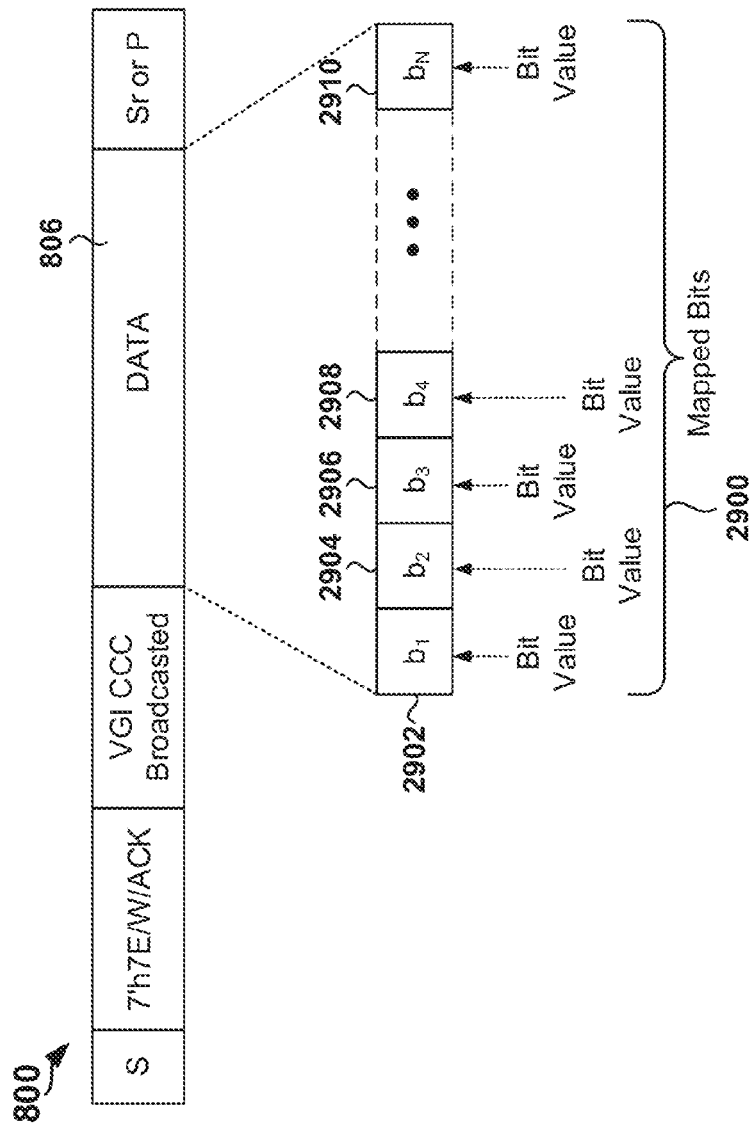
FIG. 29 is a diagram illustrating an example of broadcast messaging for a write operation using a merged message in accordance with various aspects of the disclosure.

FIG. 29 is a diagram illustrating an example of broadcast messaging for a write operation using a merged message. The example configuration of FIG. 29 shows the example broadcast frame 800 previously described with respect to FIG. 8. Accordingly, the VGPIO data payload 806 may include mapped bits 2900 based on the I/O mapping table 2000. In an aspect, each bit position in the VGPIO data payload 806 may be associated with a corresponding GPIO pin number at a peripheral device (also referred to as a peripheral I/O number) as indicated in the I/O mapping table 2000 shown in FIG. 29. For example, the bit $b_1$ 2902 may set the event state (e.g., the pin status as a logic '1' or logic '0') of GPIO pin #1 of a first peripheral at address 0x01. The remaining bits $b_2$ 2904, $b_3$ 2906, and $b_4$ 2908 to $b_N$ 2910 may set the event states of GPIO pins or may configure GPIO pins at peripheral devices as indicated in the I/O mapping table 2000 (and similar to the previously described mapped bits 2801). Therefore, in one example, the bit $b_N$ 2910 may set the event state (e.g., the pin status as a logic '1' or logic '0') of GPIO pin #2 of a fifth peripheral device at address 0x05 as indicated in the I/O mapping table 2000. In an aspect, the example broadcast frame 800 including the mapped bits 2900 may be broadcast to one or more peripheral devices.

Messaging for Write Operations

Figure 30:
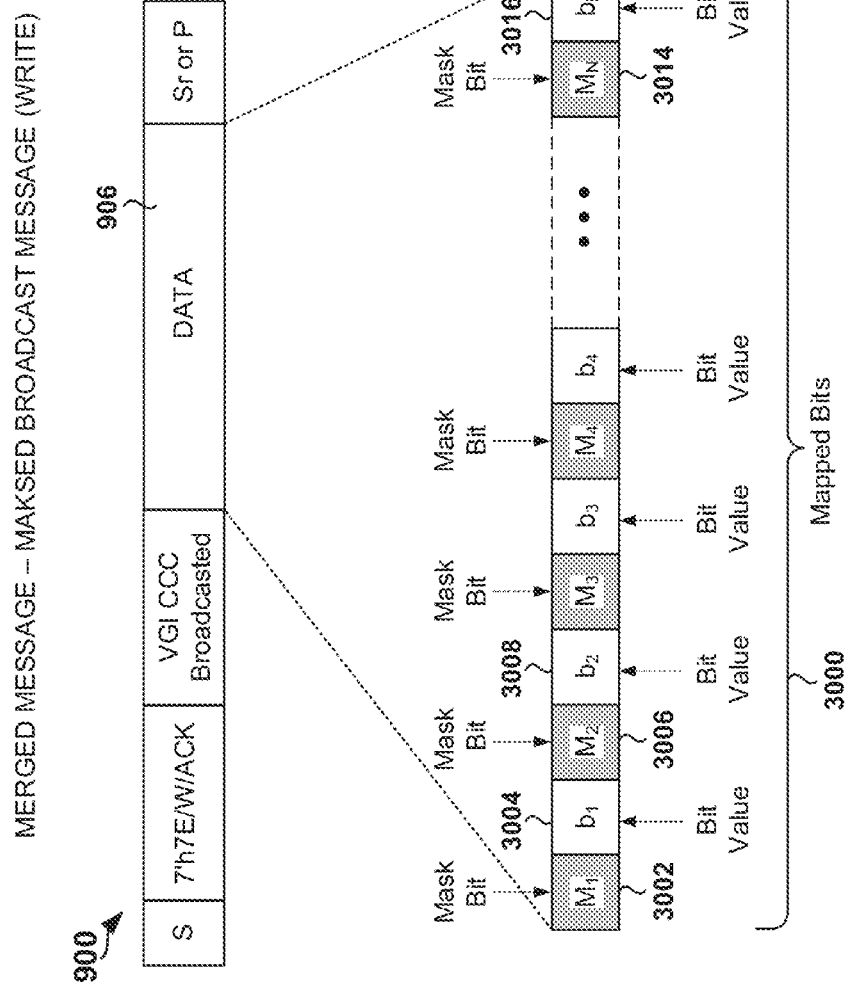
FIG. 30 is a diagram illustrating an example of masked broadcast messaging for a write operation using a merged message in accordance with various aspects of the disclosure.

FIG. 30 is a diagram illustrating an example of broadcast messaging for a write operation using a merged message that implements a mask in accordance with various aspects of the disclosure. The example configuration of FIG. 30 shows the example masked broadcast frame 900 previously described with respect to FIG. 9. Accordingly, the VGPIO data payload 906 may include mapped bits 2900 based on the I/O mapping table 2000. In an aspect, the masked broadcast frame 900 including the mapped bits 3000 may be broadcast to one or more peripheral devices. As shown in FIG. 30, the mapped bits 3000 illustrate the bit positions in the data payload 906. For example, the bit $M_1$ 3002 may correspond to the mask bit 2014 in the I/O mapping table 2000, the bit 3004 may correspond to the bit value 2016 in the I/O mapping table 2000, the bit $M_2$ 3006 may correspond to the mask bit 2020 in the I/O mapping table 2000, the bit 3008 may correspond to the bit value 2022 in the I/O mapping table 2000 and so on, such that the bit $M_N$ 3014 may correspond to the mask bit 2036 in the I/O mapping table 2000, and the bit 3016 may correspond to the to the bit value 2038 in the I/O mapping table 2000. In an aspect, the value of a mask bit (e.g., the bit $M_1$ 3002) may identify whether the value of the immediately adjacent bit (e.g., the bit $b_1$ 3004) has changed state. For example, if a mask bit (e.g., the bit $M_1$ 3002) is set to the logic value '1', a peripheral may detect that the value of the immediately adjacent bit (e.g., the bit $b_1$ 3004) has changed state (e.g., changed from a logic value '0' to a logic value '1', or changed from a logic value '1' to a logic value '0'). Accordingly, in such example, if a mask bit (e.g., the bit $M_1$ 3002) is set to '0', a peripheral may detect that the value of the immediately adjacent bit (e.g., the bit $b_1$ 3004) has not changed state. It should be understood that these values for the mask bit represent one possible implementation. Therefore, in other aspects, the mask bit may be set to different values with respect to the example above to indicate whether the value of the immediately adjacent bit has changed state (e.g., a mask bit may be set to the logic value '0' to indicate that the value of the immediately adjacent bit has changed state, or set to the logic value '1' to indicate that the value of the immediately adjacent bit has not changed state).

Figure 31:
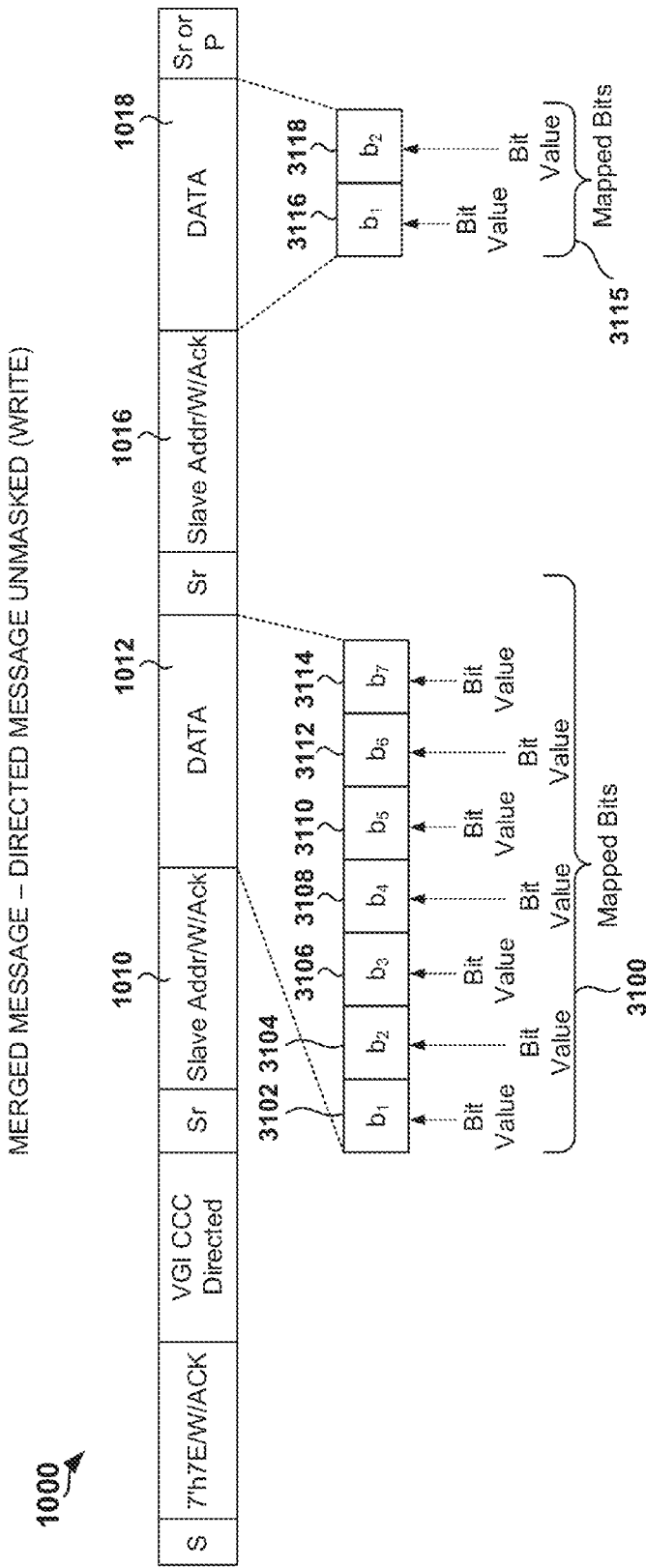
FIG. 31 is a diagram illustrating an example of direct messaging for a write operation using a merged message in accordance with various aspects of the disclosure.

FIG. 31 is a diagram illustrating an example of direct messaging for a write operation using a merged message. The example configuration of FIG. 31 shows the example directed frame 1000 previously described with respect to FIG. 10. Accordingly, the VGPIO data payload 1012 may include mapped bits 3100 based on the I/O mapping table 2000, and the VGPIO data payload 1018 may include mapped bits 3115 based on the I/O mapping table 2000. In one example, the slave address 1010 may include the address 0x01 corresponding to a first peripheral device and the slave address 1016 may include the address 0x02 corresponding to a second peripheral device. Accordingly, the VGPIO data payload 1012 may be directed to the first peripheral device and the VGPIO data payload 1018 may be directed to the second peripheral device. In an aspect, each bit position in the VGPIO data payload 1012 may be associated with a corresponding GPIO pin number at the first peripheral device (also referred to as a peripheral I/O number) as indicated in the I/O mapping table 2000 shown in FIG. 29, and each bit position in the VGPIO data payload 1018 may be associated with a corresponding GPIO pin number at the second peripheral device (also referred to as a peripheral I/O number) as indicated in the I/O mapping table 2000 shown in FIG. 29. For example, the bit $b_1$ 3102 may correspond to the bit value 2016 and may set the event state (e.g., the pin status as a logic '1' or logic '0') of GPIO pin #1 of the first peripheral device, the bit $b_2$ 3104 may correspond to the bit value 2022 in the I/O mapping table 2000 and may set the drive strength (e.g., to 4 mA when set to logic '0' or 20 mA when set to logic '1') of the GPIO pin #1 of the first peripheral, and so on such that the remaining bits $b_2$ 3104, $b_3$ 3106, $b_4$ 3108, $b_5$ 3110, $b_6$ 3112, and $b_7$ 3114 may set the event states of GPIO pins or may configure GPIO pins at the first peripheral device as indicated in the I/O mapping table 2000. As another example, the bit $b_1$ 3116 may correspond to the bit value 2028 and may set the event state (e.g., the pin status as a logic '1' or logic '0') of GPIO pin #1 of the second peripheral device, the bit $b_2$ 3118 may correspond to the bit value 2034 in the I/O mapping table 2000 and may set the event state (e.g., the pin status as a logic '1' or logic '0') of GPIO pin #2 of the second peripheral device. In an aspect, the directed frame 1000 including the mapped bits 3100 and 3115 may be transmitted to one or more peripheral devices.

Figure 32:
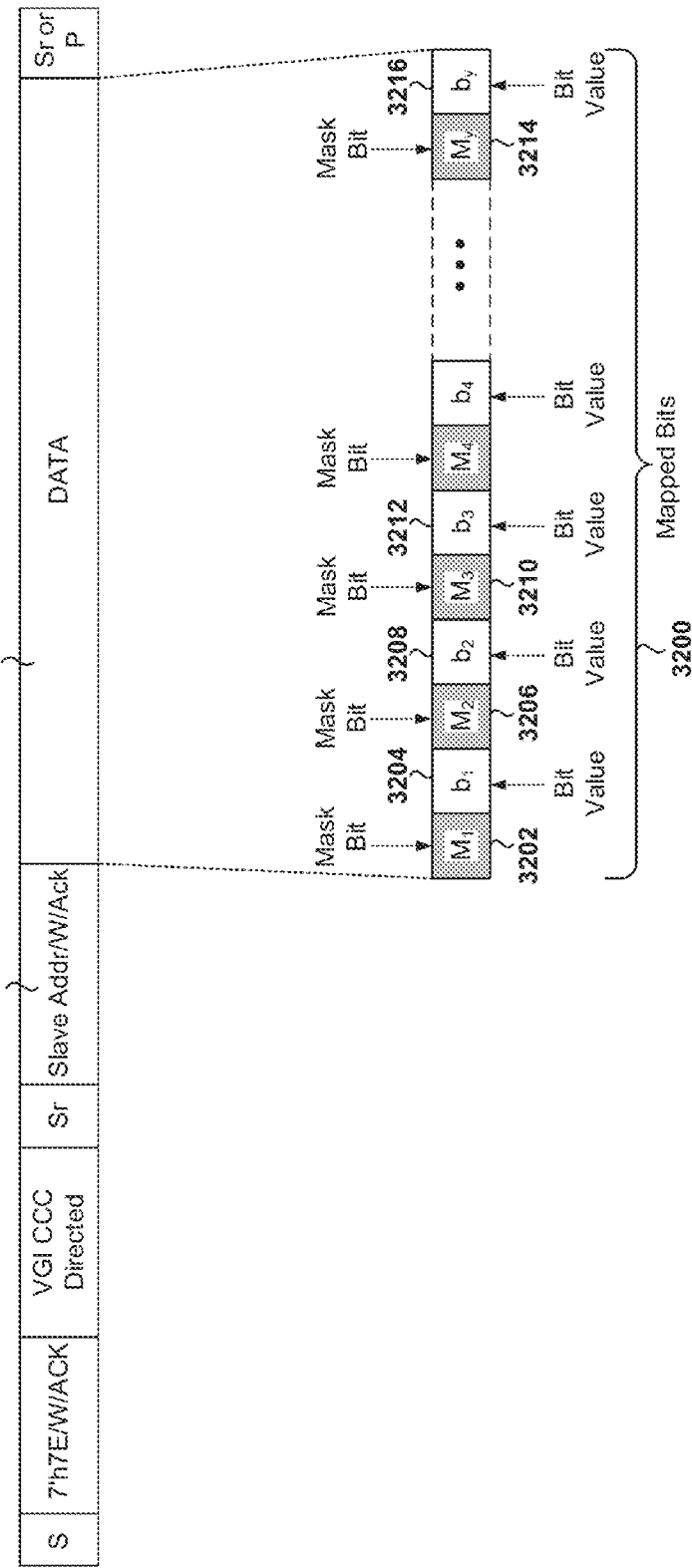
FIG. 32 is a diagram illustrating an example of masked direct messaging for a write operation using a merged message in accordance with various aspects of the disclosure.

FIG. 32 is a diagram illustrating an example of direct messaging for a write operation using a merged message that implements a mask. The example configuration of FIG. 32 shows the example directed frame 1100 previously described with respect to FIG. 11. Accordingly, the VGPIO data payload 1112 may include mapped bits 3200 based on the I/O mapping table 2000. In one example, the slave address 1110 may include the address 0x01 corresponding to a first peripheral device. Accordingly, the VGPIO data payload 1112 may be directed to the first peripheral device. As shown in FIG. 32, the mapped bits 3200 illustrate the bit positions in the data payload 1112. For example, the bit $M_1$ 3202 may correspond to the mask bit 2014 in the I/O mapping table 2000, the bit 3204 may correspond to the bit value 2016 in the I/O mapping table 2000, the bit $M_2$ 3206 may correspond to the mask bit 2020 in the I/O mapping table 2000, the bit 3208 may correspond to the bit value 2022 in the I/O mapping table 2000 and so on, such that the bit $M_y$ 3214 may correspond to the mask bit 2023 in the I/O mapping table 2000, and the bit 3216 may correspond to the to the bit value 2025 in the I/O mapping table 2000. Therefore, all of the mapped bits 3200 in the VGPIO data payload 1112 correspond to the first peripheral device. In an aspect, the value of a mask bit (e.g., the bit $M_1$ 3202) may identify whether the value of the immediately adjacent bit (e.g., the bit $b_1$ 3204) has changed state. For example, if a mask bit (e.g., the bit $M_1$ 3202) is set to the logic value '1', a peripheral may detect that the value of the immediately adjacent bit (e.g., the bit $b_1$ 3204) has changed state (e.g., changed from a logic value '0' to a logic value '1', or changed from a logic value '1' to a logic value '0'). Accordingly, in such example, if a mask bit (e.g., the bit $M_1$ 3202) is set to '0', a peripheral may detect that the value of the immediately adjacent bit (e.g., the bit $b_1$ 3204) has not changed state. It should be understood that these values for the mask bit represent one possible implementation. Therefore, in other aspects, the mask bit may be set to different values with respect to the example above to indicate whether the value of the immediately adjacent bit has changed state (e.g., a mask bit may be set to the logic value '0' to indicate that the value of the immediately adjacent bit has changed state, or set to the logic value '1' to indicate that the value of the immediately adjacent bit has not changed state).

Messaging for Read Operations

Figure 33:
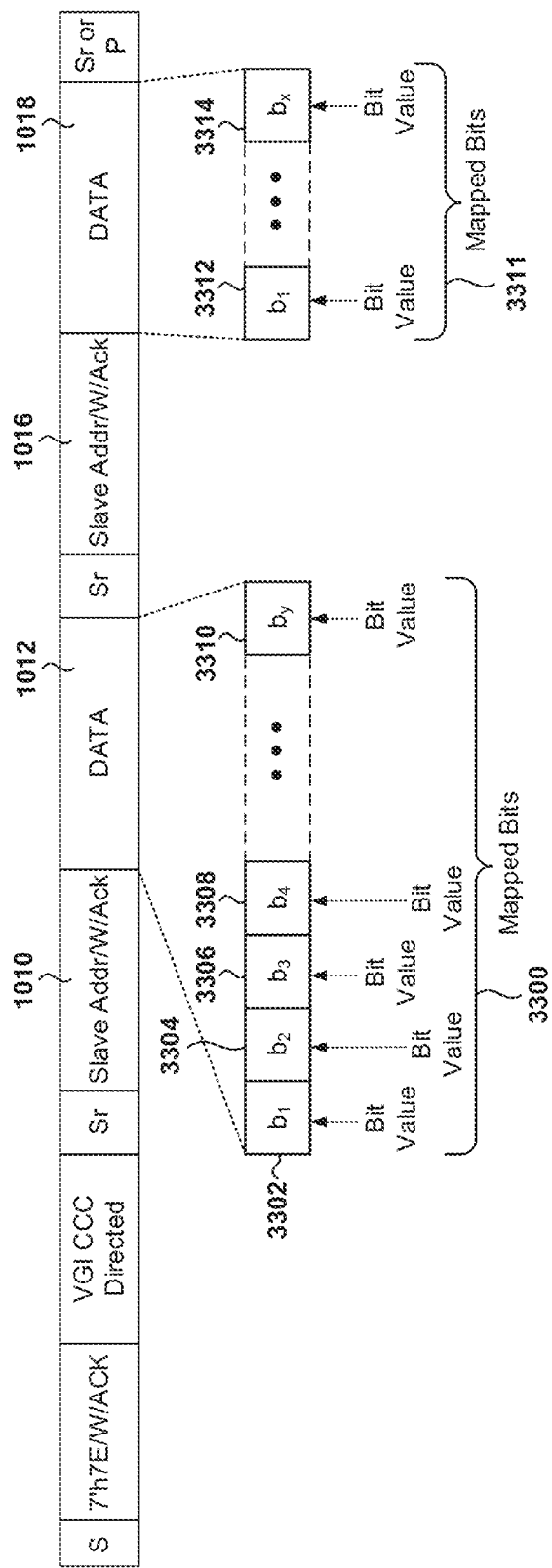
FIG. 33 is a diagram illustrating an example of direct messaging for a read operation using a merged message in accordance with various aspects of the disclosure.

FIG. 33 is a diagram illustrating an example of direct messaging for a read operation using a merged message. The example configuration of FIG. 33 shows the example directed frame 1000 previously described with respect to FIG. 10. Accordingly, the VGPIO data payload 1012 may include mapped bits 3300 based on the I/O mapping table 2000, and the VGPIO data payload 1018 may include mapped bits 3311 based on the I/O mapping table 2000. In one example, the slave address 1010 may include the address 0x01 corresponding to a first peripheral device and the slave address 1016 may include the address 0x02 corresponding to a second peripheral device. Accordingly, the VGPIO data payload 1012 may include data from the first peripheral device and the VGPIO data payload 1018 may include data from the second peripheral device. In an aspect, each bit position in the VGPIO data payload 1012 may be associated with a corresponding GPIO pin number at the first peripheral device (also referred to as a peripheral I/O number) as indicated in the I/O mapping table 2000 shown in FIG. 29, and each bit position in the VGPIO data payload 1018 may be associated with a corresponding GPIO pin number at the second peripheral device (also referred to as a peripheral I/O number) as indicated in the I/O mapping table 2000 shown in FIG. 20. For example, the bit $b_1$ 3302 may correspond to the bit value 2016 and may set the event state (e.g., the pin status as a logic '1' or logic '0') of GPIO pin #1 of the first peripheral device, the bit $b_2$ 3304 may correspond to the bit value 2022 in the I/O mapping table 2000 and may set the drive strength (e.g., to 4 mA when set to logic '0' or 20 mA when set to logic '1') of the GPIO pin #1 of the first peripheral, and so on such that the remaining bits $b_3$ 3306 and $b_4$ 3308 to $b_y$ 3310 may include the event states of GPIO pins or may include configuration information of GPIO pins at the first peripheral device as indicated in the I/O mapping table 2000. As another example, the bit $b_1$ 3312 may correspond to the bit value 2028 and may include the event state (e.g., the pin status as a logic '1' or logic '0') of GPIO pin #1 of the second peripheral device, and the bit $b_x$ 3314 may correspond to the bit value 2034 in the I/O mapping table 2000 and may include the event state (e.g., the pin status as a logic '1' or logic '0') of GPIO pin #2 of the second peripheral device. In an aspect, the directed frame 1000 including the mapped bits 3300 and 3311 may be transmitted to a host device from one or more peripheral devices.

FIG. 34 is a diagram illustrating an example of direct messaging for a read operation using a merged message that implements a mask. The example configuration of FIG. 34 shows the example directed frame 1440 previously described with respect to FIG. 14B. Accordingly, the encapsulated VGI packet 1452 may include mapped bits 3400 based on the I/O mapping table 2000. In one example, the slave address 1450 may include the address 0x01 corresponding to a first peripheral device. Accordingly, the encapsulated VGI packet 1452 may include data from the first peripheral device. As shown in FIG. 34, the mapped bits 3400 illustrate bit positions that may be included in the encapsulated VGI packet 1452. For example, the bit $M_1$ 3402 may correspond to the mask bit 2014 in the I/O mapping table 2000, the bit 3404 may correspond to the bit value 2016 in the I/O mapping table 2000, the bit $M_2$ 3406 may correspond to the mask bit 2020 in the I/O mapping table 2000, the bit 3408 may correspond to the bit value 2022 in the I/O mapping table 2000 and so on, such that the bit $M_y$ 3416 may correspond to the mask bit 2023 in the I/O mapping table 2000, and the bit 3418 may correspond to the to the bit value 2025 in the I/O mapping table 2000. Therefore, all of the mapped bits 3400 in the encapsulated VGI packet 1452 correspond to the first peripheral device. In an aspect, the value of a mask bit (e.g., the bit $M_1$ 3402) may identify whether the value of the immediately adjacent bit (e.g., the bit $b_1$ 3404) has changed state. For example, if a mask bit (e.g., the bit $M_1$ 3402) is set to the logic value '1', a peripheral may detect that the value of the immediately adjacent bit (e.g., the bit $b_1$ 3404) has changed state (e.g., changed from a logic value '0' to a logic value '1', or changed from a logic value '1' to a logic value '0'). Accordingly, in such example, if a mask bit (e.g., the bit $M_1$ 3402) is set to '0', a peripheral may detect that the value of the immediately adjacent bit (e.g., the bit $b_1$ 3404) has not changed state. It should be understood that these values for the mask bit represent one possible implementation. Therefore, in other aspects, the mask bit may be set to different values with respect to the example above to indicate whether the value of the immediately adjacent bit has changed state (e.g., a mask bit may be set to the logic value '0' to indicate that the value of the immediately adjacent bit has changed state, or set to the logic value '1' to indicate that the value of the immediately adjacent bit has not changed state). In an aspect, the directed frame 1440 including the mapped bits 3400 may be transmitted to a host device from one or more peripheral devices.

Figure 35:
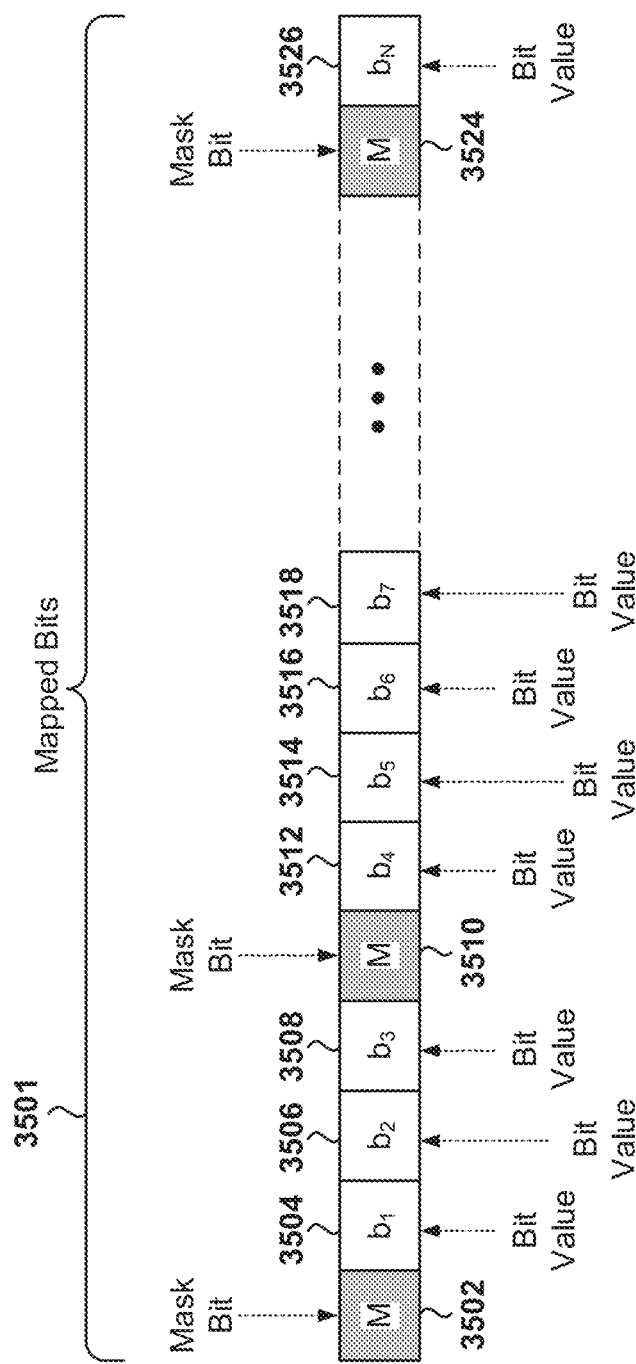
FIG. 35 shows mapped bits including mask bits that are associated with multiple immediately adjacent bit values in accordance with various aspects of the disclosure.

It should be noted that different mask configurations may be implemented with respect to the mask bits described in FIGS. 28, 30, 32, and/or 34. For example, FIG. 35 shows mapped bits 3501 including mask bits that are associated with multiple immediately adjacent bit values. In an aspect, the mask bit 3502 may be associated with bits $b_1$ 3504, $b_2$ 3506, $b_3$ 3508, the mask bit 3510 may be associated with bits $b_4$ 3512, $b_5$ 3514, $b_6$ 3516, and $b_7$ 3518, and the mask bit 3524 may be associated with the bit $b_N$ 3526. In such aspect, for example, a change in state of at least one of the bits $b_1$ 3504, $b_2$ 3506, $b_3$ 3508 may be indicated by setting the mask bit 3502 to logic '1'. As another example, no change in state of at least one of the bits $b_4$ 3512, $b_5$ 3514, $b_6$ 3516, and $b_7$ 3518 may be indicated by setting the mask bit 3510 to logic '0'.

Figure 36:
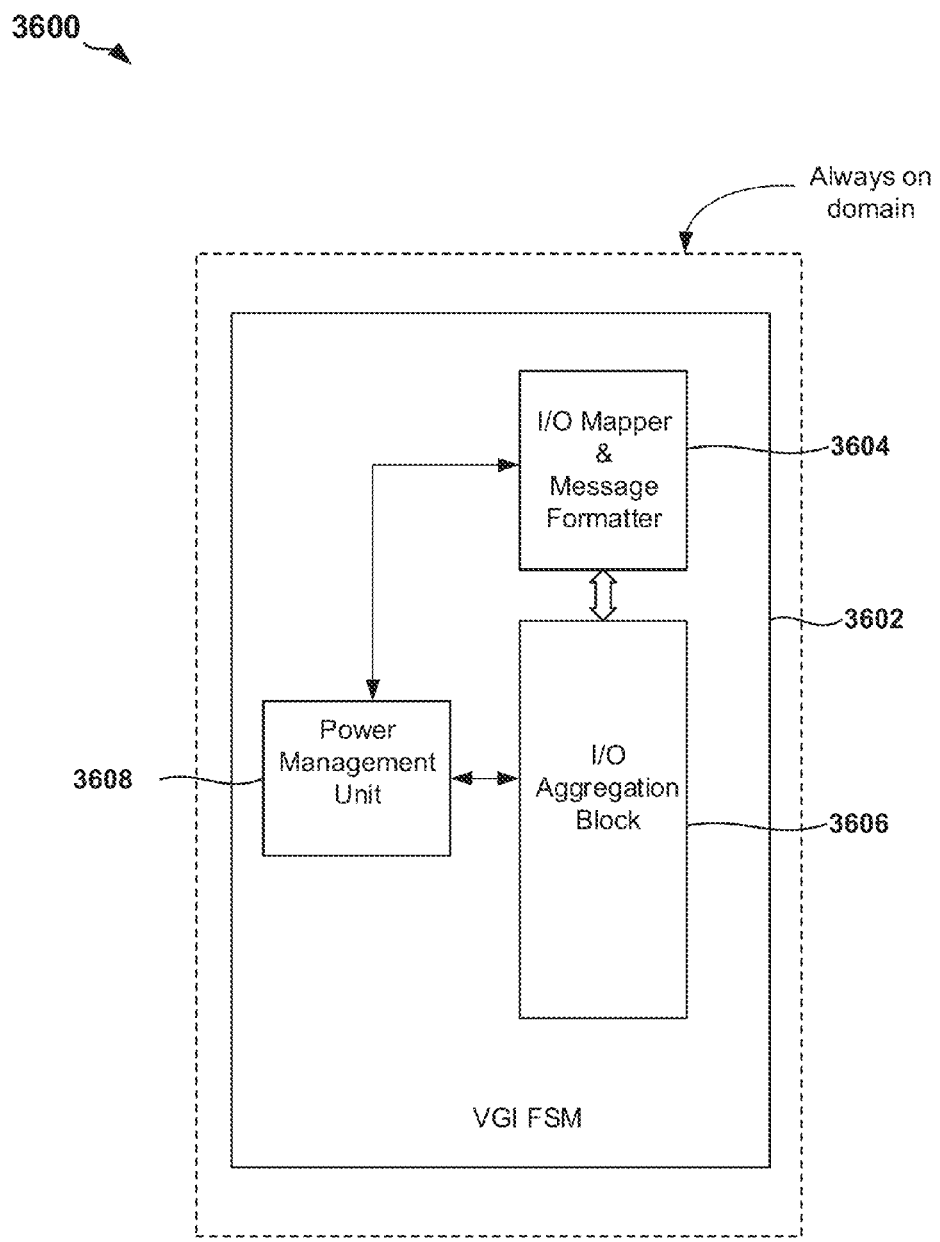
FIG. 36 is a diagram illustrating a power management unit in a VGI FSM in accordance with various aspects of the disclosure.

FIG. 36 shows an example configuration of a VGI FSM (e.g., VGI FSM 1508 in FIG. 15) in accordance with various aspects of the disclosure. As shown in FIG. 36, the VGI FSM 3602 includes an I/O mapper and message formatter logic circuit 3604, an I/O aggregation block 3606, and a power management unit 3608. The I/O mapper and message formatter logic circuit 3604 may be configured to map GPIO signals (also referred to as I/O signals) into bit positions in a virtual GPIO payload as discussed previously. In the configuration of FIG. 36, the VGI FSM 3602 is configured to operate in an always on domain, such that the VGI FSM 3602 may detect communications over a VGI interface from one or more peripheral devices independent of a CPU (not shown in FIG. 36 for ease of illustration) and/or obtain and transmit communications to one or more peripheral devices over a VGI interface independent of a CPU. In other words, the VGI FSM 3602 may be configured to operate despite a low power or dormant state of a CPU. In an aspect, the VGI FSM 3602 may be configured to implement a power management unit 3608 that wakes up (e.g., enables) circuits and devices (e.g., the message formatter logic circuit 3604 and/or the I/O aggregation block 3606) in the VGI FSM 3602 when VGI transmissions need to be made or when VGI communications are detected.

First Exemplary Device and Method

Figure 37:
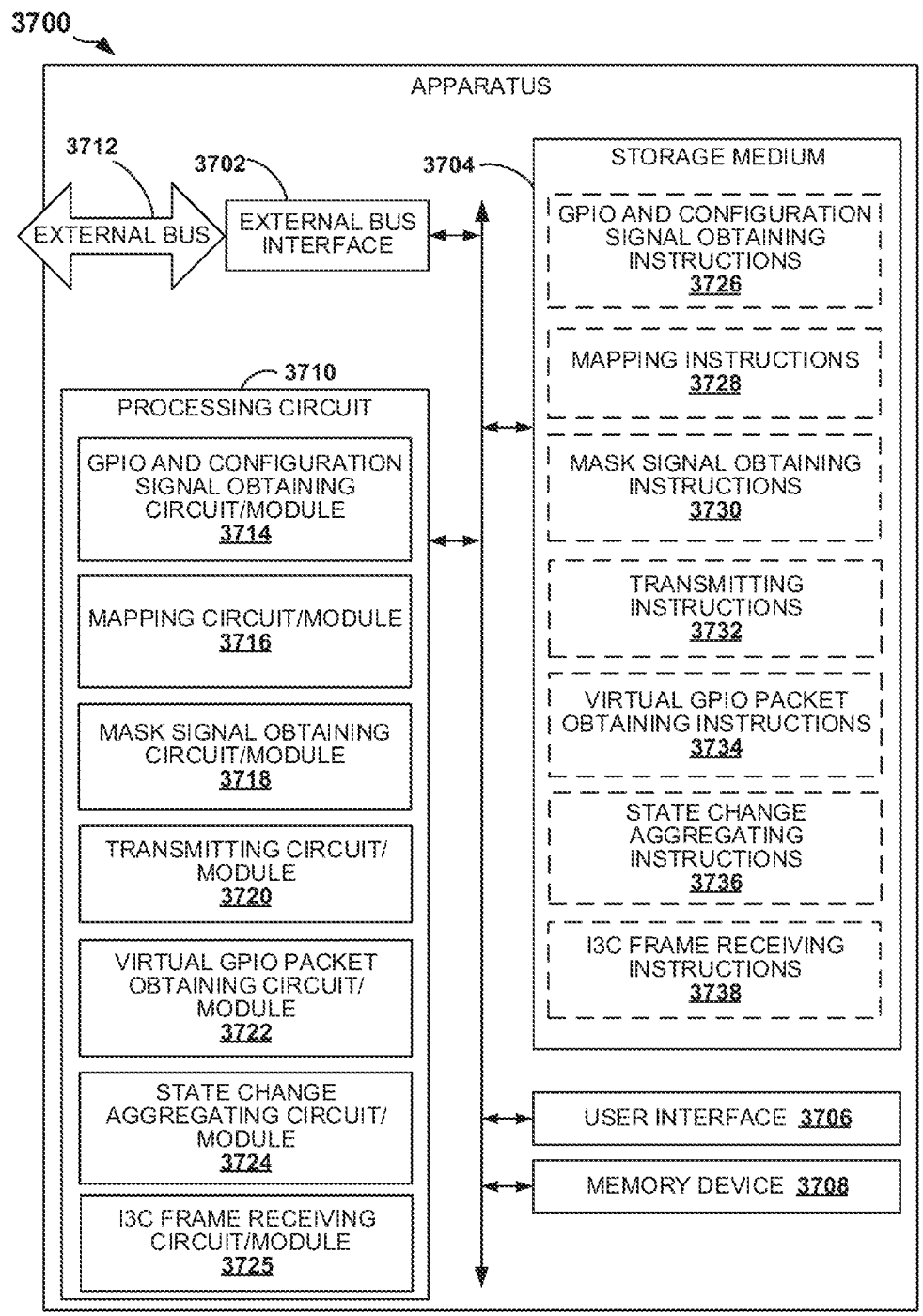
FIG. 37 is block diagram illustrating select components of an apparatus according to at least one example of the disclosure.

FIG. 37 is block diagram illustrating select components of an apparatus 3700 according to at least one example of the disclosure. The apparatus 3700 includes an external bus interface (or communication interface circuit) 3702, a storage medium 3704, a user interface 3706, a memory device 3708, and a processing circuit 3710. The processing circuit 3710 is coupled to or placed in electrical communication with each of the external bus interface 3702, the storage medium 3704, the user interface 3706, and the memory device 3708.

The external bus interface 3702 provides an interface for the components of the apparatus 3700 to an external bus 3712. The external bus interface 3702 may include, for example, one or more of: signal driver circuits, signal receiver circuits, amplifiers, signal filters, signal buffers, or other circuitry used to interface with a signaling bus or other types of signaling media. In an aspect, the external bus 3712 may include three physical interconnect lines (e.g., the interconnects 1546, 1548, and 1550 shown in FIG. 15) for transmitting and receiving VGI signals and/or I3C signals.

The processing circuit 3710 is arranged to obtain, process and/or send data, control data access and storage, issue commands, and control other desired operations. The processing circuit 3710 may include circuitry adapted to implement desired programming provided by appropriate media in at least one example. In some instances, the processing circuit 3710 may include circuitry adapted to perform a desired function, with or without implementing programming. By way of example, the processing circuit 3710 may be implemented as one or more processors, one or more controllers, and/or other structure configured to execute executable programming and/or perform a desired function. Examples of the processing circuit 3710 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 3710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 3710 are for illustration and other suitable configurations within the scope of the disclosure are also contemplated.

The processing circuit 3710 is adapted for processing, including the execution of programming, which may be stored on the storage medium 3704. As used herein, the terms "programming" or "instructions" shall be construed broadly to include without limitation instruction sets, instructions, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 3710 may include one or more of: a GPIO and configuration signal obtaining circuit/module 3714, a mapping circuit/module 3716, a mask signal obtaining circuit/module 3718, a transmitting circuit/module 3720, a virtual GPIO packet obtaining circuit/module 3722, a state change aggregating circuit/module 3724, or an I3C frame receiving circuit/module 3725.

The GPIO and configuration signal obtaining circuit/module 3714 may include circuitry and/or instructions (e.g., GPIO and configuration signal obtaining instructions 3726 stored on the storage medium 3704) adapted to obtain a set of GPIO signals for the one or more peripheral devices independent of a central processing unit, and obtain a set of configuration signals for configuring one or more GPIO pins of the one or more peripheral devices independent of a central processing unit.

The mapping circuit/module 3716 may include circuitry and/or instructions (e.g., mapping instructions 3728 stored on the storage medium 3704) adapted to map at least the set of GPIO signals for the one or more peripheral devices to first predetermined bit positions in the first virtual GPIO packet based on a mapping table, or the set of configuration signals to second predetermined bit positions in the second virtual GPIO packet based on the mapping table. In an aspect, the mapping circuit/module 3716 may include circuitry and/or instructions (e.g., mapping instructions 3728 stored on the storage medium 3704) adapted to map the set of GPIO signals and the set of configuration signals to predetermined bit positions in a virtual GPIO packet based on a mapping table or map a first virtual GPIO payload in the virtual GPIO packet based on a mapping table to determine a changed state of at least one first GPIO signal.

The mask signal obtaining circuit/module 3718 may include circuitry and/or instructions (e.g., mask signal obtaining instructions 3730 stored on the storage medium 3704) adapted to obtain a set of mask signals associated with the set of GPIO signals, wherein the set of mask signals associated with the set of GPIO signals is included in the first virtual GPIO packet, obtain a set of mask signals associated with the set of configuration signals, wherein the set of mask signals associated with the set of configuration signals are included in the second virtual GPIO packet, obtain a set of mask signals associated with the set of GPIO signals, wherein the set of mask signals associated with the set of GPIO signals is included in the virtual GPIO packet, or obtain a set of mask signals associated with the set of configuration signals, wherein the set of mask signals associated with the set of configuration signals are included in a virtual GPIO packet.

The transmitting circuit/module 3720 may include circuitry and/or instructions (e.g., the transmitting instructions 3732 stored on the storage medium 3704) adapted to transmit the first virtual GPIO packet to the one or more peripheral devices over an I3C bus independent of the central processing unit, transmit the second virtual GPIO packet to the one or more peripheral devices over the I3C bus independent of the central processing unit, transmit a virtual GPIO packet to the one or more peripheral devices over an I3C bus independent of the central processing unit, or transmit a second I3C frame to a second peripheral device over the I3C bus, wherein the second I3C frame includes a second virtual GPIO payload that signals the changed state of the at least one second GPIO signal.

The virtual GPIO packet obtaining circuit/module 3722 may include circuitry and/or instructions (e.g., virtual GPIO packet obtaining instructions 3734 stored on the storage medium 3704) adapted to obtain a first virtual GPIO packet that includes the set of GPIO signals independent of a central processing unit, or obtain a second virtual GPIO packet that includes the set of configuration signals independent of the central processing unit. In an aspect, the virtual GPIO packet obtaining circuit/module 3722 may include circuitry and/or instructions (e.g., virtual GPIO packet obtaining instructions 3734 stored on the storage medium 3704) adapted to obtain the virtual GPIO packet that includes the set of GPIO signals and the set of configuration signals or obtain the virtual GPIO packet from a first I3C frame The state change aggregating circuit/module 3724 may include circuitry and/or instructions (e.g., state change aggregating instructions 3736 stored on the storage medium 3704) adapted to aggregate the changed state of the at least one first GPIO signal into a changed state of at least one second GPIO signal.

The I3C frame receiving circuit/module 3725 may include circuitry and/or instructions (e.g., I3C frame receiving instructions 3738 stored on the storage medium 3704) adapted to receive a first I3C frame including an virtual GPIO packet over an I3C bus from a first peripheral device, wherein the virtual GPIO packet is encapsulated in the I3C frame.

The storage medium 3704 may represent one or more processor-readable devices for storing programming, electronic data, databases, or other digital information. The storage medium 3704 may also be used for storing data that is manipulated by the processing circuit 3710 when executing programming. The storage medium 3704 may be any available media that can be accessed by the processing circuit 3710, including portable or fixed storage devices, optical storage devices, and various other mediums capable of storing, containing and/or carrying programming. By way of example and not limitation, the storage medium 3704 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof. Thus, in some implementations, the storage medium may be a non-transitory (e.g., tangible) storage medium.

The storage medium 3704 may be coupled to the processing circuit 3710 such that the processing circuit 3710 can read information from, and write information to, the storage medium 3704. That is, the storage medium 3704 can be coupled to the processing circuit 3710 so that the storage medium 3704 is at least accessible by the processing circuit 3710, including examples where the storage medium 3704 is integral to the processing circuit 3710 and/or examples where the storage medium 3704 is separate from the processing circuit 3710.

Programming/instructions stored by the storage medium 3704, when executed by the processing circuit 3710, causes the processing circuit 3710 to perform one or more of the various functions and/or process steps described herein. For example, the storage medium 3704 may include one or more of: GPIO and configuration signal obtaining instructions 3726, mapping instructions 3728, mask signal obtaining instructions 3730, transmitting instructions 3732, virtual GPIO packet obtaining instructions 3734, state change aggregating instructions 3736, or I3C frame receiving instructions 3738. Thus, according to one or more aspects of the disclosure, the processing circuit 3710 is adapted to perform (in conjunction with the storage medium 3704) any or all of the processes, functions, steps and/or routines for any or all of the apparatuses described herein. As used herein, the term "adapted" in relation to the processing circuit 3710 may refer to the processing circuit 3710 being one or more of configured, employed, implemented, and/or programmed (in conjunction with the storage medium 3704) to perform a particular process, function, step and/or routine according to various features described herein.

The memory device 3708 may represent one or more memory devices and may comprise any of the memory technologies listed above or any other suitable memory technology. The memory device 3708 may store information used by one or more of the components of the apparatus 3700. The memory device 3708 also may be used for storing data that is manipulated by the processing circuit 3710 or some other component of the apparatus 3700. In some implementations, the memory device 3708 and the storage medium 3704 are implemented as a common memory component.

The user interface 3706 includes functionality that enables a user to interact with the apparatus 3700. For example, the user interface 3706 may interface with one or more user output devices (e.g., a display device, etc.) and one or more user input devices (e.g., a keyboard, a tactile input device, etc.).

With the above in mind, examples of operations according to the disclosed aspects will be described in more detail in conjunction with the flowcharts of FIGS. 38-40. For convenience, the operations of FIG. 38 (or any other operations discussed or taught herein) may be described as being performed by specific components. It should be appreciated, however, that in various implementations these operations may be performed by other types of components and may be performed using a different number of components. It also should be appreciated that one or more of the operations described herein may not be employed in a given implementation.

Figure 38A:
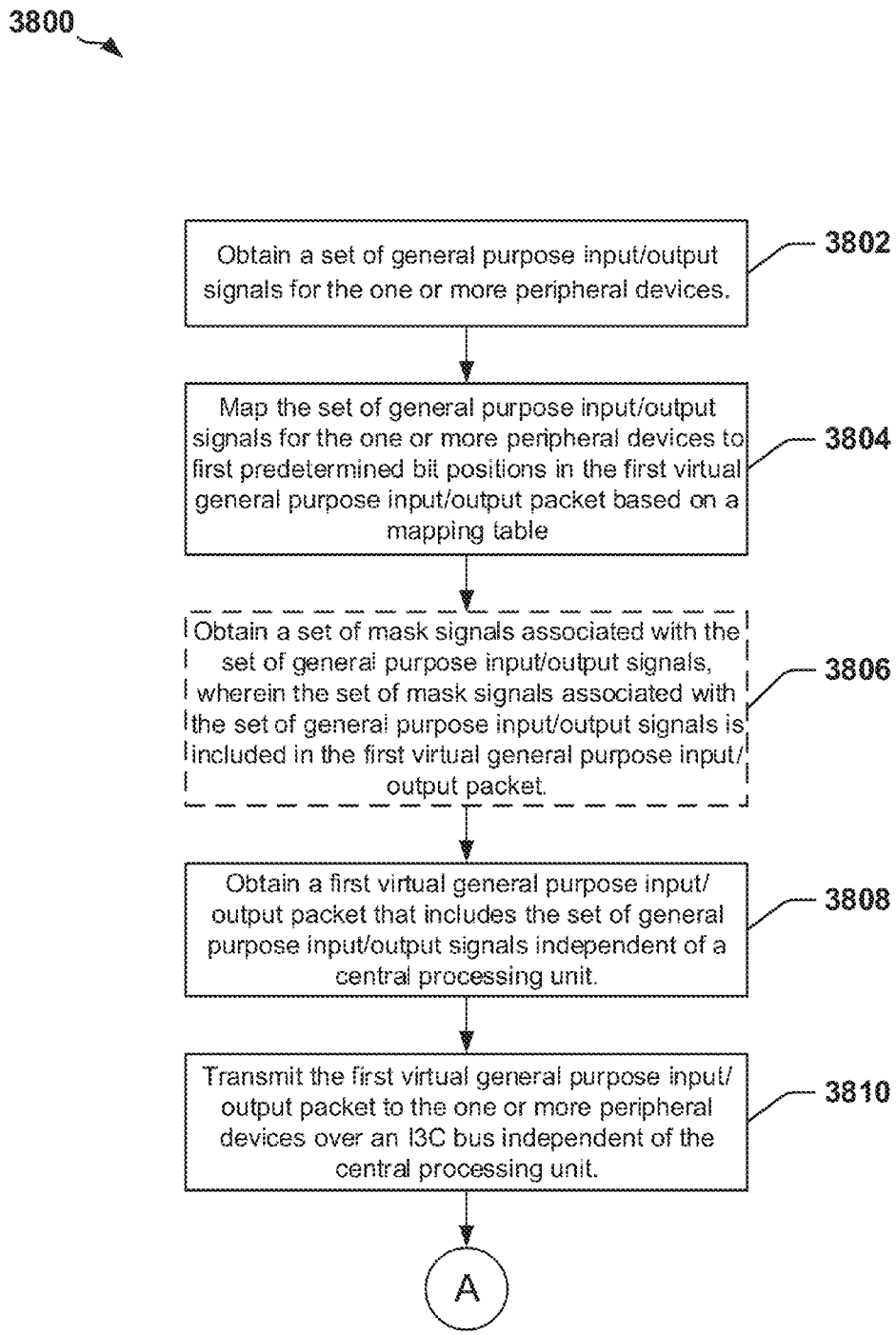
FIG. 38 (including FIGS. 38A and 38B) is a flowchart illustrating a method in accordance with various aspects of the present disclosure.
Figure 38B:
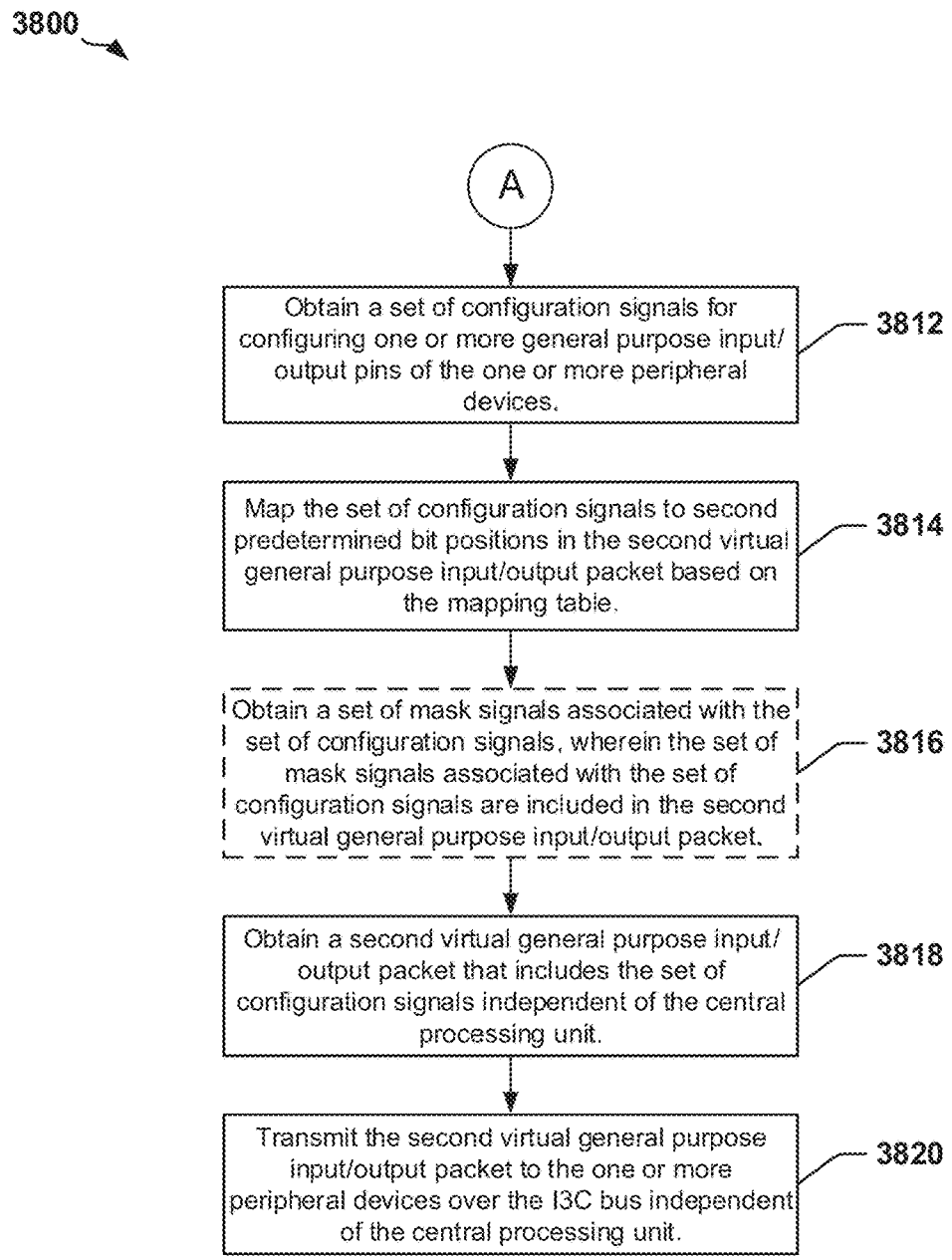

FIG. 38 (including FIGS. 38A and 38B) is a flowchart 3800 illustrating a method for an integrated circuit (e.g., the VGI FSM 1508). It should be understood that the operations in FIG. 38 represented with dashed lines represent optional operations.

The integrated circuit obtains a set of GPIO signals for the one or more peripheral devices 3802. The integrated circuit maps the set of GPIO signals for the one or more peripheral devices to first predetermined bit positions in the first virtual GPIO packet based on a mapping table 3804. The integrated circuit obtains a set of mask signals associated with the set of GPIO signals, wherein the set of mask signals associated with the set of GPIO signals is included in the first virtual GPIO packet 3806. The integrated circuit obtains a first virtual GPIO packet that includes the set of GPIO signals independent of a central processing unit 3808. The integrated circuit transmits the first virtual GPIO packet to the one or more peripheral devices over an I3C bus independent of the central processing unit 3810. The integrated circuit obtains a set of configuration signals for configuring one or more GPIO pins of the one or more peripheral devices 3812. The integrated circuit maps the set of configuration signals to second predetermined bit positions in the second virtual GPIO packet based on the mapping table 3814. The integrated circuit obtains a set of mask signals associated with the set of configuration signals, wherein the set of mask signals associated with the set of configuration signals are included in the second virtual GPIO packet 3816. The integrated circuit obtains a second virtual GPIO packet that includes the set of configuration signals independent of the central processing unit 3818. The integrated circuit transmits the second virtual GPIO packet to the one or more peripheral devices over the I3C bus independent of the central processing unit 3820.

Figure 39:
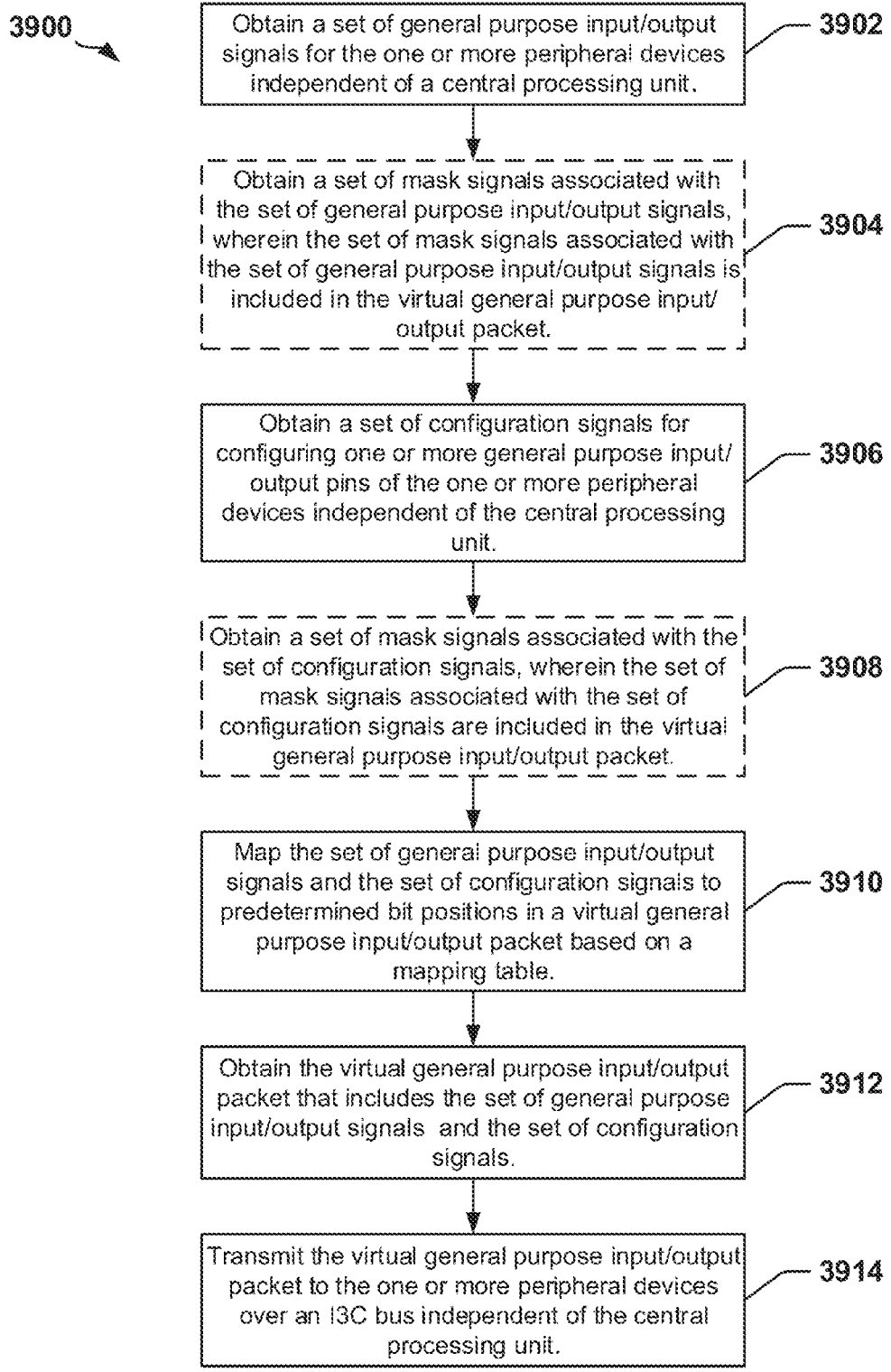
FIG. 39 is a flowchart illustrating a method in accordance with various aspects of the present disclosure.

FIG. 39 is a flowchart 3900 illustrating a method for an integrated circuit (e.g., the VGI FSM 1508). It should be understood that the operations in FIG. 39 represented with dashed lines represent optional operations.

The integrated circuit obtains a set of GPIO signals for the one or more peripheral devices independent of a central processing unit 3902. The integrated circuit obtains a set of mask signals associated with the set of GPIO signals, wherein the set of mask signals associated with the set of GPIO signals is included in the virtual GPIO packet 3904. The integrated circuit obtains a set of configuration signals for configuring one or more GPIO pins of the one or more peripheral devices independent of the central processing unit 3906. The integrated circuit obtains a set of mask signals associated with the set of configuration signals, wherein the set of mask signals associated with the set of configuration signals are included in the virtual GPIO packet 3908. The integrated circuit maps the set of GPIO signals and the set of configuration signals to predetermined bit positions in a virtual GPIO packet based on a mapping table 3910. The integrated circuit obtains the virtual GPIO packet that includes the set of GPIO signals and the set of configuration signals 3912. The integrated circuit transmits the virtual GPIO packet to the one or more peripheral devices over an I3C bus independent of the central processing unit 3914.

Figure 40:
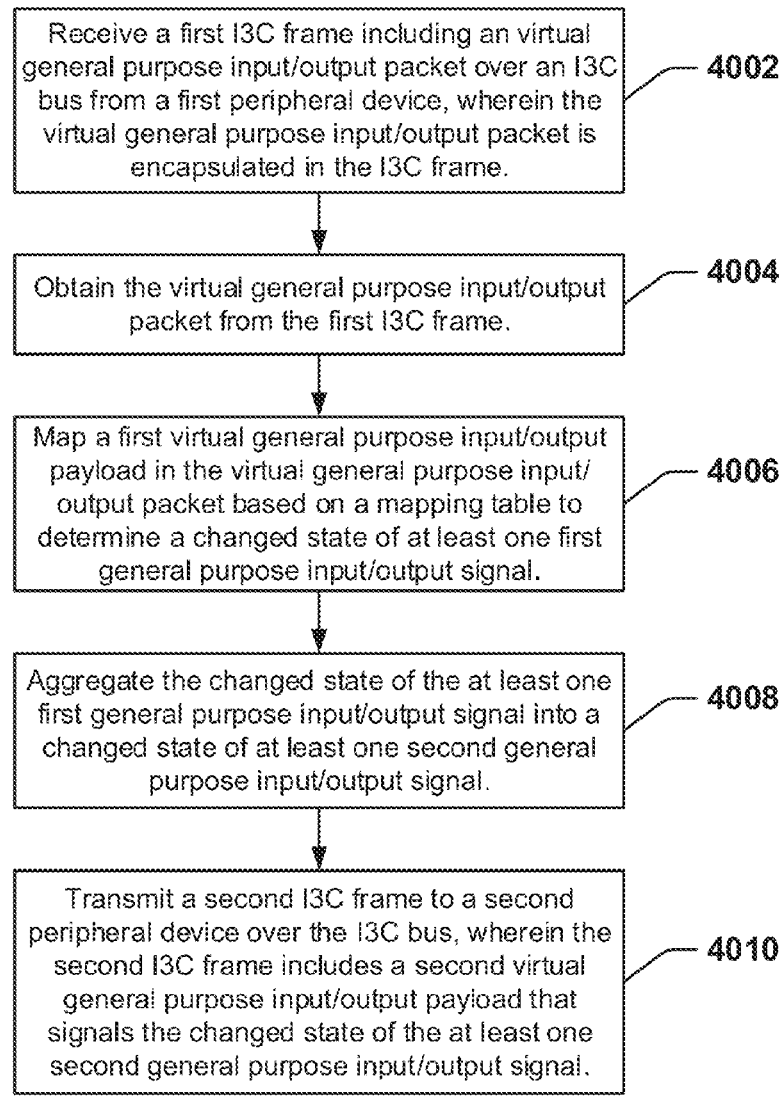
FIG. 40 is a flowchart illustrating a method in accordance with various aspects of the present disclosure.

FIG. 40 is a flowchart 4000 illustrating a method for an integrated circuit (e.g., the VGI FSM 1508). The integrated circuit receives a first I3C frame including a virtual GPIO packet over an I3C bus from a first peripheral device, wherein the virtual GPIO packet is encapsulated in the I3C frame 4002. The integrated circuit obtains the virtual GPIO packet from the first I3C frame 4004, maps a first virtual GPIO payload in the virtual GPIO packet based on a mapping table to determine a changed state of at least one first GPIO signal 4006, aggregates the changed state of the at least one first GPIO signal into a changed state of at least one second GPIO signal 4008, and transmits a second I3C frame to a second peripheral device over the I3C bus, wherein the second I3C frame includes a second virtual GPIO payload that signals the changed state of the at least one second GPIO signal 4010. In an aspect, the second I3C frame is transmitted to the second peripheral device as a broadcast I3C frame. In an aspect, the broadcast I3C frame comprises a masked broadcast I3C frame. In an aspect, the second I3C frame is transmitted to the second peripheral device as a directed I3C frame. In an aspect, the directed I3C frame comprises a masked directed I3C frame. In an aspect, the integrated circuit may interrupt a host processor in response to the changed state of the at least one first GPIO signal.

Second Exemplary Device and Method

Figure 41:
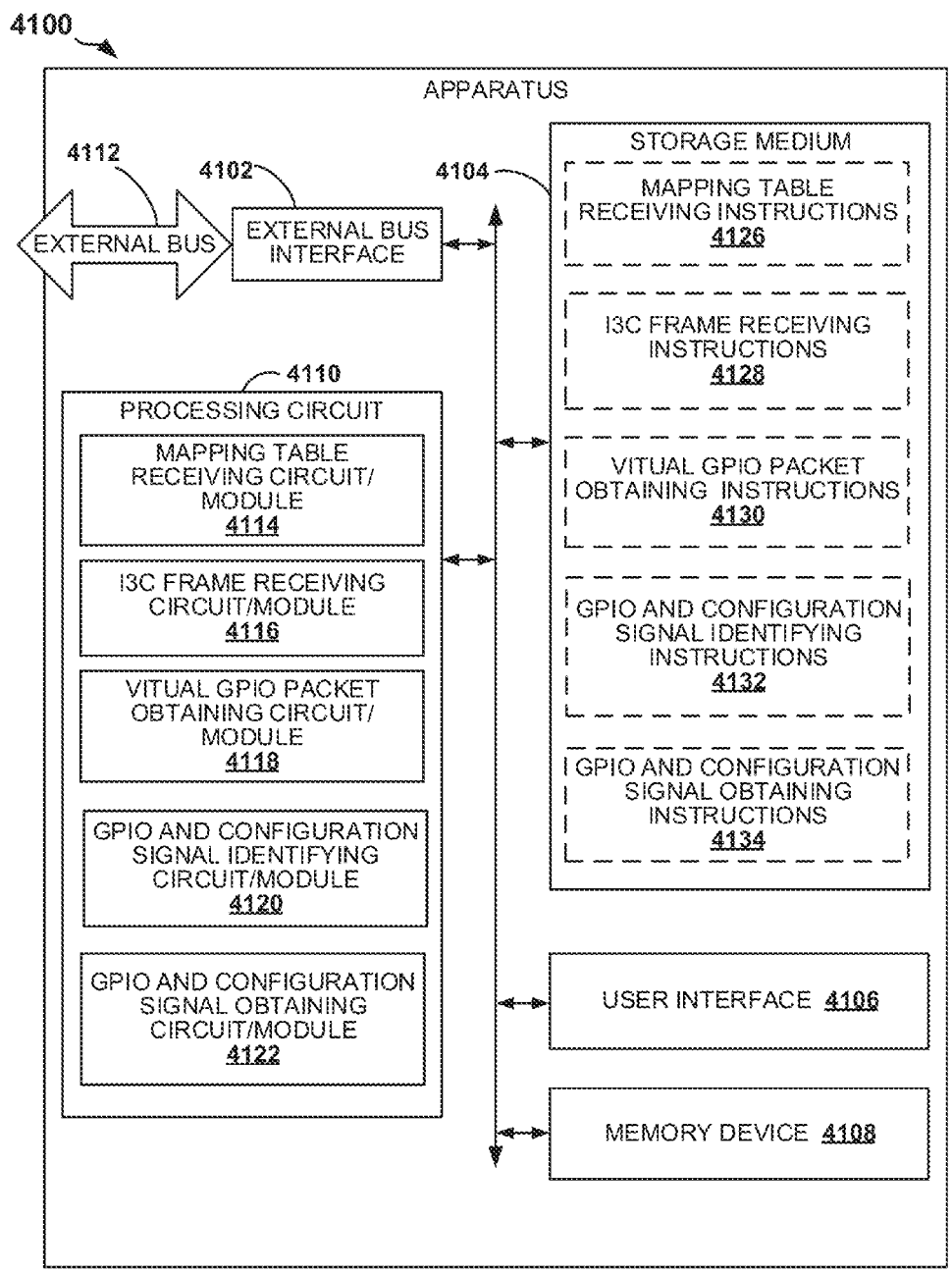
FIG. 41 is block diagram illustrating select components of an apparatus according to at least one example of the disclosure.

FIG. 41 is block diagram illustrating select components of an apparatus 4100 according to at least one example of the disclosure. The apparatus 4100 includes an external bus interface (or communication interface circuit) 4102, a storage medium 4104, a user interface 4106, a memory device 4108, and a processing circuit 4110. The processing circuit 4110 is coupled to or placed in electrical communication with each of the external bus interface 4102, the storage medium 4104, the user interface 4106, and the memory device 4108.

The external bus interface 4102 provides an interface for the components of the apparatus 4100 to an external bus 4112. The external bus interface 4102 may include, for example, one or more of: signal driver circuits, signal receiver circuits, amplifiers, signal filters, signal buffers, or other circuitry used to interface with a signaling bus or other types of signaling media. In an aspect, the external bus 4112 may include three physical interconnect lines (e.g., the interconnects 1546, 1548, and 1550 shown in FIG. 15) for transmitting and receiving VGI signals and/or I3C signals.

The processing circuit 4110 is arranged to obtain, process and/or send data, control data access and storage, issue commands, and control other desired operations. The processing circuit 4110 may include circuitry adapted to implement desired programming provided by appropriate media in at least one example. In some instances, the processing circuit 4110 may include circuitry adapted to perform a desired function, with or without implementing programming. By way of example, the processing circuit 4110 may be implemented as one or more processors, one or more controllers, and/or other structure configured to execute executable programming and/or perform a desired function. Examples of the processing circuit 4110 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 4110 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 4110 are for illustration and other suitable configurations within the scope of the disclosure are also contemplated.

The processing circuit 4110 is adapted for processing, including the execution of programming, which may be stored on the storage medium 4104. As used herein, the terms "programming" or "instructions" shall be construed broadly to include without limitation instruction sets, instructions, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 4110 may include one or more of: a mapping table receiving circuit/module 4114, an I3C frame receiving circuit/module 4116, a virtual GPIO packet obtaining circuit/module 4118, a GPIO and configuration signal identifying circuit/module 4120, or a GPIO and configuration signal obtaining circuit/module 4122.

The mapping table receiving circuit/module 4114 may include circuitry and/or instructions (e.g., mapping table receiving instructions 4126 stored on the storage medium 4104) adapted to receive a mapping table over the I3C bus from a host device during a configuration phase of the processing circuit 4110.

The I3C frame receiving circuit/module 4116 may include circuitry and/or instructions (e.g., I3C frame receiving instructions 4128 stored on the storage medium 4104) adapted to receive an I3C frame that includes a virtual general purpose input/output packet from the host device over an I3C bus independent of a central processing unit, wherein the virtual general purpose input/output packet is encapsulated in the I3C frame.

The virtual GPIO packet obtaining circuit/module 4118 may include circuitry and/or instructions (e.g., virtual GPIO packet obtaining instructions 4130 stored on the storage medium 4104) adapted to obtain a virtual GPIO packet that includes a set of GPIO signals and a set of configuration signals that are associated with the integrated circuit independent of the central processing unit.

The GPIO and configuration signal identifying circuit/module 4120 may include circuitry and/or instructions (e.g., GPIO and configuration signal identifying instructions 4132 stored on the storage medium 4104) adapted to identify the set of GPIO signals and the set of configuration signals at predetermined bit positions in the virtual GPIO packet based on a mapping table, identify each of the set of GPIO signals that are indicated with a mask bit as having a changed state, or identify each of the set of configuration signals that are indicated with a mask bit as having a changed state.

The GPIO and configuration signal obtaining circuit/module 4122 may include circuitry and/or instructions (e.g., GPIO and configuration signal obtaining instructions 4134 stored on the storage medium 4104) adapted to obtain a set of GPIO signals and the set of configuration signals.

The storage medium 4104 may represent one or more processor-readable devices for storing programming, electronic data, databases, or other digital information. The storage medium 4104 may also be used for storing data that is manipulated by the processing circuit 4110 when executing programming. The storage medium 4104 may be any available media that can be accessed by the processing circuit 4110, including portable or fixed storage devices, optical storage devices, and various other mediums capable of storing, containing and/or carrying programming. By way of example and not limitation, the storage medium 4104 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof. Thus, in some implementations, the storage medium may be a non-transitory (e.g., tangible) storage medium.

The storage medium 4104 may be coupled to the processing circuit 4110 such that the processing circuit 4110 can read information from, and write information to, the storage medium 4104. That is, the storage medium 4104 can be coupled to the processing circuit 4110 so that the storage medium 4104 is at least accessible by the processing circuit 4110, including examples where the storage medium 4104 is integral to the processing circuit 4110 and/or examples where the storage medium 4104 is separate from the processing circuit 4110.

Programming/instructions stored by the storage medium 4104, when executed by the processing circuit 4110, causes the processing circuit 4110 to perform one or more of the various functions and/or process steps described herein. For example, the storage medium 4104 may include one or more of: mapping table receiving instructions 4126, I3C frame receiving instructions 4128, virtual GPIO packet obtaining instructions 4130, GPIO and configuration signal identifying instructions 4132, GPIO and configuration signal obtaining instructions 4134. Thus, according to one or more aspects of the disclosure, the processing circuit 4110 is adapted to perform (in conjunction with the storage medium 4104) any or all of the processes, functions, steps and/or routines for any or all of the apparatuses described herein. As used herein, the term "adapted" in relation to the processing circuit 4110 may refer to the processing circuit 4110 being one or more of configured, employed, implemented, and/or programmed (in conjunction with the storage medium 4104) to perform a particular process, function, step and/or routine according to various features described herein.

The memory device 4108 may represent one or more memory devices and may comprise any of the memory technologies listed above or any other suitable memory technology. The memory device 4108 may store information used by one or more of the components of the apparatus 4100. The memory device 4108 also may be used for storing data that is manipulated by the processing circuit 4110 or some other component of the apparatus 4100. In some implementations, the memory device 4108 and the storage medium 4104 are implemented as a common memory component.

The user interface 4106 includes functionality that enables a user to interact with the apparatus 4100. For example, the user interface 4106 may interface with one or more user output devices (e.g., a display device, etc.) and one or more user input devices (e.g., a keyboard, a tactile input device, etc.).

With the above in mind, examples of operations according to the disclosed aspects will be described in more detail in conjunction with the flowchart of FIG. 42. For convenience, the operations of FIG. 42 (or any other operations discussed or taught herein) may be described as being performed by specific components. It should be appreciated, however, that in various implementations these operations may be performed by other types of components and may be performed using a different number of components. It also should be appreciated that one or more of the operations described herein may not be employed in a given implementation.

Figure 42:
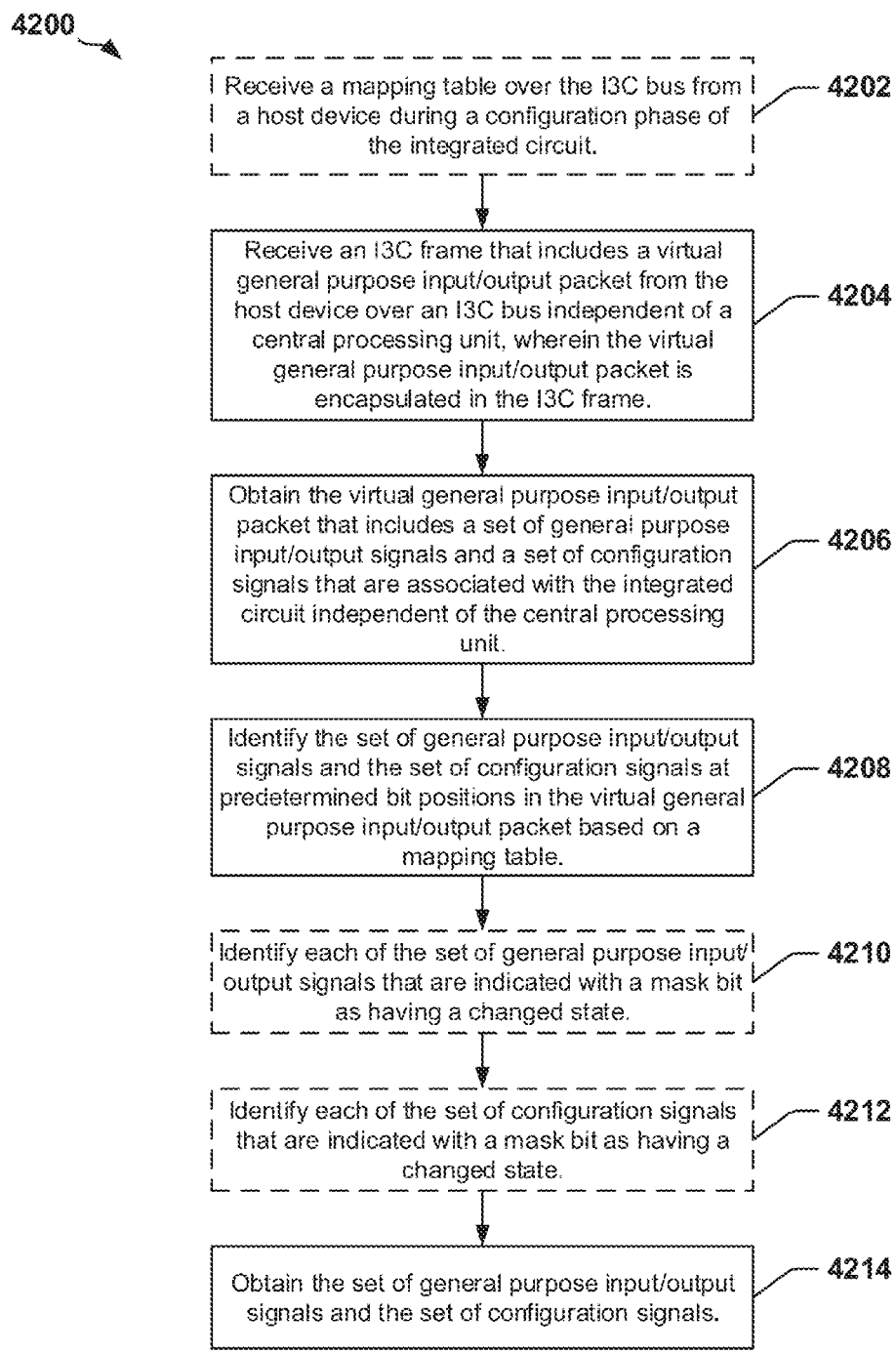
FIG. 42 is a flowchart illustrating a method in accordance with various aspects of the present disclosure.

FIG. 42 is a flowchart 4200 illustrating a method for an integrated circuit (e.g., the VGI FSM 1508 at the peripheral device 1504). It should be understood that the operations in FIG. 42 represented with dashed lines represent optional operations.

The integrated circuit receives a mapping table over an I3C bus from a host device during a configuration phase of the integrated circuit 4202. The integrated circuit receives an I3C frame that includes a virtual GPIO packet from the host device over an I3C bus independent of a central processing unit, wherein the virtual GPIO packet is encapsulated in the I3C frame 4204. The integrated circuit obtains the virtual GPIO packet that includes a set of GPIO signals and a set of configuration signals that are associated with the integrated circuit independent of the central processing unit 4206. The integrated circuit identifies the set of GPIO signals and the set of configuration signals at predetermined bit positions in the virtual GPIO packet based on a mapping table 4208. The integrated circuit identifies each of the set of GPIO signals that are indicated with a mask bit as having a changed state 4210. The integrated circuit identifies each of the set of configuration signals that are indicated with a mask bit as having a changed state 4212. The integrated circuit obtains the set of GPIO signals and the set of configuration signals 4214.

Figure 43:
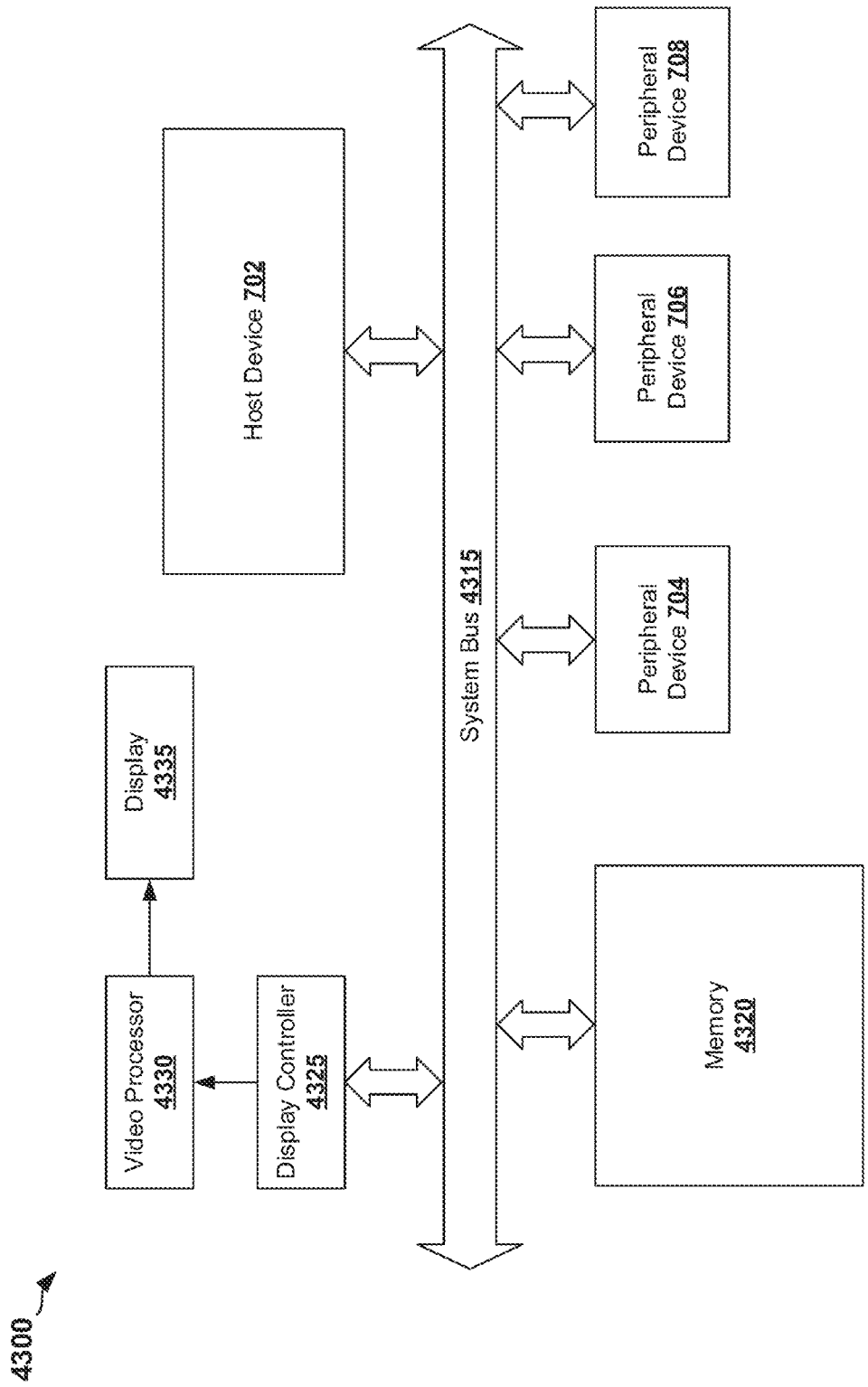
FIG. 43 illustrates an example system incorporating a system on chip (SoC) device and peripheral devices.

FIG. 43 illustrates an example system incorporating a system on chip (SoC) device and peripheral devices. The system 4300 includes the host device 702 (e.g., an SoC device) and example peripheral devices 704, 706, and 708 previously described with respect to FIG. 7. For example, the system 4300 may be a cellular phone, smart phone, personal digital assistant, tablet computer, laptop computer, digital camera, handheld gaming device, etc. The host device 702 communicates with peripheral devices 704, 706, and 708 over a system bus 4315 (e.g., an I3C bus) that also couples to a memory 4320 (e.g., DRAM device) and to a display controller 4325. In turn display controller 4325 couples to a video processor 4330 that drives a display 4335.

Therefore, the aspects described herein provide a mechanism to avoid CPU involvement in hardware based exchanges, while also achieving power savings at the host device. Physical I/O involved in sideband signaling may be effectively virtualized to eliminate physical I/O pins. The virtualization of GPIOs/hardware event sidebands into I3C messages may eliminate need of extra GPIOs at the host device for I3C peripherals with VGI FSM support, may allow mapping of I/Os between a host device and peripheral devices, may reduce overall hardware event latency, and/or may reduce processing power at the host device.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while exemplary implementations may have been discussed herein as device, system, or method implementations, it should be understood that such exemplary implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like. As used herein, the term "obtaining" may include one or more actions including, but not limited to, receiving, generating, determining, or any combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. An integrated circuit comprising:
   a communication interface configured to communicate with one or more peripheral devices; and
   a processing circuit coupled to the communication interface, the processing circuit configured to
   obtain a set of general purpose input/output signals for the one or more peripheral devices;
   obtain a first virtual general purpose input/output packet that includes the set of general purpose input/output signals independent of a central processing unit, wherein the first virtual general purpose input/output packet further includes an address of a direct input/output mapping register at the one or more peripheral devices; and
   transmit the first virtual general purpose input/output packet to the one or more peripheral devices over an I3C bus independent of the central processing unit.

2. The integrated circuit of claim 1, wherein the processing circuit is further configured to:
   obtain a set of mask signals associated with the set of general purpose input/output signals, wherein the set of mask signals associated with the set of general purpose input/output signals is included in the first virtual general purpose input/output packet.

3. The integrated circuit of claim 1, wherein the processing circuit is further configured to:
obtain a set of configuration signals for configuring one or more general purpose input/output pins of the one or more peripheral devices;
obtain a second virtual general purpose input/output packet that includes the set of configuration signals independent of the central processing unit; and
transmit the second virtual general purpose input/output packet to the one or more peripheral devices over the I3C bus independent of the central processing unit.

4. The integrated circuit of claim 3, wherein the processing circuit is further configured to:
obtain a set of mask signals associated with the set of configuration signals, wherein the set of mask signals associated with the set of configuration signals is included in the second virtual general purpose input/output packet.

5. The integrated circuit of claim 1, wherein each bit of the direct input/output mapping register controls a pin status of a corresponding general purpose input/output pin of the one or more peripheral devices.

6. The integrated circuit of claim 3, wherein the second virtual general purpose input/output packet further includes an address of a configuration register at the one or more peripheral devices.

7. The integrated circuit of claim 3, wherein the set of configuration signals is configured to:
set one or more electrical characteristics of the one or more general purpose input/output pins of the one or more peripheral devices.

8. The integrated circuit of claim 3, wherein the processing circuit is further configured to:
map at least the set of general purpose input/output signals for the one or more peripheral devices to first predetermined bit positions in the first virtual general purpose input/output packet based on a mapping table, or the set of configuration signals to second predetermined bit positions in the second virtual general purpose input/output packet based on the mapping table.

9. An integrated circuit comprising:
a communication interface configured to communicate with one or more peripheral devices; and
a processing circuit coupled to the communication interface, the processing circuit configured to
obtain a set of general purpose input/output signals for the one or more peripheral devices independent of a central processing unit;
obtain a set of configuration signals for configuring one or more general purpose input/output pins of the one or more peripheral devices independent of the central processing unit;
map the set of general purpose input/output signals and the set of configuration signals to predetermined bit positions in a virtual general purpose input/output packet based on a mapping table;
obtain the virtual general purpose input/output packet that includes the set of general purpose input/output signals and the set of configuration signals; and
transmit the virtual general purpose input/output packet to the one or more peripheral devices over an I3C bus independent of the central processing unit.

10. The integrated circuit of claim 9, wherein the processing circuit is further configured to:
obtain a set of mask signals associated with the set of general purpose input/output signals, wherein the set of mask signals associated with the set of general purpose input/output signals is included in the virtual general purpose input/output packet.

11. The integrated circuit of claim 9, wherein the processing circuit is further configured to:
obtain a set of mask signals associated with the set of configuration signals, wherein the set of mask signals associated with the set of configuration signals is included in the virtual general purpose input/output packet.

12. The integrated circuit of claim 9, wherein the predetermined bit positions correspond to addresses of the one or more peripheral devices based on the mapping table.

13. The integrated circuit of claim 9, wherein the set of configuration signals is configured to set one or more electrical characteristics of the one or more general purpose input/output pins.

14. The integrated circuit of claim 9, wherein each of the set of general purpose input/output signals controls a pin status of a corresponding general purpose input/output pin of the one or more peripheral devices.

15. The integrated circuit of claim 9, wherein the set of general purpose input/output signals for the one or more peripheral devices are obtained from a general purpose input/output signal interface configured to store the set of general purpose input/output signals, or an intellectual property block.

16. A method operational at an integrated circuit, comprising:
obtaining a set of general purpose input/output signals for one or more peripheral devices independent of a central processing unit;
obtaining a set of configuration signals for configuring one or more general purpose input/output pins of the one or more peripheral devices independent of the central processing unit;
mapping the set of general purpose input/output signals and the set of configuration signals to predetermined bit positions in a virtual general purpose input/output packet based on a mapping table;
obtaining the virtual general purpose input/output packet that includes the set of general purpose input/output signals and the set of configuration signals; and
transmitting the virtual general purpose input/output packet to the one or more peripheral devices over an I3C bus independent of the central processing unit.

17. The method of claim 16, further comprising:
obtaining a set of mask signals associated with the set of general purpose input/output signals, wherein the set of mask signals associated with the set of general purpose input/output signals is included in the virtual general purpose input/output packet.

18. The method of claim 16, further comprising:
obtaining a set of mask signals associated with the set of configuration signals, wherein the set of mask signals associated with the set of configuration signals is included in the virtual general purpose input/output packet.

19. The method of claim 16, wherein the predetermined bit positions correspond to addresses of the one or more peripheral devices based on the mapping table.

20. The method of claim 16, wherein the set of configuration signals is configured to set one or more electrical characteristics of the one or more general purpose input/output pins.

21. The method of claim 16, wherein each of the set of general purpose input/output signals controls a pin status of a corresponding general purpose input/output pin of the one or more peripheral devices.

22. The method of claim 16, wherein the set of general purpose input/output signals for the one or more peripheral devices are obtained from a general purpose input/output signal interface configured to store the set of general purpose input/output signals, or an intellectual property block.

23. An integrated circuit comprising:
a communication interface configured to communicate with a host device; and
a processing circuit coupled to the communication interface, the processing circuit configured to
receive an I3C frame that includes a virtual general purpose input/output packet from the host device over an I3C bus independent of a central processing unit, wherein the virtual general purpose input/output packet is encapsulated in the I3C frame;
obtain the virtual general purpose input/output packet that includes a set of general purpose input/output signals and a set of configuration signals that are associated with the integrated circuit independent of the central processing unit;
identify the set of general purpose input/output signals and the set of configuration signals at predetermined bit positions in the virtual general purpose input/output packet based on a mapping table; and
obtain the set of general purpose input/output signals and the set of configuration signals.

24. The integrated circuit of claim 23, wherein the processing circuit is further configured to receive the mapping table over the I3C bus from the host device during a configuration phase of the integrated circuit.

25. The integrated circuit of claim 23, wherein the processing circuit is further configured to identify each of the set of general purpose input/output signals that are indicated with a mask bit as having a changed state.

26. The integrated circuit of claim 23, wherein the processing circuit is further configured to identify each of the set of configuration signals that are indicated with a mask bit as having a changed state.

27. The integrated circuit of claim 23, wherein the set of configuration signals is configured to:
set one or more electrical characteristics of one or more general purpose input/output pins of the integrated circuit.

28. The integrated circuit of claim 27, wherein the one or more electrical characteristics of the one or more general purpose input/output pins includes at least a drive strength, a slew rate, a voltage level, an output type, or an interrupt trigger type.

29. The integrated circuit of claim 23, wherein the I3C frame is a broadcast I3C frame or a directed I3C frame.

30. The integrated circuit of claim 29, wherein the I3C frame include a command code that identifies the I3C frame as the broadcast I3C frame or the directed I3C frame.

* * * * *